United States Patent
Liu et al.

(10) Patent No.: US 10,622,692 B2
(45) Date of Patent: Apr. 14, 2020

(54) SOLAR ENERGY SYSTEMS

(71) Applicant: BOARD OF REGENTS, THE UNIVERSITY OF TEXAS SYSTEM, Austin, TX (US)

(72) Inventors: Fuqiang Liu, Plano, TX (US); Dong Liu, Arlington, TX (US); Zi Wei, Arlington, TX (US); Yi Shen, Arlington, TX (US); Krishnan Rajeshwar, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 50 days.

(21) Appl. No.: 15/574,573

(22) PCT Filed: May 18, 2016

(86) PCT No.: PCT/US2016/033055
§ 371 (c)(1),
(2) Date: Nov. 16, 2017

(87) PCT Pub. No.: WO2016/187287
PCT Pub. Date: Nov. 24, 2016

(65) Prior Publication Data
US 2018/0159190 A1  Jun. 7, 2018

Related U.S. Application Data

(60) Provisional application No. 62/175,999, filed on Jun. 15, 2015, provisional application No. 62/162,976, filed on May 18, 2015.

(51) Int. Cl.
*H01M 6/30* (2006.01)
*H01M 14/00* (2006.01)
(Continued)

(52) U.S. Cl.
CPC ........ *H01M 14/005* (2013.01); *H01G 9/2031* (2013.01); *H01G 9/2036* (2013.01);
(Continued)

(58) Field of Classification Search
CPC ...... H01M 14/005; H01M 14/00; H01M 8/20; H01M 8/184; H01M 8/188; H01M 12/02;
(Continued)

(56) References Cited

U.S. PATENT DOCUMENTS

| 2010/0174095 A1* | 7/2010 | Koumura | C07D 409/14 548/440 |
| 2015/0034149 A1* | 2/2015 | Sasaki | H01M 4/48 136/252 |
| 2015/0167179 A1* | 6/2015 | Fleig | B01J 23/002 205/340 |

FOREIGN PATENT DOCUMENTS

JP  2004292284 A  10/2004

OTHER PUBLICATIONS

Liu Dong et al: "Efficient Solar Energy Storage Using a TiO2/WO3Tandem Photoelectrode in an All-vanadium Photoelectrochemical Cell", Electrochimica Acta, vol. 136, Jun. 2, 2014 (Jun. 2, 2014), pp. 435-441.

(Continued)

*Primary Examiner* — Raymond Alejandro
(74) *Attorney, Agent, or Firm* — Christopher S. Dodson; Nexsen Pruet, PLLC

(57) ABSTRACT

In one aspect, solar energy systems are described herein. In some embodiments, such a comprises an electrochemical cell comprising a photoelectrode, a counter electrode, and an ion transport membrane disposed between the photoelectrode and counter electrode. The cell further comprises a first electrolyte solution disposed in fluid communication with the photoelectrode and the membrane, and a second electrolyte solution disposed in fluid communication with the (Continued)

membrane and the counter electrode. The first and/or second electrolyte solution comprises a solvated redox pair. Additionally, the cell also comprises a storage electrode, a first external electrical connection between the photoelectrode and the counter electrode, and a second external electrical connection between the counter electrode and the storage electrode. Components of the system define a liquid junction photovoltaic cell under light conditions and a galvanic cell under dark conditions.

19 Claims, 17 Drawing Sheets

(51) Int. Cl.
    *H01G 9/20*         (2006.01)
    *H01G 9/28*         (2006.01)
    *H01M 8/20*        (2006.01)

(52) U.S. Cl.
    CPC .............. *H01G 9/28* (2013.01); *H01G 9/2022* (2013.01); *H01M 8/20* (2013.01); *Y02E 10/542* (2013.01); *Y02E 60/528* (2013.01)

(58) Field of Classification Search
    CPC .............. H01M 12/08; H01M 16/003; H01M 2250/402; H01G 9/2031; H01G 9/2036; H01G 9/28; H01G 9/2022; Y02E 10/542; Y02E 60/528
    See application file for complete search history.

(56) References Cited

OTHER PUBLICATIONS

Liu P et al: "A solar rechargeable battery based on polymeric charge storage electrodes", Electrochemistry Communications, vol. 16, No. 1, Dec. 20, 2011 (Dec. 20, 2011), pp. 69-72.

N. F. Yan et al: "Solar rechargeable redox flow battery based on Li2WO4/LiI couples in dual-phase electrolytes", Journal of Materials Chemistry A: Materials for Energy and Sustainability, vol. 1, No. 24, May 1, 2013 (May 1, 2013), pp. 7012-7015.

Ping Liu et al: "A Solar Rechargeable Flow Battery Based on Photoregeneration of Two Soluble Redox Couples", Chemsuschem, vol. 6, No. 5, Apr. 4, 2013 (Apr. 4, 2013), pp. 802-806.

International Search Report and Written Opinion Corresponding to International Application No. PCT/US2016/033055, dated Jul. 21, 2016, 14 pages.

\* cited by examiner

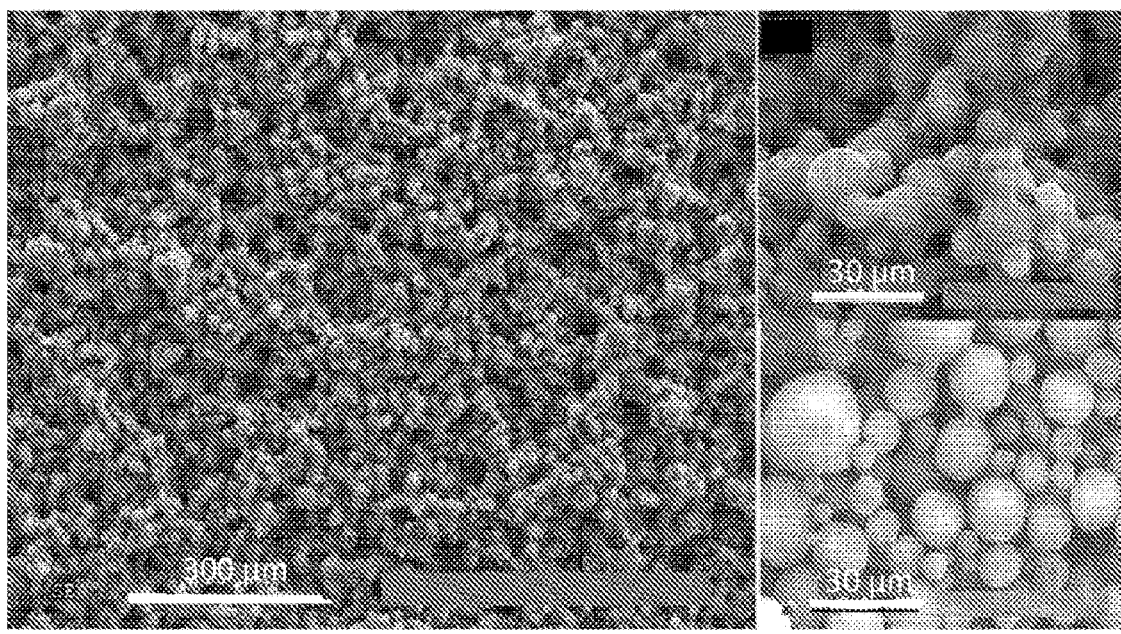
FIG. 7B
FIG. 7A
FIG. 7C
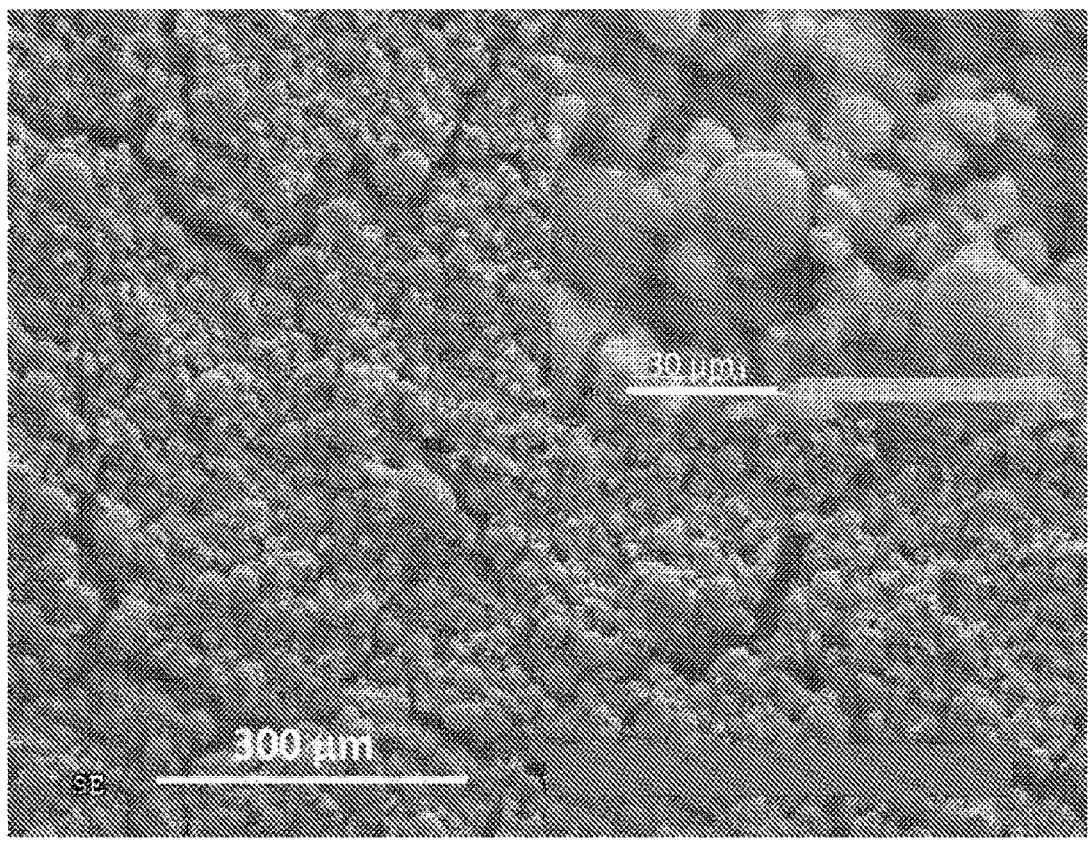
FIG. 8

SOLAR ENERGY SYSTEMS

CROSS REFERENCE TO RELATED APPLICATIONS

This application is a U.S. national stage application under 35 U.S.C. § 371 of International Application No. PCT/US2016/033055, filed on May 18, 2016, which claims priority pursuant to 35 U.S.C. § 119(e) to U.S. Provisional Patent Application Ser. No. 62/162,976, filed on May 18, 2015, and to U.S. Provisional Patent Application Ser. No. 62/175,999, filed on Jun. 15, 2015, each of which is hereby incorporated by reference in its entirety.

STATEMENT REGARDING FEDERALLY SPONSORED RESEARCH

This invention was made with government support under grant ECCS-1254915 awarded by the National Science Foundation (NSF).

FIELD

The present disclosure relates to solar energy systems and, more particularly, to photoelectrochemical (PEC) solar energy systems and applications thereof.

BACKGROUND

As renewable energy becomes more prevalent, there is a pressing need for large-scale and low-cost electrical energy storage. Solar power offers a virtually inexhaustible energy source. However, large-scale storage of solar energy has not previously been commercialized, primarily due to high initial cost and difficulty of scale up. In addition, many solid-state photovoltaic (PV) cells suffer from issues related to the intermittent supply of power. Such intermittent supply of power may be due, for instance, to day/night cycles and/or cloud cover.

Therefore, to complement solid-state PV cells, photoelectrochemical (PEC) solar energy systems have been developed. PEC solar energy systems generally provide energy through the in situ production of a chemical fuel, such as hydrogen ($H_2$) and/or oxygen ($O_2$) obtained from the splitting of water. The PEC reactions that provide in situ production of fuel are typically catalyzed by semiconductors. Additionally, such chemical fuels may be subsequently combined in a fuel cell to generate electric power. A fuel such as hydrogen may also be burned in a modified internal combustion engine, including for transportation applications. Compared to heat, mechanical, pump-hydro or gravity-based storage systems, chemical fuels produced by in situ PEC reactions combine the advantages of high energy density and ease of storage.

Unfortunately, however, it has previously been difficult to combine an in situ PEC storage component into a PV system. Major difficulties and shortcomings of some prior attempts have included corrosion problems, the need for expensive catalysts (such as Pt), and/or poor storage options for hydrogen. As a result, even four decades following the seminal Fujishima-Honda discovery of catalytic water photolysis, a commercial solar water splitting system has yet to be realized.

As an alternative to photocatalytic hydrogen production, some previous efforts have employed expensive and complex systems for storing chemical energy in a non-hydrogen form, such as systems requiring metal hydride/NiOOH rechargeable batteries or the integration of a hydrogen bromide-embedded Si system into a regenerative system. However, during photocharging in some such systems, PEC reaction products are deposited onto a storage electrode as a solid, thereby presenting some of the same problems that are prevalent in conventional batteries. Namely, the duration of run time can be limited by the thickness of the electrode (typically approximately 1.5 hours at maximum power), and cycle life can be limited by the formation of dendrites during charging.

Therefore, there remains a need for improved solar energy systems, including improved PEC solar energy systems.

SUMMARY

In one aspect, solar energy systems are described herein which, in some embodiments, can provide one or more advantages compared to some prior systems. For example, in some cases, a solar energy system described herein can exhibit improved photocharging current density. A solar energy system described herein, in some instances, can also provide high efficiency PEC conversion and storage of solar energy, including in a simultaneous manner. Moreover, in some embodiments, a solar energy system described herein comprises a PEC photoanode-electrolyte solution coupled with a high efficiency redox storage cell such that the electrolyte solution is common, thereby integrating both devices into one PEC storage cell unit. Additionally, in some cases, a system described herein mimics a redox flow battery in the discharge direction and thus may be regarded as a solar flow battery built into a PV-PEC framework. One advantage of the foregoing "single system" approach is that the "PV" and "solar battery" components may be separately optimized without compromising overall performance. Further, such a single system approach can obviate the need for externally connecting a (solid-state) PV system with a battery. Moreover, solar energy systems described herein, in some cases, permit decoupling of the functions of power density and energy density. For instance, solar energy systems described herein, in some implementations, are capable of decoupling the functions of power density and energy density by adjusting the size of the cell (for power density) and the volume of storage tanks (for energy density). Additionally, a solar energy system described herein, in some cases, also exhibits fast electrochemical kinetics, high charge/discharge round-trip efficiency (up to 90%), low capital cost, and minimal safety issues. A solar energy system described herein can also exhibit an excellent lifespan, lasting for up to tens of thousands of charge-discharge cycles.

In some embodiments, a solar energy system described herein comprises an electrochemical cell comprising a photoelectrode, a counter electrode, and an ion transport membrane disposed between the photoelectrode and the counter electrode. In some instances, the photoelectrode is a cathode, and the counter electrode is an anode. In other embodiments, the photoelectrode is a photoanode. Additionally, in some cases, the cell further comprises a storage electrode. The cell also comprises a first electrolyte solution disposed between and/or in contact or fluid communication with the photoelectrode and the ion transport membrane; and a second electrolyte solution disposed between and/or in contact or fluid communication with the ion transport membrane and the counter electrode. At least one of the first electrolyte solution and the second electrolyte solution comprises a solvated redox pair. For example, in some cases, the first electrolyte solution comprises a first solvated redox pair, and the second electrolyte solution comprises a second solvated redox pair. Additionally, the system further comprises one or more external electrical connections between electrodes of the system. For instance, in some embodiments, the system comprises an external electrical connection between the photoelectrode and the counter electrode. A system described herein may also comprise a second electrical connection between the counter electrode and the storage electrode, if a storage electrode is present. Moreover, in some embodiments, a system described herein further comprises an electrical switch disposed in one or more external electrical connections. In some cases, for instance, an electrical switch is disposed in the electrical connection between the photoelectrode and the counter electrode, wherein the electrical switch, in a closed position, completes an external circuit between the photoelectrode and the counter electrode. In some cases, a second electrical switch is also disposed in a second electrical connection between the counter electrode and a storage electrode.

Further, in some embodiments, a single cell described herein operates as a liquid junction photovoltaic cell under light conditions and also as a galvanic cell under dark conditions. For example, in some cases, the photoelectrode, the counter electrode, the first electrolyte solution, the ion transport membrane, the second electrolyte solution, and an external electrical connection of the system together define a liquid junction photovoltaic cell under light conditions, and the counter electrode, the photoelectrode (or storage electrode, if present), the first electrolyte solution, the ion transport membrane, the second electrolyte solution, and an external electrical connection of the system together define a galvanic cell under dark conditions.

In another aspect, methods of converting electromagnetic energy into electrical energy are described herein. In some embodiments, such a method comprises receiving electromagnetic radiation at a surface of the photoelectrode of a solar energy system described herein, thereby generating one or more photoelectrons and one or more corresponding holes within the photoelectrode. The method can further comprise transferring the photoelectrons to the counter electrode via the external electrical connection between the photoelectrode and the counter electrode, and transferring the holes to an oxidizable species of a first solvated redox pair at the photoelectrode, thereby oxidizing the oxidizable species to provide an oxidized species. Moreover, in some instances, a method described herein further comprises transferring the photoelectrons from the counter electrode to a reducible species of a second solvated redox pair at the counter electrode, thereby reducing the reducible species to provide a reduced species.

These and other embodiments are described in greater detail in the detailed description which follows.

BRIEF DESCRIPTION OF THE FIGURES

FIGS. 7A-7C illustrate scanning electron microscopy (SEM) data for photoelectrodes according to some embodiments described herein.

FIG. 8 illustrates SEM data for a photoelectrode according to one embodiment described herein.

DETAILED DESCRIPTION

Figure 1:
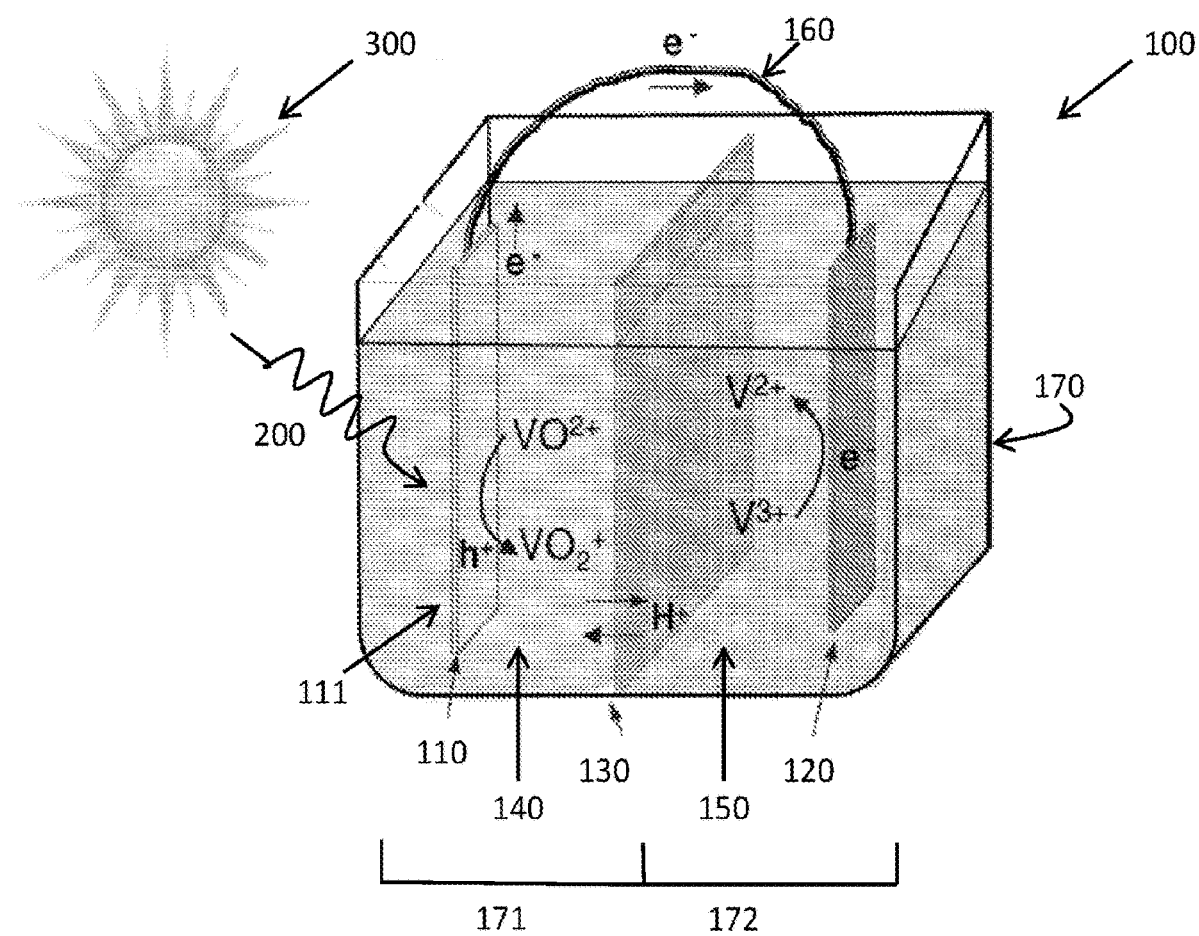
FIG. 1 illustrates a perspective view of a cell of a solar energy system according to one embodiment described herein.

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10, "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Further, when the word "substantially" is used to describe a degree of completeness or other similar degree of quality or quantity, it is to be understood that the degree is at least 80% of the complete or full quality or quantity. For instance, "substantially complete coverage" refers to coverage that is at least 80% complete.

I. Solar Energy Systems

In one aspect, solar energy systems are described herein. In some embodiments, a solar energy system described herein comprises an electrochemical cell comprising a photoelectrode, a counter electrode, and an ion transport membrane disposed between the photoelectrode and the counter electrode. In some cases, the cell further comprises a storage electrode. The cell also comprises a first electrolyte solution disposed between and/or in contact or fluid communication with the photoelectrode and the ion transport membrane; and a second electrolyte solution disposed between and/or in contact or fluid communication with the ion transport membrane and the counter electrode. At least one of the first electrolyte solution and the second electrolyte solution comprises a solvated redox pair. For example, in some cases, the first electrolyte solution comprises a first solvated redox pair, and the second electrolyte solution comprises a second solvated redox pair. Moreover, in some embodiments, the system further comprises a housing, wherein the housing contains the photoelectrode, counter electrode, ion transport membrane, first electrolyte solution, and second electrolyte solution.

Further, in some cases, the ion transport membrane of the system defines a first compartment and a second compartment of the cell, or of a housing of the system. In particular, the ion transport membrane separates the first compartment from the second compartment. In some such instances, the photoelectrode and the counter electrode are disposed in different compartments of the system. For example, in some embodiments, the photoelectrode and the first electrolyte solution are disposed in the first compartment, and the counter electrode and the second electrolyte solution are disposed in the second compartment. The storage electrode of the system, when present, can be disposed in either the first compartment or the second compartment.

Additionally, in some embodiments, a system described herein further comprises one or more external electrical connections between electrodes of the system. For instance, in some embodiments, the system comprises an external electrical connection between the photoelectrode and the counter electrode. A system described herein may also comprise a second electrical connection between the counter electrode and the storage electrode, if a storage electrode is present. Moreover, in some embodiments, a system described herein further comprises an electrical switch disposed in one or more external electrical connections. In some cases, for instance, an electrical switch is disposed in the electrical connection between the photoelectrode and the counter electrode, wherein the electrical switch, in a closed position, completes an external circuit between the photoelectrode and the counter electrode. In some cases, a second electrical switch is also disposed in a second electrical connection between the counter electrode and a storage electrode.

Further, in some embodiments, a single cell of a system described herein operates as a liquid junction photovoltaic cell under light conditions and also as a galvanic cell under dark conditions. For example, in some cases, the photoelectrode, the counter electrode, the first electrolyte solution, the ion transport membrane, the second electrolyte solution, and an external electrical connection of a system described herein together define a liquid junction photovoltaic cell under light conditions, and the counter electrode, the photoelectrode (or storage electrode, if present), the first electrolyte solution, the ion transport membrane, the second electrolyte solution, and an external electrical connection of the system together define a galvanic cell under dark conditions. "Light conditions," for reference purposes herein, include conditions in which electromagnetic radiation, such as solar electromagnetic radiation, is incident upon the photoelectrode, such as in an amount sufficient to provide a photocurrent of at least about 0.01 microamperes ($\mu A$) per square centimeter ($cm^2$). "Light conditions" are contrasted with "dark conditions," in which no light or substantially no light is incident upon the photoelectrode, at least not in a sufficient amount and/or at a sufficient wavelength to generate a photocurrent of greater than 0.01 $\mu A/cm^2$.

Some embodiments of solar energy systems according to the present disclosure will now be further described with reference to the figures. FIG. 1 illustrates, schematically, a perspective view of a cell of a solar energy system according to one embodiment described herein. As illustrated in FIG. 1, a solar energy system comprises an electrochemical cell (100) including a photoelectrode (110), a counter electrode (120), and an ion transport membrane (130) disposed between the photoelectrode (110) and the counter electrode (120). The ion transport membrane (130) in FIG. 1 is a proton ($H^+$) transport membrane (such as Nafion 117). However, other ion transport membranes can also be used. A first electrolyte solution (140) is disposed between and in contact with the photoelectrode (110) and the ion transport membrane (130), and a second electrolyte solution (150) is disposed between and in contact with the ion transport membrane (130) and the counter electrode (120). The first electrolyte solution (140) comprises a first solvated redox pair ($VO^{2+}$ and $VO_2^+$, in the embodiment illustrated in FIG. 1), and the second electrolyte solution (150) comprises a second solvated redox pair ($V^{2+}$ and $V^{3+}$, in the embodiment illustrated in FIG. 1). The first electrolyte solution (140) and the second electrolyte solution (150) interact with each other only through the ion transport membrane (130). In addition, the system comprises an external electrical connection (160) between the photoelectrode (110) and the counter electrode (120). Further, as illustrated in FIG. 1, the foregoing components of the cell (100) are disposed in a housing (170). The housing (170) comprises or is divided into a first compartment (171) and a second compartment (172), the compartments (171, 172) being defined, separated, or divided by the ion transport membrane (130). Additionally, the housing (170) is optically transparent or substantially optically transparent to light (200) having a wavelength operable to create a photoelectron in the photoelectrode (110) through the photoelectric effect. For reference purposes herein, the optical transparency of a housing or other element is relative to the total amount of incident radiation in a given wavelength range. Optical transparency can be measured with a broad spectral source or a narrow spectral source. Moreover, optical transparency of an element can be measured in any manner not inconsistent with the objectives of the present disclosure, including with any suitable instrumentation. For example, in some implementations, optical transparency is measured with a spectrometer such as a BECKMAN spectrometer. In some embodiments, a housing or other component described herein as optically transparent or "substantially" optically transparent exhibits an optical transparency of at least about 80 percent, at least about 90 percent, or at least about 95 percent in a given wavelength range, such as a wavelength range operable to create a photoelectron in the photoelectrode of a system described herein. For example, in some cases, a housing or component that is optically transparent or "substantially" optically transparent exhibits an optical transparency of at least about 80 percent, at least about 90 percent, or at least about 95 percent between about 300 nm and about 400 nm, between about 350 nm and about 750 nm or between about 380 nm and about 620 nm.

Moreover, as described further herein, the photoelectrode (110), the counter electrode (120), the first electrolyte solution (140), the second electrolyte solution (150), and the external electrical connection (160) together define a liquid junction photovoltaic cell under light conditions, such as light conditions provided by the incidence of light (200) on the surface (111) of the photoelectrode (110). As illustrated in FIG. 1, the incident light (200) comes from the sun (300). However, other light sources could also be used with the system if desired in a given instance. Turning again to FIG. 1, incident light (200) generates photoelectrons ($e^-$) and corresponding holes ($h^+$) in the photoelectrode (110). The photoelectrons ($e^-$) move from the photoelectrode (110) to the counter electrode (120) through the external electrical connection (160), as indicated by the directional arrows in FIG. 1. Additionally, a reduced but oxidizable species (namely the V(IV) species $VO^{2+}$ in FIG. 1) is oxidized at the photoelectrode (110) by the holes ($h^+$) to provide an oxidized species (namely the V(V) species $VO_2^+$ in FIG. 1). At the counter electrode (120), an oxidized but reducible species (namely $V^{3+}$ in FIG. 1) is reduced by the electrons ($e^-$) to provide a reduced species (namely $V^{2+}$ in FIG. 1). When a load (not shown) is disposed in the external electrical connection (160), the flowing electrons ($e^-$) can be used to provide electrical energy to the load, which may be an electrically powered device or an electrical energy storage device. Such a load may also be part of a power grid or other electrical energy distribution network.

In addition, the system (100) can also provide electrical energy to a load under dark conditions. Specifically, the photoelectrode (110), the counter electrode (120), the first electrolyte solution (140), the second electrolyte solution (150), and the external electrical connection (160) together define a galvanic cell under dark conditions. In this arrangement, the reverse of the redox reactions described above can occur, including in a thermodynamically favorable or "downhill" direction (based on change in Gibbs free energy, $\Delta G$), with the result that electrons flow from the counter electrode (120) toward the photoelectrode (110).

The foregoing embodiments associated with FIG. 1 include "full-cell" solar energy systems. However, it is to be understood that other configurations may also be used in accordance with the present disclosure. For example, in some cases, a solar energy system described herein is a half-cell system. In such an instance, the ion transport membrane can be omitted. In one non-limiting example, a solar energy system half-cell comprises a photoelectrode (such as a photoelectrode described herein for a full-cell system); a counter electrode (such as a counter electrode described herein for a full-cell system); and an electrolyte solution disposed in contact with the photoelectrode and the counter electrode, wherein the electrolyte solution comprises a solvated redox pair (such as a solvated redox pair described herein for a full-cell system). The system may also comprise an external electrical connection between the photoelectrode and the counter electrode. Further, in some embodiments, the photoelectrode, the counter electrode, the electrolyte solution, and the external electrical connection together define a liquid junction photovoltaic half-cell under light conditions, and a galvanic half-cell under dark conditions. It is further to be understood that, in some such embodiments, the photoelectrode and the counter electrode are disposed in a single housing or chamber, such that the electrolyte solution flows freely between the photoelectrode and the counter electrode, with no ion transport membrane or other similar barrier between the photoelectrode and the counter electrode.

Figure 2:
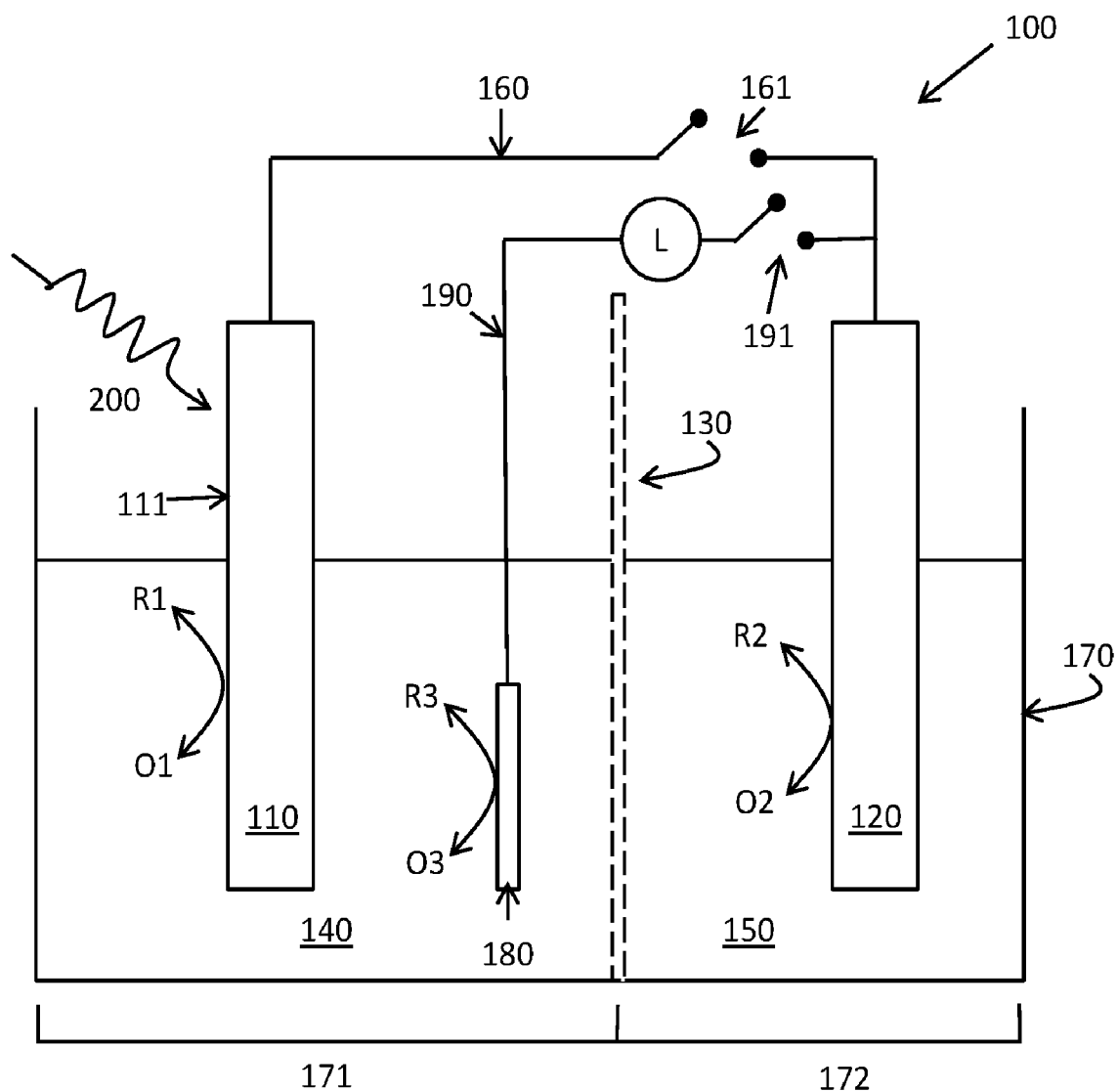
FIG. 2 illustrates a sectional view of a cell of a solar energy system according to one embodiment described herein.

Referring again to the figures, FIG. 2 schematically illustrates a sectional view of a cell of a solar energy system according to another embodiment described herein. As illustrated in FIG. 2, a solar energy system comprises an electrochemical cell (100) comprising a photoelectrode (110), a counter electrode (120), and an ion transport membrane (130) disposed between the photoelectrode (110) and the counter electrode (120). The ion transport membrane (130) in FIG. 2, in some cases, is a proton ($H^+$) transport membrane. Other ion transport membranes may also be used. A first electrolyte solution (140) is disposed between and in contact with the photoelectrode (110) and the ion transport membrane (130), and a second electrolyte solution (150) is disposed between and in contact with the ion transport membrane (130) and the counter electrode (120). The first electrolyte solution (140) comprises a first solvated redox pair (represented generically as R1 and O1 in FIG. 2), and the second electrolyte solution (150) comprises a second solvated redox pair (represented generically as R2 and O2).

In addition, the cell (100) comprises a storage electrode (180). As illustrated in FIG. 2, the ion transport membrane (130) defines a first compartment (171) and a second compartment (172) of the system, the first compartment (171) comprising the photoelectrode (110) and the first electrolyte solution (140) and the second compartment (172) comprising the counter electrode (120) and the second electrolyte solution (150). In the embodiment of FIG. 2, the storage electrode (180) is disposed in the first compartment (171) of the housing (170). As in FIG. 1, the housing (170) of FIG. 2 can be substantially optically transparent to light (200) having a wavelength operable to create a photoelectron in the photoelectrode (110) through the photoelectric effect. More specifically, the storage electrode (180) is an individual electrode disposed within, and in fluid communication with, the first electrolyte solution (140). However, other configurations are also possible. For example, in some cases, the storage electrode of a system described herein is a coating on the photoelectrode of the system. The storage electrode and the photoelectrode of a system described herein may also together form a composite electrode. In other instances, the storage electrode is disposed in the second compartment. In some such embodiments, the storage electrode is an individual electrode disposed within, and in fluid communication with, the second electrolyte solution (150). In other cases, the storage electrode is a coating on the counter electrode. Further, in some instances, the storage electrode and the counter electrode of a system described herein together form a composite electrode.

Moreover, the system further comprises a first external electrical connection (160) between the photoelectrode (110) and the counter electrode (120), and a second external electrical connection (190) between the counter electrode (120) and the storage electrode (180). In addition, the system (100) also comprises a first electrical switch (161) disposed in the first external electrical connection (160) between the photoelectrode (110) and the counter electrode (120). For the sake of clarity, the first electrical switch (161) is illustrated in FIG. 2 in an open position. However, the first electrical switch (161), in a closed position (not shown), completes an external circuit between the photoelectrode (110) and the counter electrode (120). In the embodiment of FIG. 2, the system further comprises a second electrical switch (191) disposed in the second external electrical connection (190) between the counter electrode (120) and the storage electrode (180). Again, for the sake of clarity, the second electrical switch (191) is illustrated in FIG. 2 in an open position. However, the second electrical switch (191), in a closed position, completes an external circuit between the counter electrode (120) and the storage electrode (180). It is to be understood that other configurations of electrical connections are also possible. For example, in some cases, a system described herein comprises a single electrical switch disposed in the first external electrical connection between the photoelectrode and the counter electrode of the system, or in the second external electrical connection between the counter electrode and the storage electrode. In such instances, the electrical switch, in a first position, completes an external circuit between the photoelectrode and the counter electrode, and, in a second position, completes an external circuit between the counter electrode and the storage electrode.

Moreover, as described further herein, the photoelectrode (110), the counter electrode (120), the ion transport membrane (130), the first electrolyte solution (140), the second electrolyte solution (150), and the first external electrical connection (160) together define a liquid junction photovoltaic cell under light conditions, such as light conditions provided by the incidence of light (200) on the surface (111) of the photoelectrode (110). Specifically, incident light (200) can generate one or more photoelectrons (not shown) and one or more corresponding holes (not shown) in the photoelectrode (110). The photoelectrons move from the photoelectrode (110) to the counter electrode (120) through the first external electrical connection (160), in a manner similar to that illustrated in FIG. 1. Additionally, a reduced but oxidizable species (R1) is oxidized at the photoelectrode (110) by the one or more holes to provide an oxidized species (O1). At the counter electrode (120), an oxidized but reducible species (O2) is reduced by the electrons to provide a reduced species (R2). When a load (not shown) is disposed in the first external electrical connection (160), the flowing electrons can be used to provide electrical energy to the load, which may be an electrically powered device or an electrical energy storage device. Such a load may also be part of a power grid or other electrical energy distribution network.

In addition, the system can also provide electrical energy to a load under dark conditions. Specifically, the photoelectrode (110) or the storage electrode (180), the counter electrode (120), the ion transport membrane (130), the first electrolyte solution (140), the second electrolyte solution (150), and the first (160) or second (190) external electrical connection together define a galvanic cell under dark conditions. In this arrangement, the reverse of the redox reactions described above can occur, including in a thermodynamically favorable direction (based on $\Delta G$), with the result that electrons flow from the counter electrode (120) toward the photoelectrode (110) or the storage electrode (180). However, it is to be understood that, when the storage electrode (180) is part of the galvanic cell, an additional redox reaction (such as between a reduced species R3 and an oxidized species O3) can take place. In some cases, this additional redox reaction involves species that form or define all or part of the storage electrode, as described further hereinbelow.

The foregoing embodiments associated with FIG. 2 include "full-cell" solar energy systems. However, it is to be understood that other configurations may also be used. For example, in some cases, a solar energy system described herein is a half-cell system. In such an instance, the ion transport membrane can be omitted. In one non-limiting example, a solar energy system half-cell comprises a photoelectrode (such as a photoelectrode described herein for a full-cell system); a counter electrode (such as a counter electrode described herein for a full-cell system); a storage electrode (such as a storage electrode described herein for a full-cell system); and an electrolyte solution disposed in contact with the photoelectrode, the counter electrode, and the storage electrode, wherein the electrolyte solution comprises a solvated redox pair (such as a solvated redox pair described herein for a full-cell system). The system may also comprise an external electrical connection between the photoelectrode and the counter electrode, and/or between the counter electrode and the storage electrode. Further, in some embodiments, the photoelectrode, the counter electrode (and/or storage electrode), the electrolyte solution, and the external electrical connection together define a liquid junction photovoltaic half-cell under light conditions, and a galvanic half-cell under dark conditions. It is further to be understood that, in some such embodiments, the photoelectrode, the counter electrode, and the storage electrode are disposed in a single housing or chamber, such that the electrolyte solution flows freely between the photoelectrode and the counter electrode, with no ion transport membrane or other similar barrier between the photoelectrode and the counter electrode.

In addition to embodiments described hereinabove in the context of FIG. 1 and FIG. 2, other configurations of solar energy systems are also possible in accordance with the present disclosure. For example, a solar energy system described herein, such as a full-cell system, can be configured as a "flow reactor." In such embodiments, the electrolytes of the system can be forced or caused to flow over a surface of the photoelectrode and/or over a surface of the counter electrode. For example, in some instances, a solar energy storage system described herein comprises a photoelectrode, a counter electrode, and an ion transport membrane disposed between the photoelectrode and the counter electrode, wherein the photoelectrode comprises, defines, or forms a photoelectrode layer, the counter electrode comprises, defines, or forms a counter electrode layer; and the ion transport membrane comprises, defines, or forms a membrane layer. Additionally, the system further comprises a first electrolyte solution disposed in contact or fluid communication with the photoelectrode and the ion transport membrane, and a second electrolyte solution disposed in contact or fluid communication with the ion transport membrane and the counter electrode. Moreover, the first electrolyte solution comprises a first solvated redox pair, and the second electrolyte solution comprises a second solvated redox pair. Further, the first electrolyte solution is disposed in one or more first flow channels, the first flow channels being disposed in a first flow channel layer disposed between the photoelectrode layer and the membrane layer. Similarly, the second electrolyte solution is disposed in one or more second flow channels, the second flow channels being disposed in a second flow channel layer disposed beneath the counter electrode layer. In addition, in some cases, the first flow channels and/or the second flow channels comprise microchannels. A "microchannel," for reference purposes herein, has a length in one dimension or two dimensions, orthogonal to the primary direction of fluid flow within the channel, of 10-5000 µm, 10-1000 µm, or 10-500 µm. For instance, in some cases, the microchannels have lengths in the two "short dimensions" (as opposed to the relatively long dimension corresponding to the primary direction of fluid flow within the channel) of 0.01-0.9 mm and 0.5-5 mm. Not intending to be bound by theory, it is believed that use of microchannels can provide electrolytes with a greater surface area to interact with the electrodes, without increasing the design weight of the entire cell. Further, the use of microchannels can also provide a greater flow velocity of the electrolyte solution, thereby facilitating faster charge-discharge cycles.

Moreover, in some embodiments, a solar energy system having a "flow reactor" configuration such as described above further comprises a storage electrode, wherein the storage electrode comprises, defines, or forms a storage electrode layer. Such a storage electrode layer can be disposed above or below the counter electrode layer (or photoelectrode layer) of the system, and may be in direct contact with or immediately adjacent to the counter electrode layer (or photoelectrode layer). It is also possible, in some instances, for the storage electrode layer to be a coating layer on the counter electrode layer (or photoelectrode layer) or to form a composite electrode layer, together with the counter electrode layer (or photoelectrode layer), including in a manner analogous to that described above for systems that do not necessarily have a "flow reactor" configuration.

In addition, as with other embodiments described herein, the foregoing "flow reactor" systems also comprises one or more external electrical connections for forming one or more external circuits. For example, in some cases, the system comprises an external electrical connection between the photoelectrode and the counter electrode. In addition, as with other embodiments described herein that do not necessarily comprise layered components, the photoelectrode, the counter electrode, the first electrolyte solution, the second electrolyte solution, and the external electrical connection together define a liquid junction photovoltaic cell under light conditions, and also define a galvanic cell under dark conditions.

Moreover, in some cases, the layers of a system described above are all parallel or substantially parallel to one another, or are disposed in a "stacked" configuration. For example, in some instances, the photoelectrode layer, the counter electrode layer, the membrane layer, the first flow channel layer, and the second flow channel layer are substantially parallel layers and are arranged in a stacked configuration. A "layer" of a solar energy system described herein having a flow reactor configuration, for reference purposes herein, is a generally planar or sheet-like structure that extends further in two orthogonal dimensions (e.g., the x-direction or x-dimension, and the y-direction or y-dimension) than in a third orthogonal dimension (e.g., the z-direction or z-dimension). Such a layer can be a relatively thin layer (i.e., in which the size of the layer in the z-direction is relatively small) or a relatively thick layer (i.e., in which the size of the layer in the z-direction is relatively large). It is further to be understood that a layer that is "above" or "beneath" another layer is positioned "above" or "beneath" the other layer in a direction corresponding to the thinnest dimension of the layers, which is generally a common thinnest dimension (which may be denoted, for instance, as the z-direction, z-axis, or z-dimension of the stack). Moreover, for reference purposes herein, the photoelectrode layer is positioned toward the "top" of the system (or stack of layers), while the counter electrode layer is positioned toward the "bottom" of the system (or stack of layers).

Additionally, in some embodiments, a system described herein further comprises an optically transparent or substantially optically transparent cover layer disposed over the photoelectrode layer. In particular, the optically transparent or substantially optically transparent layer has a high optical transparency in a region of the electromagnetic spectrum corresponding to a photocatalytic region of the photoelectrode, such as 350-750 nm or 380-620 nm. For example, in some cases, an optically transparent or substantially optically transparent cover layer described herein has an optical transparency of at least 80%, at least 85%, at least 90%, or at least 95% at 350-750 nm or 380-620 nm. Moreover, the cover layer of a solar energy system described herein can be impermeable or substantially impermeable to the electrolyte solutions of the system, such that the cover layer prevents the leakage of electrolyte solution from the photoelectrode layer, while also allowing incident electromagnetic radiation to impinge on the photoelectrode layer. Further, in some cases, the transparent cover layer is immediately adjacent to the photoelectric layer. In other instances, the two layers are not immediately adjacent.

A system described herein may also comprise a porous filter layer disposed between the photoelectrode layer and the first flow channel layer. A "porous" layer or component, for references purposes herein, is a layer comprising pores permitting the flow of a fluid through the layer or component. In some embodiments, a porous layer described herein has a microporous and/or macroporous pore structure. A porous layer or component having a macroporous and/or microporous pore structure, for reference purposes herein, comprises macropores and/or micropores, respectively. Macropores, in some embodiments, can have a diameter or size greater than about 100 µm. In some cases, macropores can have a diameter or size between about 100 µm and about 1000 m, between about 200 µm and about 800 µm, or between about 300 µm and about 700 µm. In contrast, micropores have smaller sizes. For example, in some embodiments, micropores have a diameter or size of less than about 50 µm or less than about 10 µm. In some cases, micropores have a diameter or size between about 50 nm and about 50 µm, between about 100 nm and about 20 µm, or between about 500 nm and about 10 µm. As understood by one of ordinary skill in the art, the diameter or size of a pore is the diameter or size of the opening of the pore, as opposed to the length of the pore. Moreover, the pores of a porous layer or other component described herein can have any shape. Thus, the "diameters" or "sizes" recited herein are not limited to pores having particular shapes such as circular shapes but can instead refer to the longest dimension of a pore opening.

Figure 3B:
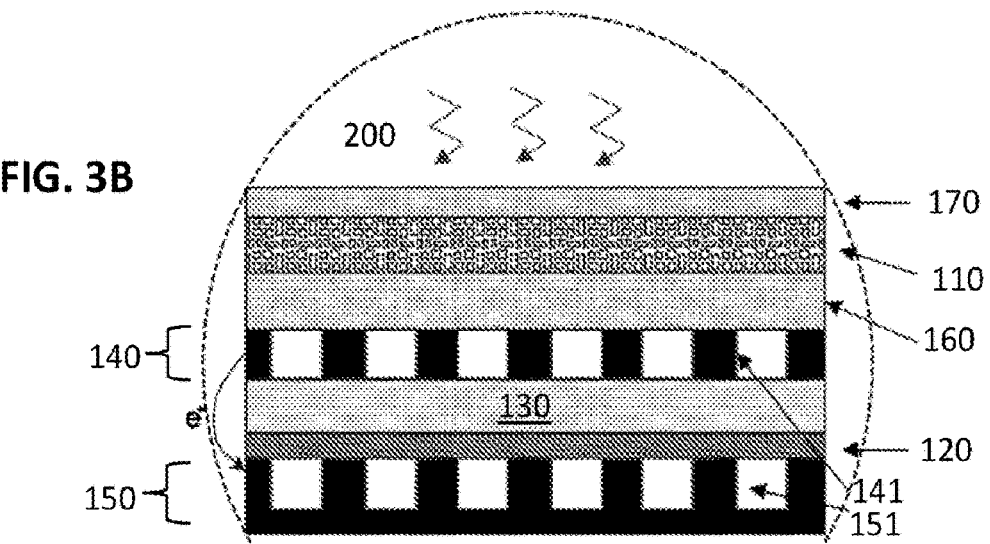
FIG. 3B illustrates a sectional view of a portion of the solar energy system of FIG. 3A.
Figure 3A:
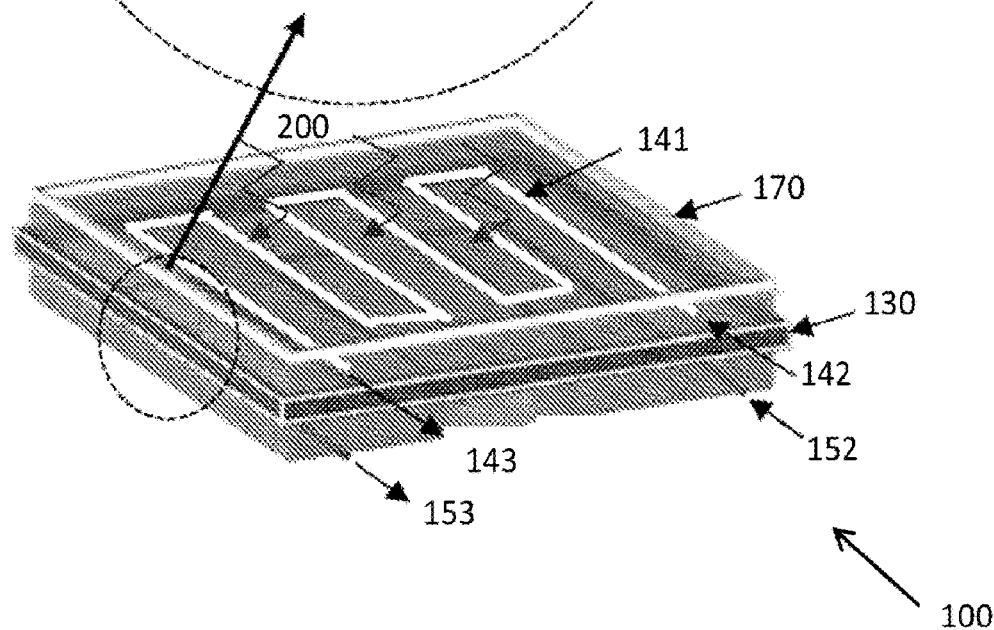
FIG. 3A illustrates a perspective view of a solar energy system according to one embodiment described herein.
Figure 4A:
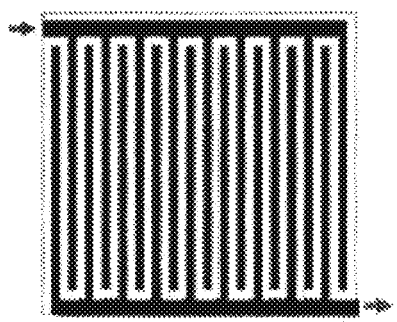
FIGS. 4A-4D illustrate plan views of flow channels of a solar energy system according to some embodiments described herein.
Figure 4B:
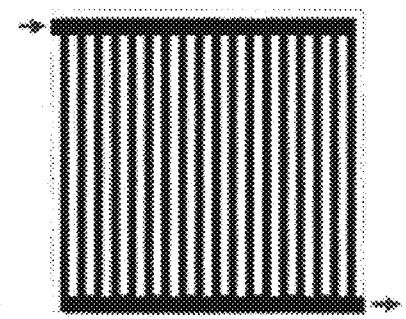
Figure 4C:
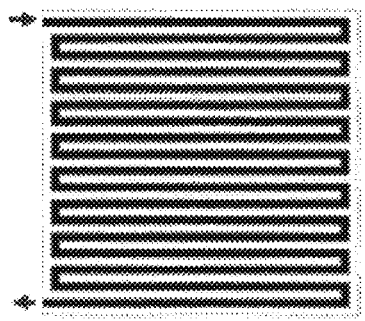
Figure 4D:
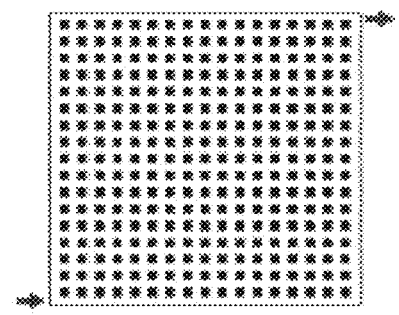

A solar energy system having a flow reactor configuration according to one embodiment described herein is illustrated in FIG. 3A and FIG. 3B. FIG. 3A illustrates a perspective view of the flow reactor cell component (100) of the solar energy system. FIG. 3B illustrates a sectional view of the enlarged portion of the flow rector (100) within the circular inset of FIG. 3A. With reference to FIG. 3A and FIG. 3B, the solar energy flow reactor (100) comprises a photoelectrode layer (110), a counter electrode layer (120), and an ion transport membrane layer (130) disposed between the photoelectrode layer (110) and the counter electrode layer (120). Additionally, the flow reactor (100) further comprises a first flow channel layer (140) disposed between the photoelectrode layer (110) and the ion transport membrane layer (130). The first flow channel layer (140) comprises a first electrolyte solution (not shown) disposed in a plurality of first flow channels (141) disposed in contact and/or fluid communication with the photoelectrode layer (110) and the ion transport membrane layer (130). The flow reactor (100) also comprises a second flow channel layer (150) disposed beneath the counter electrode layer (120). The second flow channel layer (150) comprises a second electrolyte solution (not shown) disposed in a plurality of second flow channels (151) in contact and/or fluid communication with the ion transport membrane layer (130) and the counter electrode layer (120). Moreover, the flow reactor (100) further comprises a porous filter layer (160) disposed between the photoelectrode layer (110) and the first flow channel layer (140), as well as an optically transparent or substantially optically transparent cover layer (170) disposed above the photoactive electrode layer (110). The cover layer (170) substantially covers the top surface of the photoelectrode layer (110), thereby preventing leakage of fluid out of the lower layers of the flow reactor. It is further to be noted that, in the embodiment illustrated in FIG. 3A and FIG. 3B, the photoelectrode layer is porous, thereby improving access of the first electrolyte solution to the photoactive surfaces of the photoelectrode layer.

Moreover, though not explicitly shown in FIG. 3A and FIG. 3B, it is to be understood that the solar energy system further comprises one or more external electrical connections that can form an external electrical circuit between various components of the flow reactor (100), including in a manner analogous to that described above for solar energy systems that do not necessarily have a "flow reactor" configuration. For example, in some cases, the system (100) comprises an external electrical connection between the photoelectrode layer and the counter electrode layer. If a storage electrode layer is also present, a system described herein may also comprise a second external electrical connection between the counter electrode layer and the storage electrode layer.

In operation, a solar energy system such as that illustrated in FIG. 3A and FIG. 3B can provide electrical energy under both light and dark conditions. Specifically, with reference to FIG. 3A and FIG. 3B, incident light (200) can generate one or more photoelectrons (not shown) and one or more corresponding holes (not shown) in the photoelectrode layer (110). The photoelectrons can move from the photoelectrode layer (110) to the counter electrode layer (120) through a first external electrical connection (not shown), in a manner similar to that illustrated in FIG. 1. Additionally, a reduced but oxidizable species (not shown) present in the first electrolyte solution (not shown) can be oxidized in the photoelectrode layer (110) by the one or more holes to provide an oxidized species (not shown). In the counter electrode layer (120), an oxidized but reducible species (not shown) present in the second electrolyte solution (not shown) is reduced by the electrons to provide a reduced species (not shown). When a load (not shown) is disposed in the first external electrical connection, the flowing electrons can be used to provide electrical energy to the load, which may be an electrically powered device or an electrical energy storage device. Such a load may also be part of a power grid or other electrical energy distribution network. Moreover, the flow reactor (100) can also provide electrical energy to a load under dark conditions. Specifically, the photoelectrode layer (110) (or the storage electrode layer, if present), the counter electrode layer (120), the ion transport membrane layer (130), the first electrolyte solution, the second electrolyte solution, and one or more external electrical connections can together define a galvanic cell under dark conditions. In this arrangement, the reverse of the redox reactions described above can occur, including in a thermodynamically favorable direction (based on $\Delta G$), with the result that electrons flow from the counter electrode layer (120) toward the photoelectrode layer (110) (or the storage electrode layer, if present).

It is further to be noted that the foregoing electrical energy generation steps can be carried out while the first and second electrolyte solutions are forced or flowed through the first and second flow channels, respectively. For instance, with reference to FIG. 3A, the first electrolyte solution can be flowed or forced into a first inlet (142) of the first flow channel layer (140), through a length of a first flow channel (141), and then out of a first outlet (143) of the first flow channel layer (140). Similarly, the second electrolyte solution can be flowed or forced into a second inlet (152) of the second flow channel layer (150), through a length of a second flow channel (151), and then out of a second outlet (153) of the second flow channel layer (150).

Further, the flow channels of a "flow reactor" solar energy system described herein can be configured in a manner other than the manner illustrated in FIG. 3A and FIG. 3B. For example, FIGS. 4A-4D illustrate plan views of flow channels (141) of a flow channel layer (140) of a solar energy system according to some embodiments described herein. It is to be understood that such flow channels (141) and such a flow channel layer (140) can be used in the first flow channel layer and/or the second flow channel layer of a flow reactor cell described herein. In addition, it is to be understood that the inlets and outlets of the flow channel layers (140) are indicated with arrows in FIGS. 4A-4D.

Moreover, the first and/or second electrolyte solution can be flowed or forced through a system described herein in any manner not inconsistent with the objectives of the present disclosure. In some cases, an electrolyte solution is flowed or forced through a system using one or more of natural flow due to convection, flow due to gravity, flow due to the Venturi effect, or flow due to applied external work, such as mechanical or electromechanical work. More specifically, flow due to convection may be due to a difference in temperature between a first portion of the electrolyte solution that is in contact with the electrode, absorbing some of the electromagnetic radiation and thus heating, and a second portion of the electrolyte solution located away from the electromagnetic radiation that is relatively cool. Flow due to gravity effects may be due to the difference in specific gravities of the ionized electrolyte and the non-ionized electrolyte. Flow due to applied external force may be achieved using a mechanical pump in series with the one or more flow channels.

As illustrated in FIG. 3A and FIG. 3B, the "flow reactor" (100) has a full-cell configuration. However, it is to be understood that a "flow reactor" can also be configured as a half-cell if desired. In such an instance, a single flow channel layer is disposed between a photoelectrode layer and a counter electrode layer. The three layers can be immediately adjacent layers. Further, in some such embodiments, the three layers are packaged within a housing or bounded by one or more cover layers, such as described above.

Not intending to be bound by theory, it is believed that using a "flow reactor" configuration such as described herein may provide one or more additional advantages compared to some other solar energy systems described herein. For example, a flow reactor configuration, in some embodiments, provides one or more of the following: better interaction of electrolytes with electrodes; faster energy conversion and storage; increase in the efficiency of energy conversion and storage; miniaturization of the entire PEC cell; elimination or reduction of variation in electrolyte composition; and improved photoelectrode stability. In addition, it is further to be noted that arranging multiple flow reactor cells described herein in an array (as an "energy unit") could permit easy maintenance of the complete solar energy system, such as through the facile replacement of single PEC cells, as well as customization of the design of the total energy unit without having to redesign single PEC cells.

Turning now to specific components of solar energy systems described herein, solar energy systems described herein comprise a photoelectrode. The photoelectrode, in some instances, is a photoanode of the system. Additionally, the photoelectrode can have any structure and be formed from any material not inconsistent with the objectives of the present disclosure, provided that the photoelectrode is operable to generate an electron when irradiated with light, such as through the photoelectric effect. In some cases, the photoelectrode is formed from a semiconductor material, such as an inorganic semiconductor material having a bandgap of 2.0 eV to 3.2 eV. Further, in some instances, the photoelectrode is formed from a metal oxide. More particularly, suitable metal oxides can include transitional metal oxides. For example, in some embodiments, the photoelectrode is formed from $TiO_2$ or $WO_3$. Additional examples of materials suitable for forming a photoelectrode of a solar energy system described herein include GaN, $SnO_2$, SiC, CdS, CdTe, GaAs, Si, and InN. Other materials may also be used.

Moreover, in some cases, the photoelectrode of a system described herein comprises a hybrid or composite electrode. A "hybrid" or "composite" electrode, as understood by one of ordinary skill in the art, refers to an electrode formed from more than one material. Further, in some cases, a hybrid or composite electrode is formed from a plurality of differing types of materials, such as from a metal oxide and an organic material, or from a relatively high bandgap semiconductor and a relatively low bandgap semiconductor. Additionally, in some embodiments, a hybrid or composite photoelectrode described herein is formed from a first material (such as a first semiconductor material) that photogenerates an electron and hole (e.g., through the photoelectric effect) and a second material (such as a second semiconductor material) that has a band structure that differs from the band structure of the first material such that the photogenerated electron and hole are less likely to recombine within the photoelectrode than would be the case if the photoelectrode were formed from the first material alone. In some such instances, the second material exhibits electrochromism or photochromism. For instance, in some cases, the first material and the second material have differing valence band and/or conduction band energy levels (e.g., relative to vacuum). More specifically, in some embodiments, the second material has a more positive valence band than the first material, and/or a more positive conduction band than the first material. Additionally, in some embodiments, the first and second materials have differing bandgap energies, as described above. Moreover, in some such cases, the difference in the band gap energies of the two materials is at least about 0.5 eV. In some instances, the difference in the band gap energies is 0.4-0.8 eV, 0.4-0.6 eV, or 0.5-0.7 eV. Hybrid or composite photoelectrodes formed from two differing materials such as described above, in some cases, permit a photogenerated electron to be "stored" in the photoelectrode for a period of time following generation of the photoelectron, resulting in a delayed photocurrent. Such "storage" is described in further detail in the specific examples hereinbelow. Additionally, such storage of photogenerated electrons can help a system described herein provide electrical energy or even "photocharge" under dark conditions.

A hybrid or composite photoelectrode as described above can be formed from any combination of materials not inconsistent with the objectives of the present disclosure. In some cases, a hybrid or composite photoelectrode such as described above can be formed from, consist of, or consist essentially of a first material comprising a semiconductor material such as described above for non-composite photoelectrodes, and a second material comprising an inorganic transition metal oxide, a hexacyanoferrate, a metal coordination complex, a viologen compound, a conjugated conducting polymer, and/or a buckminsterfullerene. Non-limiting examples of transition metal oxides suitable for use as the second material of a hybrid photoelectrode described herein include an iridium oxide, rhodium oxide, ruthenium oxide, tungsten oxide, manganese oxide, cobalt oxide, niobium oxide vanadium oxide (such as $V_2O_5$), molybdenum oxide, or nickel oxide (such as a hydrated nickel oxide). One non-limiting examples of a hexacyanoferrate is Prussian blue. Non-limiting examples of metal coordination complexes suitable for use as the second material of a hybrid photoelectrode include metallophthalocyanines and polypyridyl complexes of transition metals, such as bipyridyl complexes of iron, ruthenium, or osmium. Non-limiting examples of conjugated conducting organic polymers suitable as the second material of a composite photoelectrode described herein include poly(thiophene), poly(pyrrole), and polyaniline. Specific combinations of materials that may be used to form a hybrid or composite photoelectrode described herein are also provided in Table I below. In addition, Table II provides relative amounts of such first and second materials in a hybrid or composite photoelectrode described herein. In Table II, the amounts are provided as weight percents, based on the total weight of the photoelectrode. Moreover, it is further to be noted that the first and second materials of a hybrid photoelectrode described herein, including the first and second materials listed in Table I, are generally configured in the hybrid photoelectrode to be in physical and/or electrical contact with one another such that charge transport between the materials is facilitated.

TABLE I

Hybrid Photoelectrode Materials.

| First Material | Second Material |
| --- | --- |
| $TiO_2$ | $WO_3$ |
| $TiO_2$, GaN, $SnO_2$, SiC, CdS, CdTe, GaAs, Si, or InN | Oxide of Ir, Rh, Ru, W, Mn, Co, Nb, V, Mo, or Ni |
| $TiO_2$, GaN, $SnO_2$, SiC, CdS, CdTe, GaAs, Si, or InN | A hexacyanoferrate |
| $TiO_2$, GaN, $SnO_2$, SiC, CdS, CdTe, GaAs, Si, or InN | $[M^{II}(bipy)_3]^{2+}$, where M = Fe, Ru, or Os, and bipy = 2,2'-bipyridine |
| $TiO_2$, GaN, $SnO_2$, SiC, CdS, CdTe, GaAs, Si, or InN | Viologen |
| $TiO_2$, GaN, $SnO_2$, SiC, CdS, CdTe, GaAs, Si, or InN | Poly(thiophene), Poly(Pyrrole), or Polyaniline |
| $TiO_2$, GaN, $SnO_2$, SiC, CdS, CdTe, GaAs, Si, or InN | Buckminsterfullerene |

TABLE II

Amounts of Materials for Hybrid Photoelectrodes (Weight Percents).

| First Material | Second Material |
| --- | --- |
| 50-99 | 1-50 |
| 50-98 | 2-50 |
| 60-99 | 1-40 |
| 60-98 | 2-40 |
| 70-99 | 1-30 |
| 70-98 | 2-30 |
| 75-99 | 1-25 |
| 75-98 | 2-25 |
| 75-95 | 5-25 |
| 75-90 | 10-25 |
| 80-99 | 1-20 |
| 80-98 | 2-20 |
| 80-95 | 5-20 |
| 85-99 | 1-15 |
| 85-98 | 2-15 |
| 85-95 | 5-15 |
| 90-99 | 1-10 |
| 90-98 | 2-10 |

It is further to be understood that a photoelectrode described herein can have any size, shape, or form not inconsistent with the objectives of the present disclosure. For example, in some cases, the photoelectrode is in the form of a solid plate, a mesh plate, a wire gauze, or a plate with containing perforations or through holes.

Additionally, a photoelectrode described herein can have one or more nanostructured components. For instance, in some cases, a photoelectrode can comprise or be formed at least in part from $TiO_2$ nanoribbons having an average width of 10-500 nm or 50-150 nm; an average thickness of 1-50 nm or 5-15 nm; and an average length of 1-50 μm or 3-20 μm. In some embodiments, the $TiO_2$ nanoribbons have an average width of 50-150 nm or 80-110 nm; an average thickness of 5-15 nm or 8-12 nm; and an average length of 3-20 μm. Other dimensions are also possible. Further, in some cases, the $TiO_2$ nanoribbons are surface treated with $TiCl_4$, as described further hereinbelow in the specific examples.

Solar energy systems described herein also comprises a counter electrode. The counter electrode can be formed from any material not inconsistent with the objectives of the present disclosure. For example, in some cases, the counter electrode is formed from a metal, such as a noble metal. In some embodiments, the counter electrode is formed from platinum (Pt), gold (Au), silver (Ag), or a mixture, combination, or alloy thereof. The counter electrode may also be formed from non-noble metal materials. In some cases, the counter electrode is formed from a conductive organic material, such as a conductive organic polymer, or from a conductive inorganic material that is substantially free of noble metals. Additionally, the counter electrode may be in the form of a solid plate, a mesh plate, a wire gauze, or a plate containing perforations or through holes.

Additionally, solar energy systems described herein further, in some embodiments, comprise an ion transport membrane disposed between the photoelectrode and the counter electrode of the system. Any ion transport membrane not inconsistent with the objectives of the present disclosure may be used. For instance, in some cases, the ion transport membrane comprises a proton transport or exchange membrane. Non-limiting examples of proton transport membranes suitable for use in some embodiments described herein include Nafion and carbon membrane materials. Other materials may also be used.

Solar energy systems described herein, in some embodiments, also comprise a storage electrode. The storage electrode can comprise or be formed from any material not inconsistent with the objectives of the present disclosure. In some cases, the storage electrode is formed from a solid material that can participate in a redox reaction with an electrolyte solution of the solar energy system, particularly an electrolyte solution that is in fluid communication with the storage electrode. In other instances, the storage electrode is formed from a material that can serve as a host for intercalated redox reaction products of an electrolyte solution described herein. In some embodiments, the storage electrode is formed from a nickel oxide or hydroxide compound or a metal hexacyanoferrate compound, such as $NiOOH/Ni(OH)_2$, $[Fe^{III}(CN)_6]^{3-}/Fe^{II}(CN)_6]^{4-}$, $ACo^{II}[Fe^{III}(CN)_6]/A_2Co^{II}[Fe^{II}(CN)_6]$, $Ni^{II}_3[Fe^{III}(CN)_6]_2/A_2Ni^{II}_3[Fe^{II}(CN)_6]_2$, $Cu^{II}_3[Fe^{III}(CN)_6]_2/A_2Cu^{II}_3[Fe^{II}(CN)_6]_2$, or $In^{III}[Fe^{III}(CN)_6]/AIn^{III}[Fe^{II}(CN)_6]$, wherein A is a monocation, such as a metal cation having a +1 charge. Further, in some cases, the storage electrode is formed from a "second material" listed in Table I above. Moreover, as described hereinabove, the storage electrode may also be a coating on the photoelectrode and/or counter electrode. Additionally, in some cases, the storage electrode and the photoelectrode (or counter electrode) form a composite electrode.

A solar energy system described herein also comprises one or more electrolyte solutions. Any electrolyte solution not inconsistent with the objectives of the present disclosure may be used. In some cases, the electrolyte solution is an aqueous solution. In other instances, the electrolyte solution is an organic solution. Moreover, it is to be understood that an electrolyte solution described herein can comprise a "supporting electrolyte" as well as one or more "redox pairs." As understood by one of ordinary skill in the art, a supporting electrolyte comprises chemical species that are not electroactive within the range of potentials used in the system. Further, a supporting electrolyte generally has an ionic strength and conductivity larger than those due to the electroactive species (i.e., the redox pair) present in the overall electrolyte solution. Any supporting electrolyte not inconsistent with the objectives of the present disclosure may be used in an electrolyte solution described herein. For instance, in some cases, the supporting electrolyte comprises a carbonate such as $K_2CO_3$. In other instances, the supporting electrolyte comprises a Bronsted acid such as $H_2SO_4$ or $HClO_4$. In some embodiments, the supporting electrolyte comprises methanesulfonic acid (MSA). Additionally, in some cases, the supporting electrolyte of a solar energy system described herein does not comprise a monovalent metal cation such as an alkali metal cation. In some instances, the supporting electrolyte is free or substantially free of alkali metal cations including $Li^+$, $Na^+$, and $K^+$. Such a supporting electrolyte may be especially desirable when a hybrid photoelectrode comprising $WO_3$ is used.

Similarly, a "redox pair" comprises a pair of chemical species that are electroactive within the range of potentials used in the system and that are interconverted through a redox reaction. In some embodiments, the redox pair of an electrolyte solution is a solvated redox pair. A "solvated" redox pair, as understood by one of ordinary skill in the art, is contrasted with a redox pair in which one or both members of the pair is insoluble in the electrolyte solution. A solvated redox pair can instead remain solvated in the electrolyte solution throughout the redox processes associated with the electrochemical cell of the system. In some cases, one or more electrolyte solutions described herein (e.g., both a first electrolyte solution and a second electrolyte solution described herein) comprise a solvated redox pair. For example, in some embodiments, the first electrolyte solution comprises a first solvated redox pair, and the second electrolyte solution comprises a second solvated redox pair, as described further hereinabove. Additionally, the first solvated redox pair and the second solvated redox pair can comprise the same redox pair species or different redox species. Further, in either case, the first solvated redox pair and the second solvated redox pair remain solvated during both photocharging (light conditions) and discharging (dark conditions).

Any solvated redox pair not inconsistent with the objectives of the present disclosure may be used in a system described herein. In some instances, the first solvated redox pair and/or the second solvated redox pair comprises a vanadium redox pair. Further, in some embodiments, such a vanadium redox pair comprises a vanadium (V) species (e.g., $VO_2^+$) and a vanadium (IV) species (e.g., $VO^{2+}$), or a vanadium (III) species (e.g., $V^{3+}$ ion) and a vanadium (II) species (e.g., $V^{2+}$ ion). In some cases, a first redox pair of a first electrolyte solution comprises a vanadium (V) species (e.g., $VO_2^+$) and a vanadium (IV) species (e.g., $VO^{2+}$), and a second redox pair of a second electrolyte solution comprises a vanadium (III) species (e.g., $V^{3+}$ ion) and a vanadium (II) species (e.g., $V^{2+}$ ion). Other redox pairs may also be used. In general, any solvated redox pairs suitable for use in a redox flow battery may be used in a solar energy system described herein. For example, in some instances, a redox pair of a solar energy system described herein comprises a bromide/bromine pair, a transition metal complex redox pair, a sulfur/polysulfide redox pair, a redox pair consisting of metal ions having differing oxidation states, an anthraquinone-2,6-disulfonate (AQDS) redox pair, a tetrahydroxyanthraquinone redox pair, or a potassium ferrocyanide redox pair.

Solar energy systems described herein further comprise one or more external electrical connections. Such electrical connections can have any structure and be formed from any material not inconsistent with the objectives of the present disclosure. For example, in some embodiments, an external electrical connection is formed from an electrically conductive inorganic material such as a metal or conductive oxide. In other instances, an external electrical connection is formed from an organic material such as a conductive organic polymer.

Moreover, an external electrical connection described herein can comprise an electrical switch. Such a switch can comprise any type of switch not inconsistent with the objectives of the present disclosure. For instance, in some cases, the switch comprises a mechanical switch, such as a single pole single through (SPST) switch or a single pole double throw (SPDT) switch. In other cases, the switch comprises an electronic switch, such as a transistor switch, MOSFET switch, or relay switch. A switch described herein may also be a latch switch or a momentary switch.

A solar energy storage system described herein, in some instances, further comprises a housing. Any housing not inconsistent with the objectives of the present disclosure may be used. In general, as described above, the housing of some solar energy systems described herein is designed to be optically transparent or substantially optically transparent. Additionally, in some cases, the housing also has non-transparent or opaque portions. Further, it is also possible, in some embodiments, for the photoelectrode of the system to be integrated into the housing itself. Other configurations are also possible. In some instances, a housing described herein comprises or is formed from glass or plastic.

Solar energy storage systems described herein, in some embodiments, also comprise a photoelectrode layer, counter electrode layer, ion transport membrane layer, and/or storage electrode layer. Such layers can comprise or be formed from the same materials as described above for a photoelectrode, counter electrode, ion transport membrane, and/or storage electrode that is not necessarily part of a cell having a "flow reactor" configuration. Other materials may also be used. For instances, in some embodiments, a counter electrode layer comprises a carbon anode layer. In addition, in some cases, such a layer of a flow reactor described herein can include pores, perforations, or through holes. For instance, in some embodiments, a photoelectrode layer, counter electrode layer, or storage electrode layer is in the form of a plate having through holes extending in a direction perpendicular to the face of the plate. Such through holes can facilitate better electrolyte interaction with the counter electrode material.

In addition, in some cases, such a solar energy system further comprises an optically transparent or substantially optically transparent cover layer. Such a cover layer can be formed from any material not inconsistent with the objectives of the present disclosure. For example, in some instances, the cover layer is formed from glass.

Solar energy systems described herein may also comprise a filter layer. The filter layer can be formed from any material not inconsistent with the objectives of the present disclosure. For example, in some cases, the filter layer is formed from carbon paper. Other materials may also be used.

II. Methods of Converting Electromagnetic Energy into Electrical Energy

In another aspect, methods of converting electromagnetic energy into electrical energy are described herein. In some embodiments, such a method comprises receiving electromagnetic radiation at a surface of the photoelectrode of a cell of a solar energy system described herein, thereby generating one or more photoelectrons and one or more corresponding holes within the photoelectrode. Any solar energy system described hereinabove in Section I may be used. In addition, a method described herein, in some cases, further comprises transferring the photoelectrons to a counter electrode of the cell via an external electrical connection between the photoelectrode and the counter electrode. In some cases, the external electrical connection between the photoelectrode and the counter electrode comprises a load, such that transferring the photoelectrons to the counter electrode from the photoelectrode provides electrical energy to the load. Thus, under light conditions, a solar energy system described herein can function as a liquid junction cell.

It is also possible for the photogeneration of electrodes to result in the generation of stored chemical energy in addition to or instead of the generation of electrical energy. For example, in some cases, a method described herein comprises transferring photogenerated holes in the photoelectrode to an oxidizable species of a first solvated redox pair of a first electrolyte solution at a surface of the photoelectrode, thereby oxidizing the oxidizable species to provide an oxidized species. Additionally, the method can also comprise transferring the photoelectrons from the counter electrode to a reducible species of a second solvated redox pair of a second electrolyte solution at a surface of the counter electrode, thereby reducing the reducible species to provide a reduced species. In this manner, the oxidized and reduced species can serve as chemical energy storage elements of the system. Further, as described above, these species may also be solvated species. Moreover, in some embodiments, a method described herein further comprises carrying out the reverse of the foregoing redox reactions, including under dark conditions. In particular, the method can further comprise oxidizing the reduced species at the counter electrode to provide electrons to the counter electrode, and further transferring the electrons to the photoelectrode through an external electrical connection between the photoelectrode and the counter electrode. The transferred electrons in the photoelectrode can then be used to reduce the oxidized species of the first electrolyte solution. In this manner, the solar energy system can also function as a galvanic cell, including under dark conditions. Moreover, as with the conversion of electromagnetic energy under light conditions, a load can be placed in an external electrical connection of the galvanic cell, as understood by one of ordinary skill in the art.

It is further to be noted that, in some cases, a solar energy system used in a method described herein comprises a switch in an external electrical connection. In such instances, the method can comprise switching the switch from a first position to a second position, including in a manner described hereinabove, in between the "forward" redox reactions (e.g., under light conditions) and the "backward" redox reactions (e.g., under dark conditions).

Features of systems and methods described herein are further illustrated in the following non-limiting examples.

Example 1

Photoelectrodes

Photoelectrodes suitable for use in some embodiments of solar energy systems described herein were prepared as follows. Specifically, three types of photoelectrodes were prepared: $TiO_2$, $WO_3$, and $TiO_2/WO_3$ hybrid (approximately 12 weight % $WO_3$). To fabricate the $TiO_2$ and hybrid electrodes, 0.997 g Degussa P25 $TiO_2$ (VP AEROPERL® by Evonik), 0.497 g ethyl cellulose (48.0-49.5%, Sigma-Aldrich USA), 0.124 g polyvinylidenefluoride (PVDF) powder (Kynar Flex 2801-00 by Arkema Group), 2.501 g alpha-terpineol (laboratory grade, Fisher Scientific USA) were mixed under constant stirring at 80° C. for 1 hour to obtain a uniform $TiO_2$ or hybrid slurry with the addition of 0.374 g tungstic acid (AlfaAesar, USA) and 0.993 g $H_2O_2$ (35%, Alfa Aesar USA). Then the slurry was deposited on a pre-cut square fluorine doped tin oxide (FTO) (sheet resistance 6-8Ω/□, Pilkington USA) using a doctor blade. The FTO substrate was pre-washed with acetone (99.7%, Fisher Scientific USA), methanol (99.8%, Fisher Scientific USA), and deionized (DI) water, before being blow-dried and then further dried in an oven at 120° C. for 1 h. After the deposition, the obtained coating was dried in the oven for 1 h and then calcined with air flow at 325° C. for 5 min, 375° C. for 5 min, 450° C. for 15 min, and finally 500° C. for 15 min. The fabrication of $WO_3$ electrode was performed in a similar manner. After the fabrication, the active electrode area was approximately 1 $in^2$.

Example 2

Electrolyte Solutions

Electrolyte solutions suitable for use in some embodiments of solar energy systems described herein were prepared as follows. Specifically, three types of electrolytes were prepared: 3 M $H_2SO_4$, 0.01 M vanadium (IV, $VO^{2+}$) in 3 M $H_2SO_4$, and 0.01 M vanadium (III, $V^{3+}$) in 3 M $H_2SO_4$. The first two electrolytes may be prepared by dissolving $H_2SO_4$ (96.6%, J.T. Baker USA) in DI water with or without vanadium (IV) sulfate oxide hydrate ($VOSO_4.xH_2O$) (99.9%, Alfa Aesar USA). The number of hydrates in $VOSO_4.xH_2O$ may be pre-determined by thermogravimetric analysis. The prepared vanadium (IV)—$H_2SO_4$ solution appeared light blue. The 0.01 M vanadium (III) electrolyte may be obtained by electrochemically reducing the prepared vanadium (IV)—$H_2SO_4$ solution in an electro-chemical cell at a constant current density of approximately 3 $mA/cm^2$ using a potentiostat (Princeton Applied Research, PARSTAT 2273) until the potential reached approximately 1.6 V. During the reduction, the electrolyte was protected by $N_2$ throughout the experiment to prevent oxidation of vanadium (III) species. The obtained vanadium (III)—$H_2SO_4$ solution appeared light green.

Example 3

Characterization of Photoelectrodes and Electrolytes

The example photoelectrodes and electrolyte solutions described above in Example 1 and Example 2 were characterized as follows. The crystallographic information of the electrodes was determined by XRD (Siemens, 810-M340-32-C3000) at a scan rate $0.01°$ $s^{-1}$ between 20° and 80° with a dwell time of 1 s. Scanning electron microscopy (Hitachi S-3000 N variable pressure SEM) was used to examine the microstructure of photoelectrodes. Energy dispersive spectroscopy (EDS) mapping was also performed to reveal elemental composition of the sample. The UV-vis diffuse reflectance spectra of the samples were obtained on a JASCO V-570 spectro-photometer while Raman spectra were collected on a PerkinElmer DXR Raman microscope. The PEC property of the electrodes was studied in a three-electrode electrochemical cell, where the photoelectrode served as the working electrode (WE), a platinum mesh and Ag/AgCl electrode served as the counter electrode (CE) and reference electrodes (RE), respectively. Linear sweep voltammetry (LSV), cyclic voltammetry (CV), and zero-resistance ammetry (ZRA) were conducted in either a half-cell configuration (one chamber) or full-cell configuration (two chambers filled with $VO^{2+}$ and $V^{3+}$ containing electrolyte solutions, separated by a Nafion 117 membrane) similar to the embodiment illustrated in FIG. 1. The voltage scan ranged from −0.197 to 1.3 V with 0.1 V interval of dark/ illumination. The overall duration for ZRA measurement was 180 s with 20 s intervals of dark/illumination. The solar irradiation was created using an ozone-free solar simulator system (NewportUSA) coupled with an AM 1.5 global filter (Newport USA).

Figure 5:
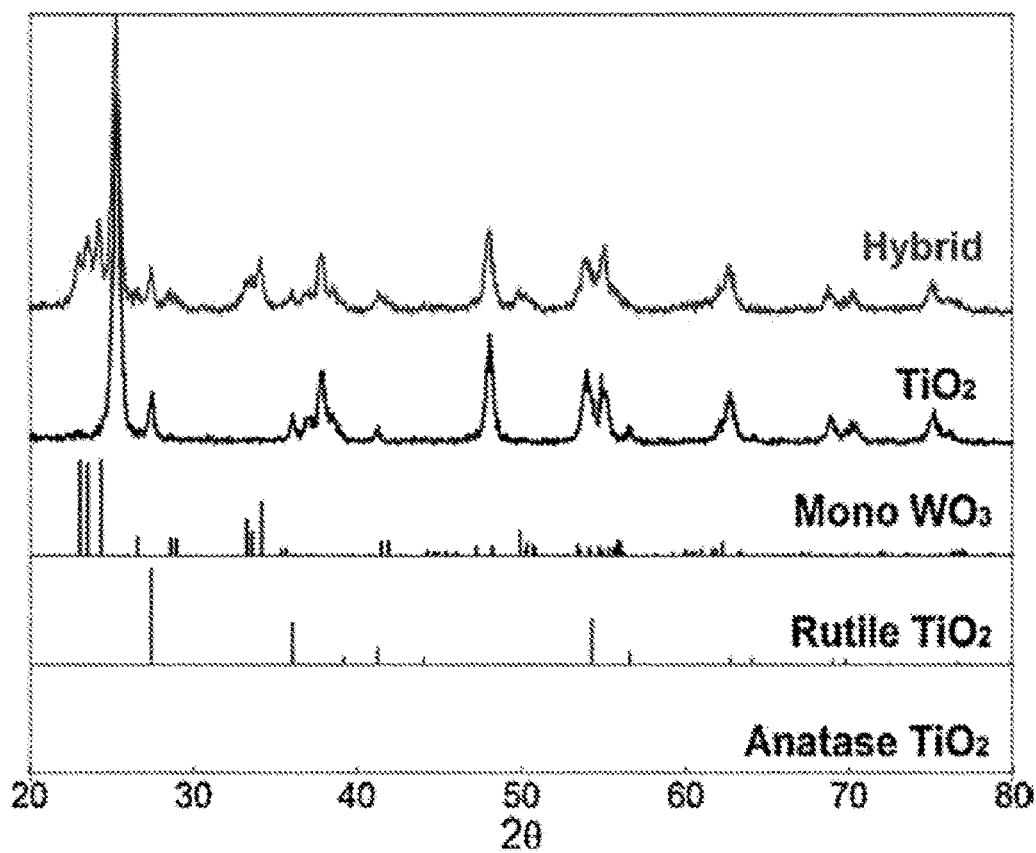
FIG. 5 illustrates x-ray diffraction (XRD) data for photoelectrodes according to some embodiments described herein.
Figure 6:
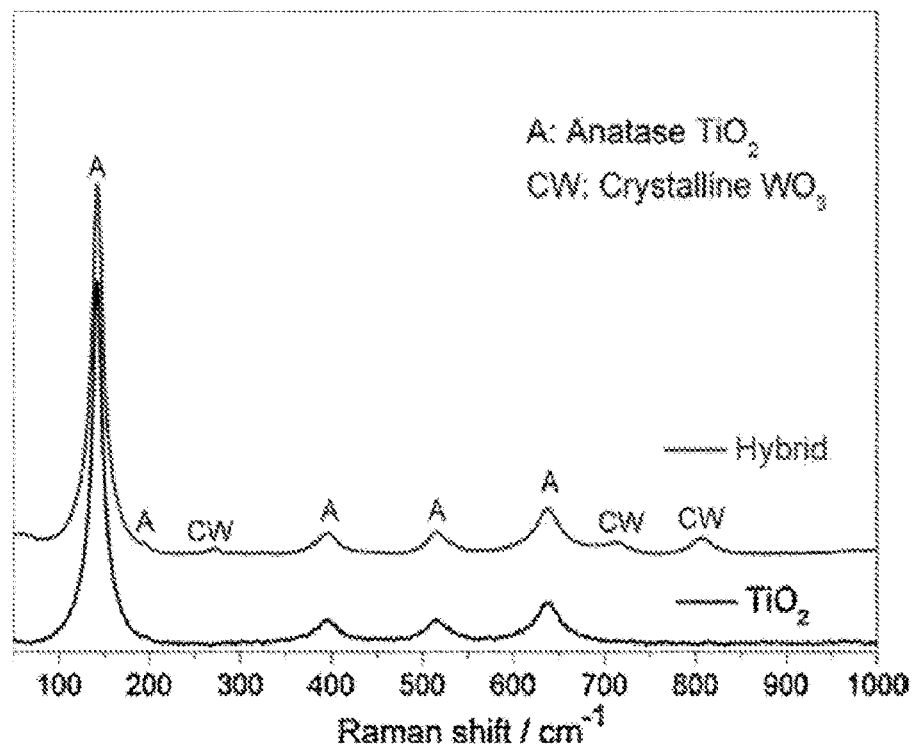
FIG. 6 illustrates Raman spectral data for photoelectrodes according to some embodiments described herein.

XRD and Raman Analysis:

FIG. 5 presents the XRD spectra of the $TiO_2$ and hybrid electrodes. The JCPDS standards for anatase $TiO_2$ (#21-1272), rutile $TiO_2$ (#76-1940), and monoclinic $WO_3$ (#83-0950) are also shown as reference. It was found that only anatase and rutile phases of $TiO_2$ existed in both samples, with the former being predominant. This finding is in agreement with the revealed phase information of the commercial Degussa P25 product. Also, only monoclinic phase of $WO_3$ was found in the hybrid sample, and no noticeable impurity phase such as bromite $TiO_2$ or orthorhombic and tetragonal $WO_3$ existed by cross-referencing the XRD spectra with the standards. Raman spectroscopy was employed to verify the phases of $TiO_2$ and $WO_3$ along with carbon species in the photoelectrode. In FIG. 6, five Raman active modes near 146, 197, 397, 515, and 633 $cm^{-1}$ are clearly observed for both samples. These peaks are characteristic vibration of a $TiO_2$ anatase phase. No $TiO_2$ rutile phase was observed. The vibration modes of graphitic carbon (1200-1600 $cm^{-1}$) were not observed, which indicates that carbon species were all removed by a sintering process. The band near 270 $cm^{-1}$ is believed to emerge from the O-W-O deformation vibration, and bands around 713 and 806 $cm^{-1}$ are attributed to the O-W-O stretching vibrations. All these bands belong to the characteristic vibration modes of monoclinic $WO_3$, and all Raman results are consistent with the XRD patterns illustrated in FIG. 5.

SEM and EDS Mapping Study:

FIG. 7 demonstrates morphologies of the sintered $TiO_2$ photo-electrode in comparison with the unsintered $TiO_2$ powder. It is seen from FIG. 7A that a continuous porous network of $TiO_2$ is formed by randomly-organized spherical particles ranging in size from 3-25 μm and no explicit crack was found in the sample. A close view of the particles shown in FIG. 7B reveals that the sintered $TiO_2$ sample has its particles adjoined together due to heat treatment and craters (or irregularities) of various sizes are found to exist on the surface, rendering it very rough. In contrast, the unsintered $TiO_2$ powders (FIG. 7C) were composed of many isolated spheres with relatively smooth surfaces, although the particle size remains unchanged. SEM images were also taken on the hybrid electrode of Example 1 in order to compare it with the pure $TiO_2$ electrode. The hybrid sample possessed a similar porous network to the pure $TiO_2$ electrode, as demonstrated in FIG. 8 (the inset in FIG. 8 is a higher magnification view of the sample). However, the hybrid sample also exhibited a binomial distribution of particles consisting mainly of large $TiO_2$ particles along with small $WO_3$ particles of 1-2 μm that are embedded discretely in the matrix. $TiO_2$ particles are adjoined with not only themselves but also their neighboring $WO_3$ particles. Many cracks existed in the matrix. Not intending to be bound by theory, it is believed that $WO_3$ particles tend to agglomerate more easily than $TiO_2$ due to their much smaller dimensions. These particles were also found to be scattered on the surface of $TiO_2$ particles. Note that the size of $TiO_2$ particles in the hybrid sample remains unchanged compared to that of the pure $TiO_2$ sample. $WO_3$ particles were found to distribute all over matrix in the hybrid electrode, according to energy dispersive x-ray spectroscopy (EDS) mapping results. Only three elements, Ti, W, and O were found to exist in the sample analyzed by EDS and $TiO_2$ was demonstrated to dominate in the electrode over $WO_3$ as indicated by rather distinguished Ti element on the mapping result. On the other hand, $WO_3$ particles were also found to scatter around and over the $TiO_2$ particles, and such intimate contact between the two semiconductors is expected to facilitate charge carrier transfer between $WO_3$ and $TiO_2$, and reduce their recombination after they are generated.

Figure 9:
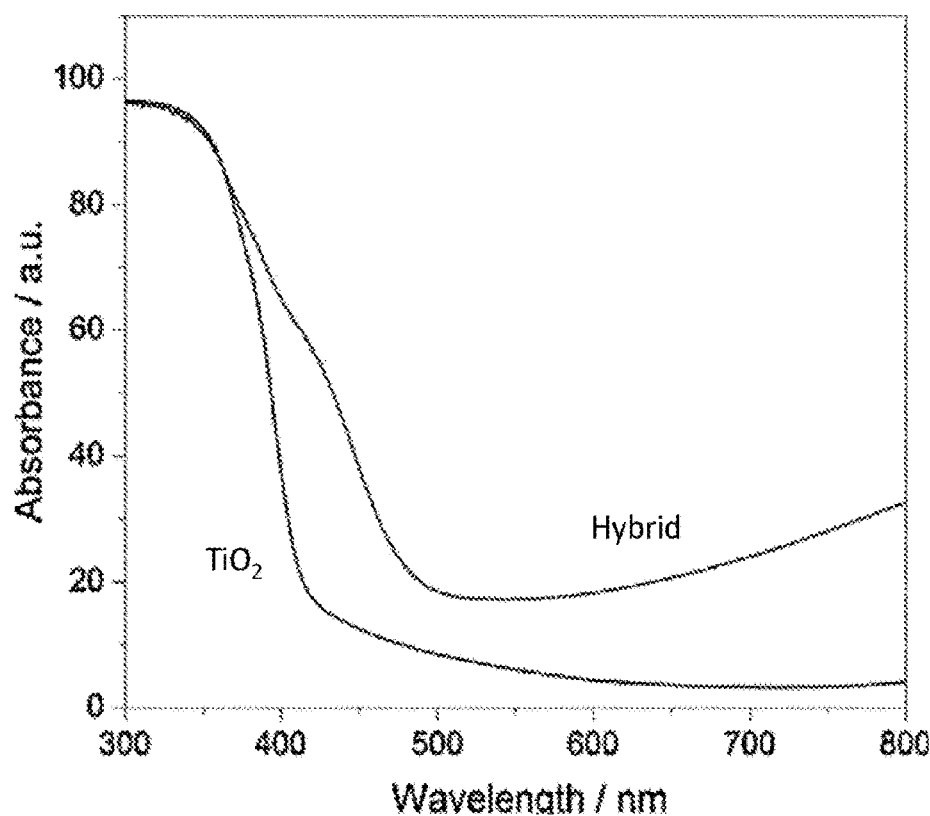
FIG. 9 illustrates ultraviolet-visible (UV-vis) spectroscopy data for photoelectrodes according to some embodiments described herein.

UV-Vis Spectroscopy:

The optical properties of both the $TiO_2$ and hybrid electrodes were studied by UV-vis diffuse reflectance spectroscopy. FIG. 9 illustrates the results. For $TiO_2$, the absorption edge resides near 380 nm. The spectrum for the hybrid sample shows a clear red shift, with an absorption edge extending into the visible light region near 450 nm. Compared to the pure $TiO_2$ sample, the hybrid sample also demonstrated an improved absorption tail ranging from 500 to 800 nm, which is ascribed to the smaller band energy of 2.6-2.8 eV of $WO_3$.

Figure 10:
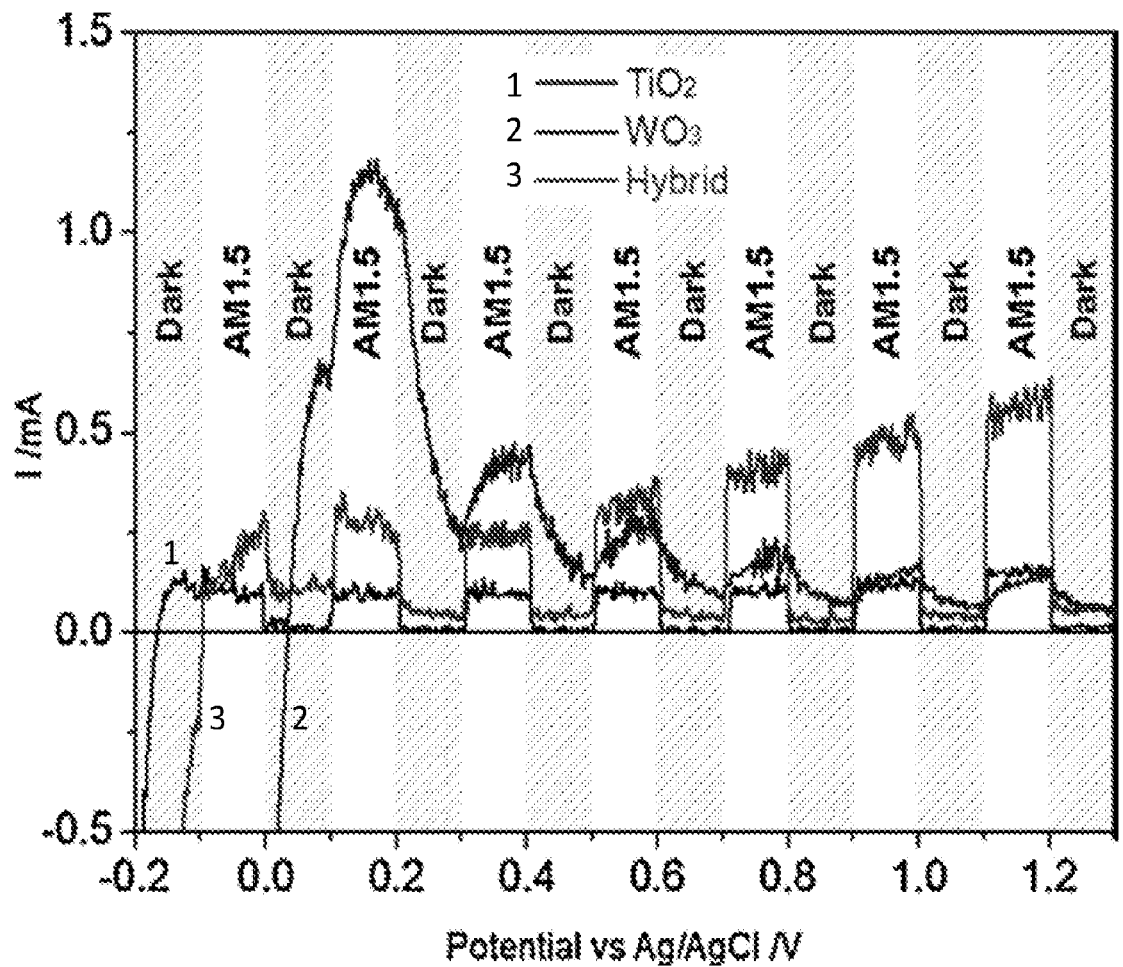
FIG. 10 illustrates linear sweep voltammetry (LSV) data for photoelectrodes according to some embodiments described herein.

Photocatalytic Activity:

To compare the PEC performance of different electrodes, LSV was employed in a half-cell configuration. The results are shown in FIG. 10. There were insignificant photocurrents for both the $TiO_2$ and $WO_3$ electrodes under AM 1.5 illumination. However, the hybrid electrode exhibited a much more significant PEC response. Not intending to be bound by theory, it is believed that the increased PEC response is due to a higher reaction rate of the following reaction (Reaction (1)), particularly at higher potentials:

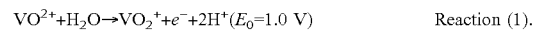

$$VO^{2+}+H_2O \rightarrow VO_2^{+}+e^{-}+2H^{+} (E_0=1.0 \text{ V}) \quad \text{Reaction (1)}.$$

In addition, the photocurrent of the $TiO_2$ and $WO_3$ electrodes remained almost unchanged at higher potentials under illumination. In contrast, the photocurrent of the hybrid electrode was enhanced at least by a factor of 3 to 4. The enhanced photoresponse is believed to be indicative of mitigated charge recombination and thus an improved PEC reaction rate. Monoclinic $WO_3$ has a more positive valence band (VB) than $TiO_2$, and photogenerated holes tend to migrate from its VB to that of $TiO_2$, and then to the photoelectrode/catalyst surface under illumination. Electrons, however, favor migrating from the conduction band (CB) of $TiO_2$ to that of $WO_3$ and then to the bulk of the semiconductor due to the more negative potential of the $TiO_2$ CB. As a result, the photogenerated charge carriers would tend to separate rather than recombine in the bulk, leading to a significant improvement in photocurrent.

The strong oxidation peak of $WO_3$ near 0.12 V in FIG. 10 is attributed to formation of tungsten bronze, following Reaction (2):

$$WO_3+XH^{+}+Xe^{-} \leftrightarrow H_XWO_3 \quad \text{Reaction (2)}.$$

Figure 11:
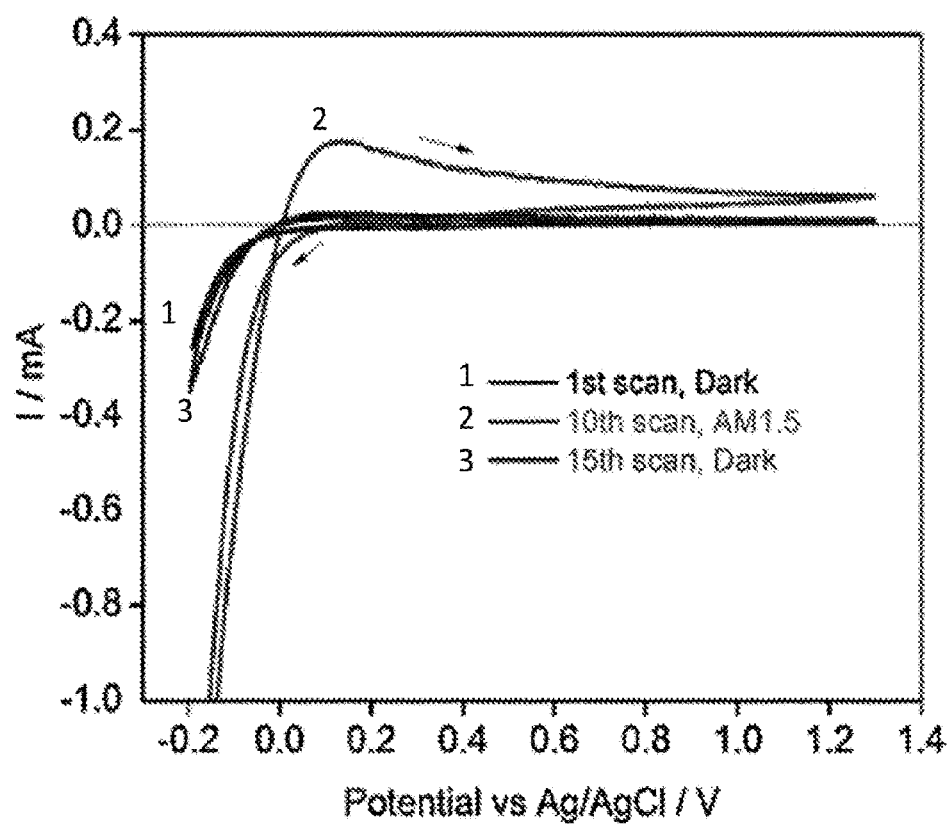
FIG. 11 illustrates cyclic voltammetry (CV) data for photoelectrodes according to some embodiments described herein.

Reaction (2) is reversible and involves co-intercalation (or de-intercalation) of electrons and protons into (or out of) $WO_3$. It is believed that storage of photogenerated electrons in $WO_3$ is achievable under one or more of the following conditions: (i) the presence of UV illumination and a hole scavenger, (ii) application of a negative bias, and (iii) use of an external source of electrons. To eliminate the effect of other factors, such as hole scavengers and external electrons provided by $TiO_2$, multiple CV scans were conducted on the pure $WO_3$ electrode in 3 M $H_2SO_4$ electrolyte under alternate dark-illumination. Results are shown in FIG. 11. The first nine cycles were conducted under dark conditions, and all CV curves overlapped with each other. This result indicates that no detectable electrochemical reactions occurred on the electrode in an acidic environment under dark conditions. During the $10^{th}$ scan, when AM 1.5 illumination was applied, the $WO_3$ electrode showed a broad peak centered at 0.12 V, which was believed to be due to the formation of tungsten bronze from $WO_3$ reacting with $H^+$ ions and the photo-generated electrons. The anodic current induced by the illumination is appreciable throughout the potential window. It is believed that the cathodic current at potentials below 0.05 V vs. Ag/AgCl results from the decomposition of tungsten bronze that releases both $H^+$ ions and electrons. These peaks disappeared when AM 1.5 illumination was turned off during the $11^{th}$ scan, and the current eventually returned to the original value during the $15^{th}$ scan, indicating reversibility of the reactions. Fast redox reactions using vanadium redox couples are capable of boosting photo-electrochemical performance via quickly scavenging holes at the semiconductor-electrolyte interface and thus mitigating recombination of charge carriers after they are generated.

Figure 12A:
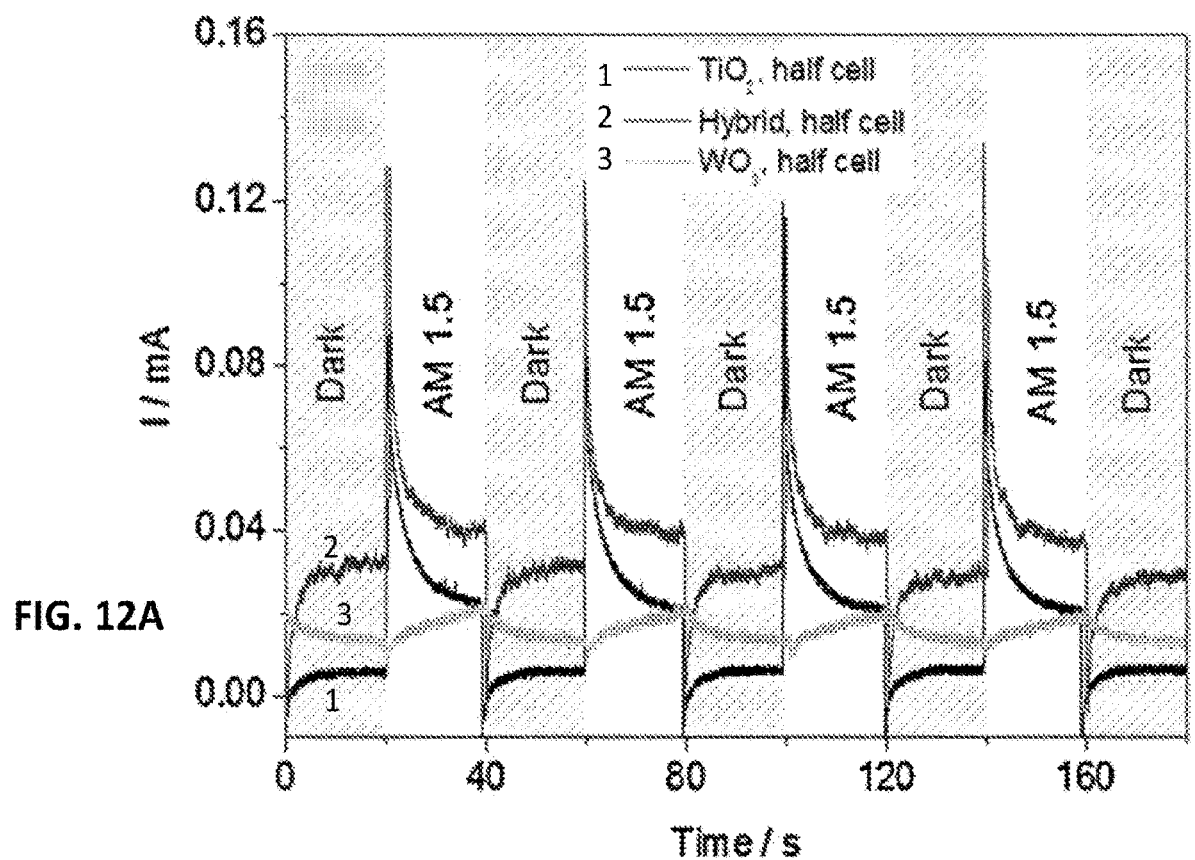
FIG. 12A illustrates the photoresponse of photoelectrodes in a half-cell configuration according to some embodiments described herein.
Figure 12B:
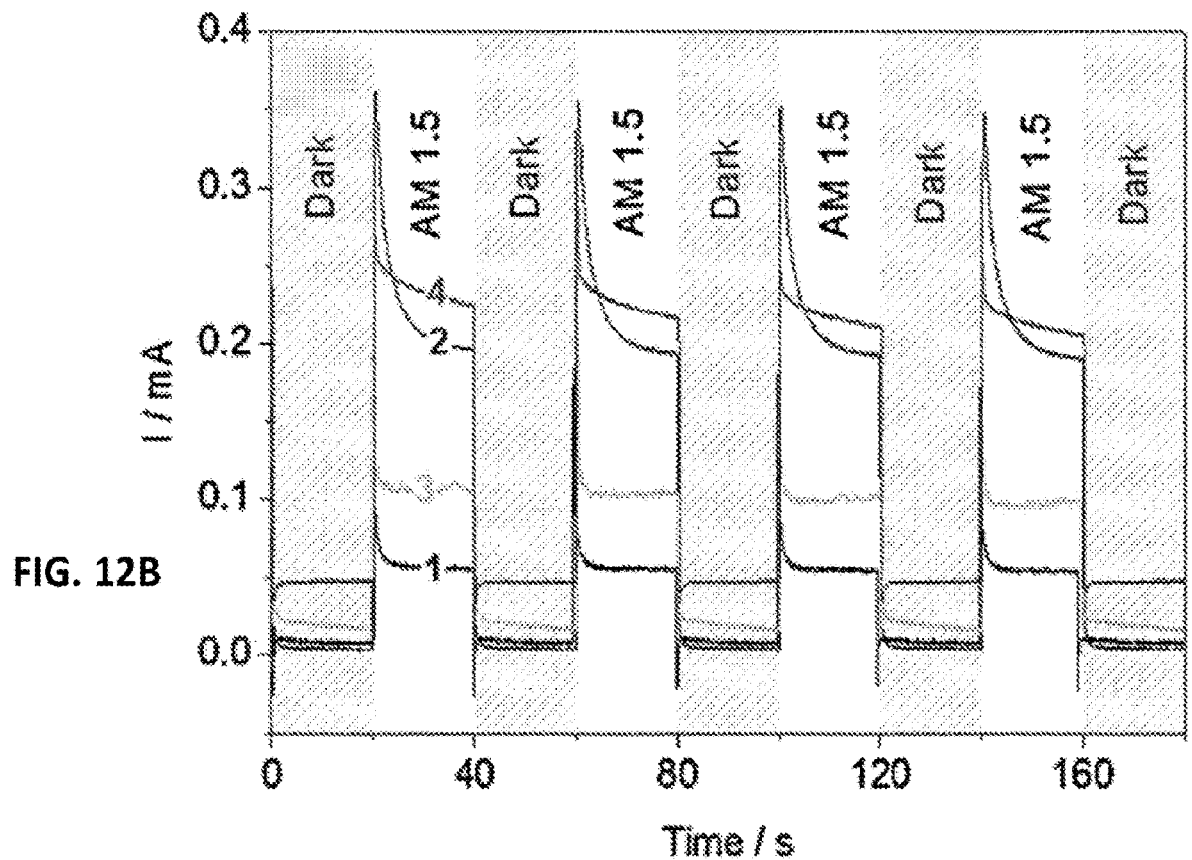
FIG. 12B illustrates the photoresponse of photoelectrodes in a full-cell configuration according to some embodiments described herein.

In addition to the forgoing, the ZRA method was adopted in the experiments to investigate the photoelectrochemical properties of different electrodes. The results are illustrated in FIG. 12. FIG. 12A compares the photoresponse of three different photoelectrodes in 3 M $H_2SO_4$ electrolyte in a half-cell configuration. FIG. 12B compares the $TiO_2$ and hybrid electrodes in a full-cell configuration. The hybrid electrode shows a more pronounced photocurrent than the $TiO_2$ or $WO_3$ electrode regardless of the electrolyte and cell configuration. Not intending to be bound by theory, this improvement is attributed to facilitated charge carrier transfer from $WO_3$ to $TiO_2$ due to their band structure interplay.

It is further believed that vanadium redox pairs contribute significantly to photocurrent enhancement regardless of the electrode used. This enhancement is even more conspicuous when two vanadium redox species, $VO^{2+}$ and $V^{3+}$, and a full-cell configuration were coupled with each other. The addition of vanadium redox species even with a small molarity (such as 0.01 M) at least doubled the photocurrent for both electrodes.

Example 4

All Vanadium Redox PEC Cell

A solar energy system according to one embodiment described herein was prepared as follows. The solar energy system comprised an "all-vanadium" PEC storage cell. The cell had the configuration illustrated in FIG. 1. More specifically, the cell included a $TiO_2$ working electrode as the photoelectrode/photoanode, a Pt-mesh counter electrode, and two redox couples (i.e., $VO_2^+/VO^{2+}$ and $V^{3+}/V^{2+}$) separated by a Nafion 117 membrane. 3 M $H_2SO_4$ was used as the supporting electrolyte throughout the experiments. A photoanode on a fluorine doped tin oxide (FTO) glass was fabricated using a slurry consisting of 0.5 g $TiO_2$ powder (VP AEROPERL® P 25/20), 0.25 g ethyl cellulose, 0.062 g polyvinylidene fluoride (PVDF), and 2.15 g α-Terpineol. After sintering in air the photoelectrode had a thickness of 10 μm and an active area of 6.45 $cm^2$.

Photoelectrochemical studies were conducted using a potentiostat (Princeton Applied Research, PARSTAT 2273) and a customized two chamber H-cell. Electrolyte solutions of 0.01 and 0.1 M $VO^{2+}$ were prepared by dissolving $VOSO_4 \cdot xH_2O$ (99.9%, Alfa Aesar) in 3 M $H_2SO_4$. The $V^{3+}$ solution was prepared from a $VO^{2+}$ electrolyte in an electrochemical cell with static electrolyte under a constant current of 3 mA. The light source was an ozone-free solar simulator system (Newport, USA). A 300 W Xe lamp with a series of long-pass filters was used to illuminate the photoelectrode. A small amount of the electrolyte in a quartz cuvette was analyzed using a UV-vis spectrophotometer (PerkinElmer Lambda 35) to determine the electrolyte composition change. For the incident photon-to-current efficiency (IPCE) measurements, the wavelength of the incident light was controlled by a monochromator (Optometrics). The IPCE was calculated according to Equation (1):

$$IPCE = (1240 \, I)/(\lambda \cdot J_{light}) \qquad \text{Equation (1),}$$

where I ($A/cm^2$) is the measured photocurrent density at a specific wavelength, $\lambda$ (nm) is the wavelength of incident light, and $J_{light}$ ($W/cm^2$) is the light irradiance determined by a photodetector (Newport, USA). To obtain a percentage IPCE, the result of Equation (1) is multiplied by 100.

Figure 13A:
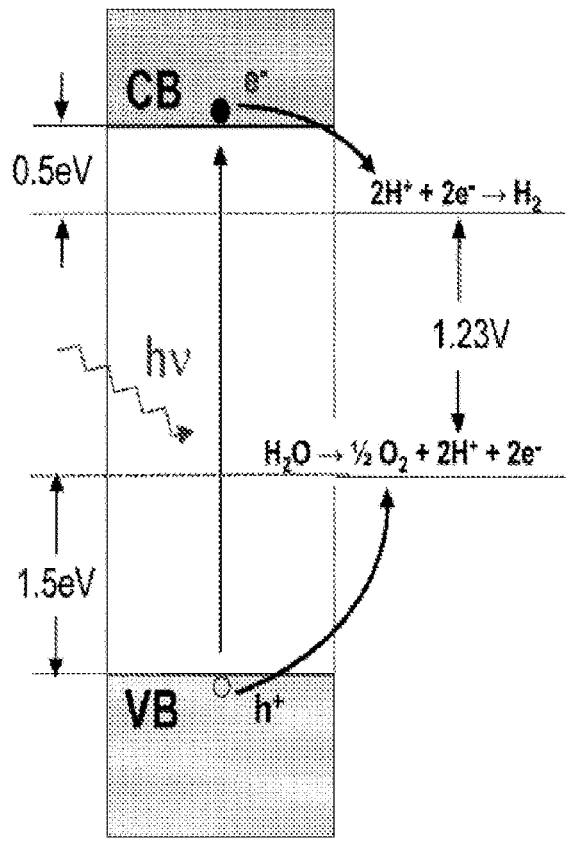
FIG. 13A illustrates a band structure involved in a water splitting reaction.
Figure 13B:
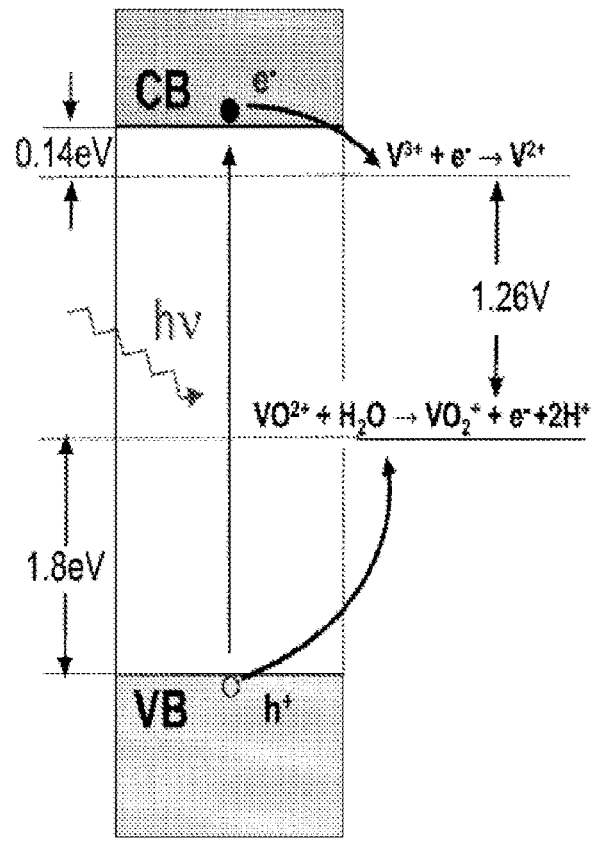
FIG. 13B illustrates a band structure of a solar energy system according to one embodiment described herein.

FIG. 13 compares the all-vanadium redox PEC storage cell with photocatalytic water splitting in terms of $TiO_2$ band positions and the corresponding PEC reactions. FIG. 13A indicates that the $TiO_2$ conduction band (CB) electrons may not be energetic enough to drive a hydrogen evolution reaction; the band structure is a thermodynamic requirement, but the sluggish reaction kinetics of photocatalytic hydrogen generation requires a large overpotential. For the all vanadium PEC storage cell, shown in FIG. 13B, the CB bottom of $TiO_2$ (around −0.5 V on the potential scale vs. NHE) seems not to be negative enough to drive the reduction reaction of $V^{3+}+e^- \rightarrow V^{2+}$ ($E_0=-0.26$ V vs. NHE). However, not intending to be bound by theory, the fast electrochemical reaction kinetics of the vanadium ions, which is several orders of magnitude higher than that of $H_2$ evolution, may compensate for the narrow potential window and result in a significant improvement in photocurrent.

Figure 14A:
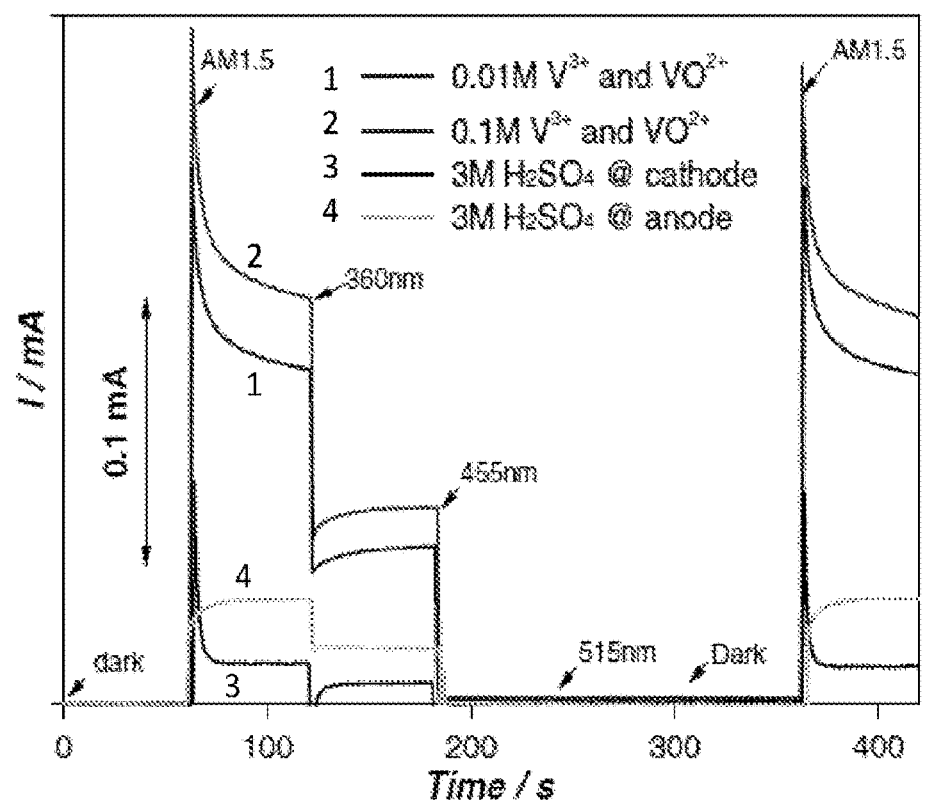
FIGS. 14A and 14B illustrate photocurrent (FIG. 14A) and voltage (FIG. 14B) data for solar energy systems according to some embodiments described herein.

PEC characterization of the foregoing storage cell was consistent with the analysis above, as shown in FIG. 14. Different combinations of electrolytes in a two electrode setup were studied using the zero resistance ammetry (ZRA) method without external voltage bias. Upon illumination, immediately there appeared the photocurrents whose magnitudes were closely dependent on the type of electrolytes. The photocurrent using 0.1 M vanadium redox species as both anolyte and catholyte increased ca. 30% compared to that using 0.01 M, indicating that kinetics of adsorption/desorption and mass transport of the vanadium ions in the electrolyte, rather than their concentration, dominates the reactions. In addition, when the 0.1 M $VO^{2+}$ and $V^{3+}$ electrolytes in the all-vanadium PEC storage cell were replaced by 3 M $H_2SO_4$ at the photoanode (curve 4 in FIG. 14A) and cathode (curve 3 in FIG. 14A), respectively, a significant decrease of photocurrent may be observed. For example, the photocurrent, taken at 120 s just before the air mass (AM) 1.5 filter was switched off, reduced 11.2 times when the catholyte was changed from 0.1 M $V^{3+}$ to 3 M $H_2SO_4$. This result is believed to indicate that contribution of photocatalytic water splitting to the photocurrents measured from the all-vanadium PEC storage cell is negligible, even though very low molarities of vanadium ions (0.01 M and 0.1 M) were used.

Figure 14B:
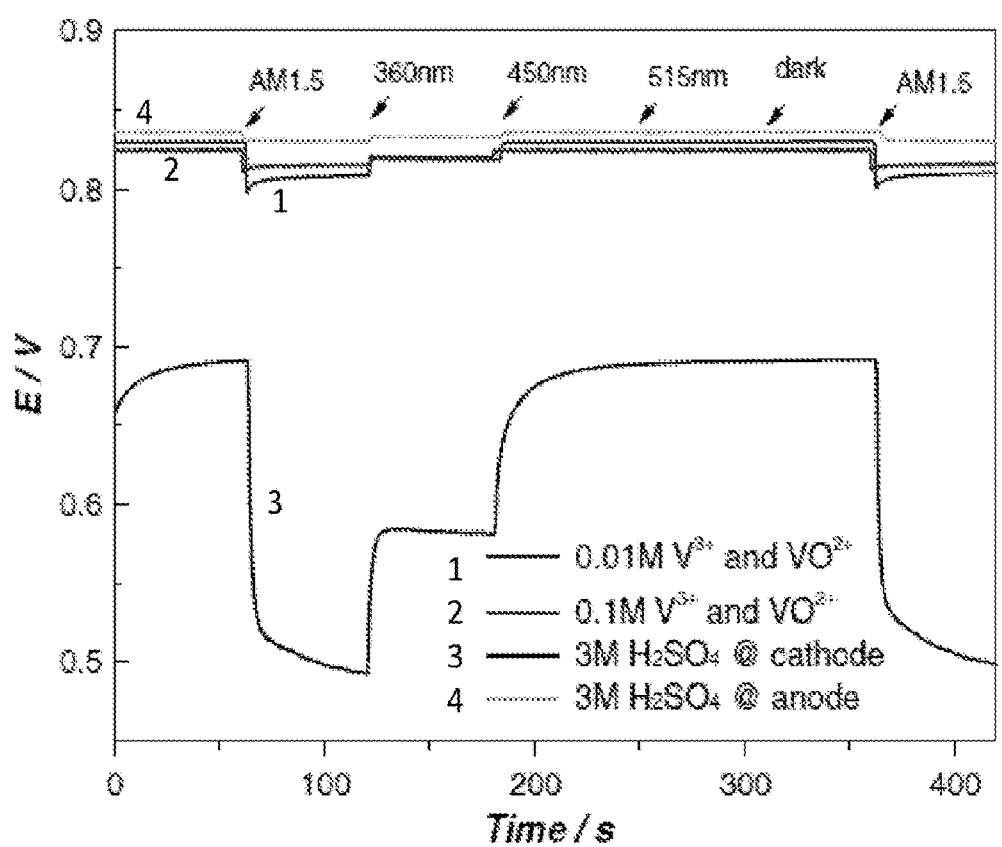

In FIG. 14B, the measured voltage between the photoanode and Pt counter electrode was determined by the quasi-Fermi level of the $TiO_2$ and the redox potentials of the electrolytes. When the Pt counter electrode (cathode) was in contact with 3 M $H_2SO_4$, the cell voltage was lower than that of the all-vanadium example PEC storage cell, since the thermodynamic potential of $H_2O/H_2$ (0.0 V vs. NHE) is higher than that of $V^{3+}/V^{2+}$ (−0.26 V vs. NHE). However, when the $VO^{2+}$ electrolyte was replaced with 3 M $H_2SO_4$ as the anolyte, the change in cell voltage was barely noticeable even though the thermodynamic potential of $O_2/H_2O$ (1.23V vs. NHE) is about 200 mV higher than that of $VO^{2+}/VO_2^+$ (1.0 V vs. NHE). This result may be related to the slow kinetics of PEC water splitting. An extra overpotential may therefore be needed to produce a photocurrent of similar magnitude.

Figure 15A:
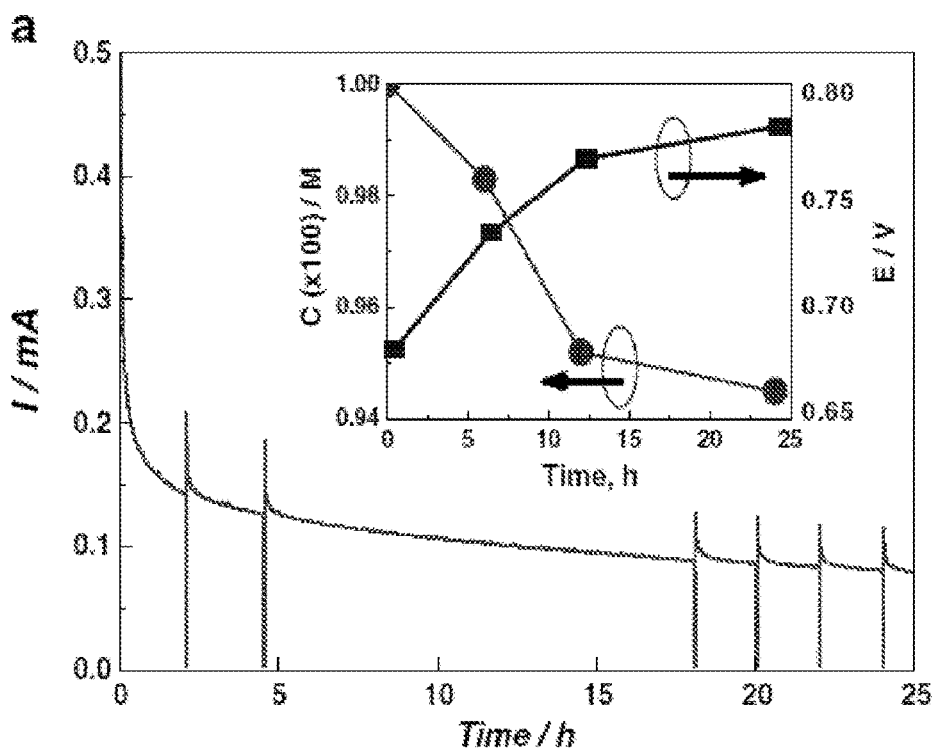
FIGS. 15A and 15B illustrate photocurrent (FIG. 15A) and incident-photon-to-current efficiency (IPCE) (FIG. 15B) data for solar energy systems according to some embodiments described herein.

It should be noted that the test conditions described herein are fundamentally different than what has been conventionally reported for photoproduction of hydrogen. When hydrogen is produced in the electrolyte, it is naturally separated, thus eliminating any reverse reaction, i.e., discharge reactions. However, in the presently described all-vanadium PEC storage cell, spontaneous reverse reactions may occur along with the photocharging, which reduces the conversion efficiency. To study this effect, a continuous 25 h photocharging was conducted using 0.01 M $VO^{2+}$ and $V^{3+}$ as the anolyte and catholyte, respectively. Low molarity was used to ensure short photocharging time and detectable change in concentration of vanadium ions. FIG. 15A shows a rapid decrease of photocurrent in the first 2 h as a result of fast depletion of vanadium ions at the electrode/electrolyte interface, followed by a relatively stable photocurrent when equilibrium has been established. The sporadic spikes of photocurrent were caused by 120 s dark periods that were intentionally introduced to examine the dark current. The currents reduced to almost zero upon applying the dark periods, indicating a quick PEC response of the cell to illumination. The slight increase of photocurrents when light was resumed is due to re-establishment of the equilibrium between ion diffusion and reaction at the electrode surface. The inset plot in FIG. 15A shows that the cell voltage increased during the photocharging, suggesting that the all-vanadium PEC storage cell was being charged. Besides, in the all-vanadium PEC storage cell, photogenerated holes are expected to be quickly scavenged to depress photocorrosion. Tests indicated that the photoanode was very stable in the vanadium electrolyte.

To calculate the Faradaic efficiency, the anolyte was assayed using UV-vis spectroscopy to determine the concentration of $VO^{2+}$. Assuming a linear relationship between the absorbance at the characteristic peak of $VO^{2+}$ (at 765 nm) and concentration (i.e., Beer's Law), the estimated anolyte concentration as a function of photocharging time is shown in the inset of FIG. 15A. The photooxidation of $VO^{2+}$ occurred quickly at the beginning the photocharging since more $VO^{2+}$ was consumed, then slowly after 10 h. The conversion rate of $VO^{2+}$ over the entire test period is estimated at 0.0042 μmol/h. The Faradaic efficiency, defined as $\eta_F = F \cdot \Delta n/\Delta Q$, where $\Delta n$ is the amount of reacted $VO^{2+}$, F is the Faraday constant, and $\Delta Q$ is the charge, is calculated to be 95%.

Figure 15B:
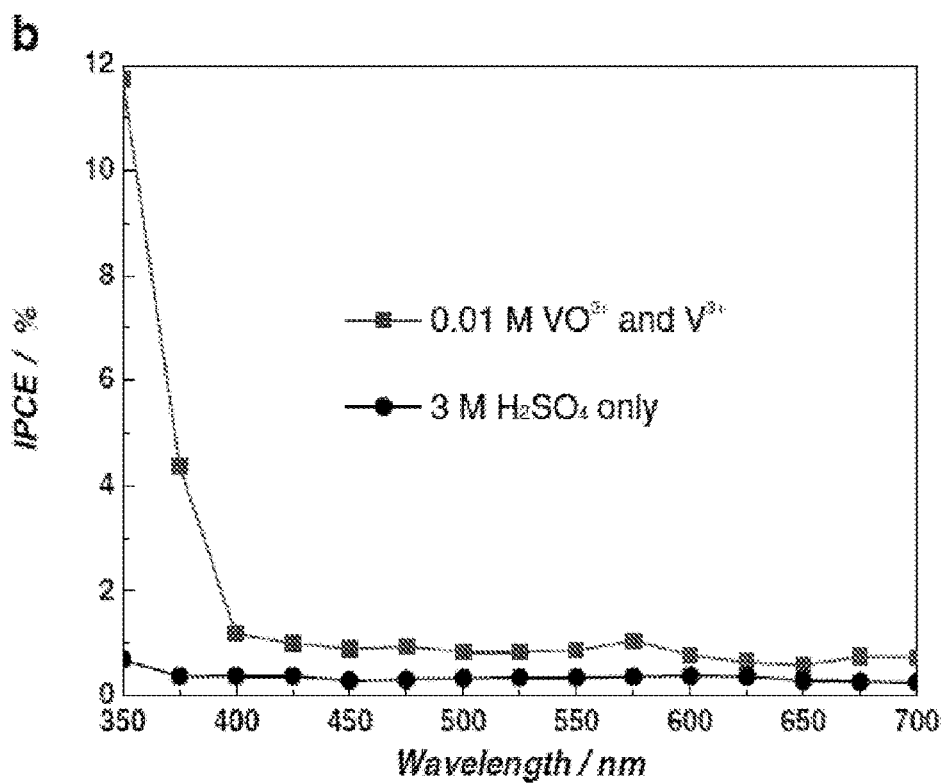

The incident photon-to-current efficiency (IPCE) of the all vanadium PEC storage cell using 0.01 M vanadium ions is shown in FIG. 15B. The all-vanadium PEC storage cell shows a much higher efficiency, particularly in the UV region, than the case where no vanadium ions were added. For example, at 350 nm light illumination, the IPCE of the former is close to 12% whereas the latter only shows an efficiency of 0.8%. This result is believed to be due to the much faster electrochemical kinetics of the vanadium ions, as previously discussed, that could yield considerable photocurrents even at low concentrations (0.01 M).

Example 5

Redox PEC Cell

A solar energy system is prepared as follows. Specifically, the same configuration is used as in Example 4. However, vanadium redox species were replaced with $Fe(CN)_6^{4-}$ and $Fe(CN)_6^{3-}$. Additionally, a non-corrosive supporting electrolyte, aqueous $K_2CO_3$ solution, was used. The foregoing system could reduce material costs and alleviate the need to replace valves, pumps, pipes and other components.

Example 6

Hybrid Photoelectrodes

A solar energy system comprising hybrid photoeletrodes was prepared and characterized as follows. Specifically, three electrolyte (anolyte and catholyte) combinations were investigated in an experimental photoelectrochemical (PEC) storage cell having the configuration of FIG. 1. First, 3 M $H_2SO_4$ was employed as both the anolyte and catholyte, using five different electrodes: $TiO_2$ only and four hybrid electrodes formed from $TiO_2$ and $WO_3$. Second, an all-vanadium PEC storage cell (PESC) was formed using all-vanadium electrolytes and $WO_3/TiO_2$ hybrid electrodes with different $WO_3$ contents. Namely, the hybrid electrodes included 1 wt. %, 6 wt. %, 12 wt. %, or 24 wt. % $WO_3$. When coupled with vanadium redox species in an all-V PESC, the $WO_3/TiO_2$ hybrid electrode, particularly with high $WO_3$ contents (e.g., 24 wt. % $WO_3$), was found to offer long-term electron storage, great storage reversibility, and significant improvement in both dark current (resulting from release of the stored electrons) and photocurrent. Finally, to distinguish the scavenging effects of holes and electrons by vanadium redox in electron storage, vanadium redox species only were employed as either the anolyte or catholyte in the PEC storage cell. When the 0.01 M $V^{3+}$ catholyte (anolyte remained the same) in the all-V PESC (using a hybrid electrode with 24 wt. % $WO_3$) was swapped for 3 M $H_2SO_4$ at the counter electrode, a significant reduction of both photocurrent and dark current was observed, compared to the case when only the anolyte was replaced. These results showed that the vanadium redox species in the catholyte help boost electron transfer kinetics and play an important role in reversible electron storage.

Figure 16A:
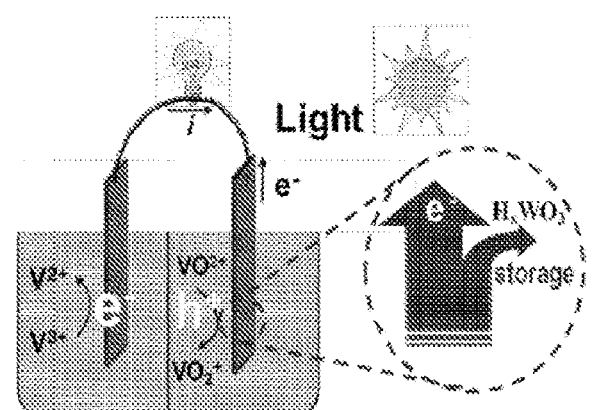
FIGS. 16A and 16B illustrate schematically the conversion of electromagnetic radiation into electrical energy under light (FIG. 16A) and dark (FIG. 16B) conditions according to one embodiment described herein.
Figure 16B:
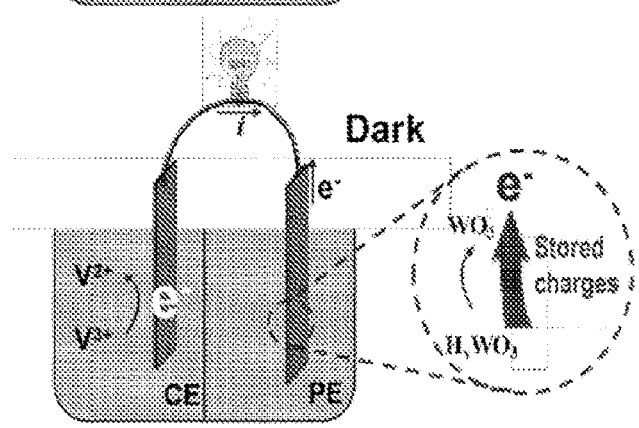

Not intending to be bound by theory, it is believed that the working principle of in situ electron storage and release, in the context of vanadium redox pairs, is that depicted in FIG. 16. It is further believed that this mechanism is responsible for solar energy conversion under dark conditions. With reference to FIG. 16, under light conditions (FIG. 16A), a fast $VO_2^+/VO^{2+}$ reaction efficiently consumes photogenerated holes, suppressing charge recombination, and enabling electron storage in hydrogen tungsten bronze ($H_xWO_3$). The fast reaction kinetics of $V^{3+}/V^{2+}$ helps boost the photocurrent. Under dark conditions (FIG. 16B), decomposition of $H_xWO_3$ in the photoelectrode releases electrons that flow in the same direction as the photocurrent under light conditions. The kinetics of electron release is enhanced by, again, the fast PEC reaction of the $V^{3+}/V^{2+}$ redox pair, which proceeds the same way as that under light conditions. In other words, solar energy storage reaction still continues even under dark conditions.

Example 7

Hybrid Photoelectrodes

A solar energy system comprising hybrid photoeletrodes was prepared and characterized as follows. Specifically, a prolonged photoelectrochemical study (up to almost 4 hrs) was conducted to investigate the overall cell performance in terms of electron storage using two distinct electrolytes. The hybrid photoelectrodes and the general PEC system were the same as those described in Example 6.

Figure 17:
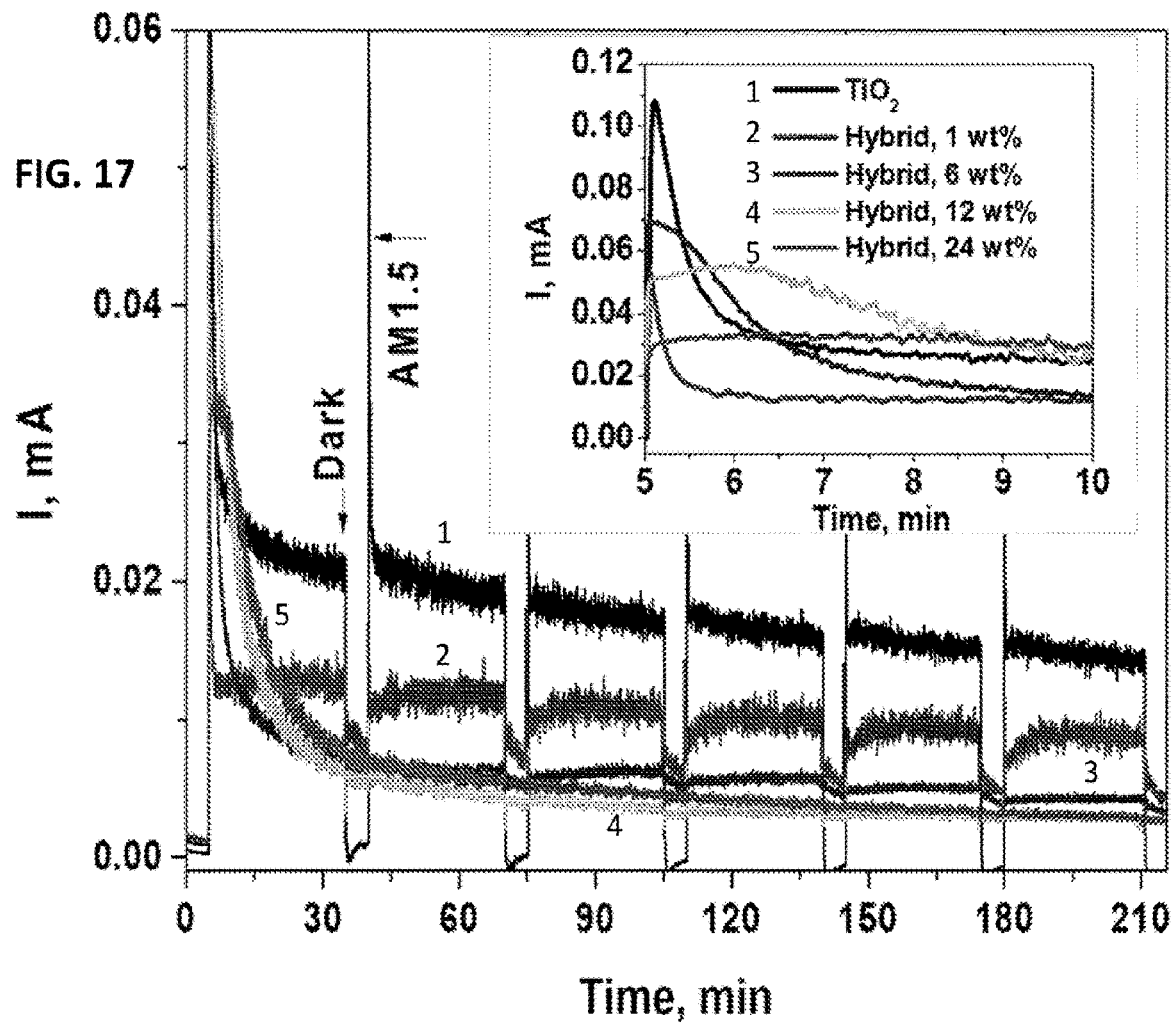
FIG. 17 illustrates photocurrent data for solar energy systems according to some embodiments described herein.

FIG. 17 depicts the photocurrent of different hybrid electrodes in 3 M $H_2SO_4$ electrolyte under alternative dark/illumination conditions. The inset graph magnifies the photoresponse from 5 to 10 min under illumination. Generally, all electrodes showed relatively small photocurrent under AM1.5 illumination, which is an indication of sluggish reaction kinetics of $H_2$ and $O_2$ evolution. Compared to the $TiO_2$ electrode, the hybrid electrodes showed even inferior photocurrent within almost the entire test window, though increasing the loading of $WO_3$ in the hybrid electrodes resulted in a red shift of absorption shoulder near 450 nm. However, the inset graph indicates higher photocurrent for the hybrid electrode with 12 wt. % of $WO_3$ compared to the $TiO_2$ electrode during the first 5 min of illumination. In addition, the photocurrents produced by the hybrid electrodes appeared to reach saturation/stabilization eventually when the fraction of $WO_3$ was no less than 6 wt. % in spite of illumination time.

On the other hand, the hybrid electrodes gave much more appreciable dark current (at least one order of magnitude higher) than $TiO_2$ electrode. Unlike the negligible dark current by $TiO_2$, the one by the hybrid electrodes remains almost without any decay through each dark period (5 min). These findings achieved in prolonged tests may appear to contradict the results observed in short-time tests. However, the apparent discrepancy can be explained through the reversible intercalation/de-intercalation of electrons and $H^+$ ions into/out of $WO_3$ to form hydrogen tungsten bronze, $H_xWO_3$. This is clearly seen from the appearance of all hybrid electrodes before and after the photoelectrochemical experiments. The deeply colored blue-black hydrogen tungsten bronze appeared on all hybrid electrodes after AM1.5 irradiation except the one with 1 wt % $WO_3$. This observation coincides strongly with the photocurrent profiles of all hybrid electrodes. When light was shed on the hybrid electrode, the photogenerated electrons, apart from recombining with holes at the semiconductor/liquid interface, have a higher tendency to react with $WO_3$ along with $H^+$ ions to form $H_xWO_3$. These $H_xWO_3$ regions, scattered/distributed across the $WO_3/TiO_2$ matrix, are highly light-reflecting due to their metallic or quasi-metallic nature and are believed to act as a hurdle to electron transport, with the result that photocurrent was reduced. When $WO_3$ content in the hybrid electrode is less dominant (e.g., 1 wt, %), the photocurrent is only slightly mitigated even under long-term illumination test. However, the photocurrent was reduced to saturation/stabilization once the $WO_3$ loading was more than 1 wt % regardless of dark/illumination conditions. The noticeable dark currents from the hybrid electrodes are believed to be due to the released electrons from the decomposition reaction of hydrogen tungsten bronze. However, the reaction kinetics of such electron release is believed to be very sluggish in pure acid, resulting in unchangeable dark currents for the hybrid electrodes especially with high $WO_3$ loading.

Material characterization such as Raman spectroscopy and XRD was performed on the hybrid electrode (24 wt. %) before and after ZRA experiments to confirm the formation of $H_xWO_3$. In the Raman spectra, no other peaks other than anatase $TiO_2$ and monoclinic $WO_3$ were observed. Five Raman active modes near 146, 197, 397, 515, and 633 $cm^{-1}$ are assigned to characteristic vibration of anatase $TiO_2$. The peaks near 270, 326, 713 and 806 $cm^{-1}$ belong to characteristic vibration modes of monoclinic $WO_3$. XRD result sorting Information) on the other hand, show structural changes of the hybrid electrode (24 wt. %) after the ZRA tests. Only peaks of anatase $TiO_2$ (JCPDS #21-1272), rutile $TiO_2$ (JCPDS #76-1940), and monoclinic $WO_3$ (JCPDS #83-0950) were found in the sample before ZRA experiment. However, the crystal structure of $WO_3$ in the sample changed from monoclinic to cubic perovskite after intercalation of hydrogen ions into $WO_3$ lattice. The major structural change appears mostly on three characteristic peaks of monoclinic $WO_3$ from 22.5° to 250, though other peaks remain the same after the formation of $H_xWO_3$. Thus, not only do the three major $WO_3$ characteristic peaks disappear, but also two new peaks emerge in different positions. It is believed that when hydrogen ions are inserted into $WO_3$ lattice, all the corner-shared $WO_6$ octahedra are tilted relative to the orientation that is expected in a perovskite structure. Thus, it is believed that such $WO_6$ octahedra tilt is responsible for the observed structural change of the hybrid electrode before and after the formation of $H_xWO_3$ described herein.

Figure 18:
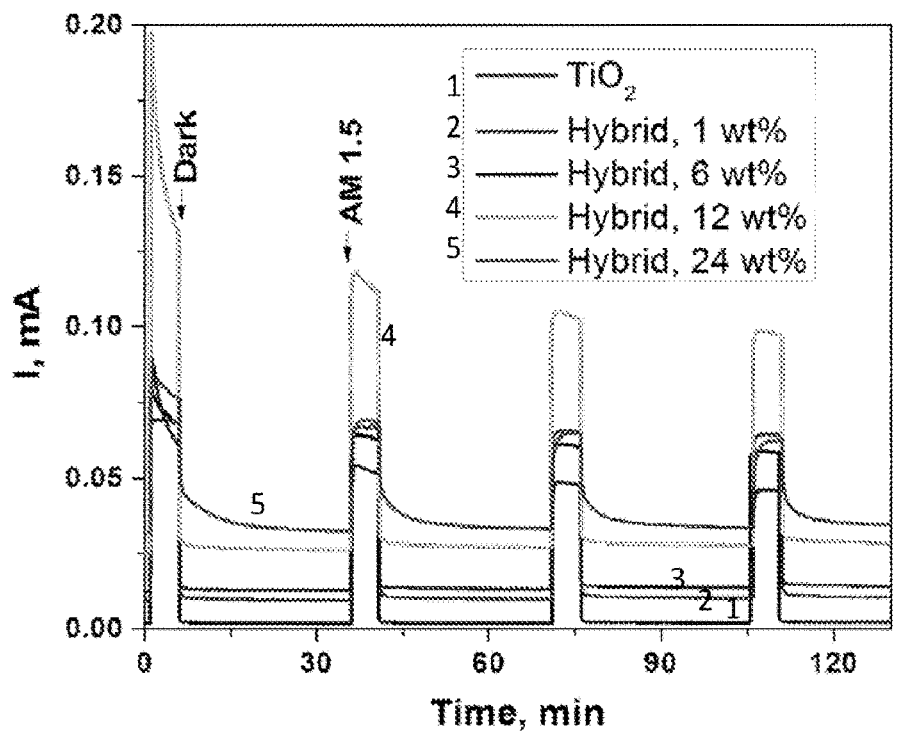
FIG. 18 illustrates photocurrent data for solar energy systems according to some embodiments described herein.

The photocurrents collected from various electrodes when 0.01 M all-vanadium electrolytes were used, as shown in FIG. 18, are significantly different from what is shown in FIG. 17. The $TiO_2$ electrode demonstrated distinctly different photoelectrochemical behavior than the hybrid ones. All hybrid electrodes show much higher photocurrent in all-vanadium electrolyte compared to those in pure acid electrolyte. The improvement on photocurrent is attributed to mitigated charge carrier recombination and fast reaction kinetics of vanadium redox species. In addition, the amount of $WO_3$ in the hybrid electrode was discovered to play an important role affecting the photoelectrochemical behavior of electrodes. When $WO_3$ content in hybrid electrode was either inadequate or abundant, the photocurrent was mitigated compared to that of $TiO_2$ and only medium $WO_3$ loading (12 wt. %) in the hybrid electrode gave optimum photocurrent. This observation can be ascribed to the competition among vanadium redox reactions, charge carrier recombination, and tungsten bronze formation reaction at the semiconductor/liquid interface. When vanadium redox species were involved in the electrolyte, the photoelectrons preferentially participated in redox reactions in addition to those in forming hydrogen tungsten bronze, due to fast reaction kinetics of vanadium species and the narrow-band-gap $WO_3$. It is deduced that the charge carrier recombination reaction dominates over the other reactions when $WO_3$ loading is insignificant; whereas $WO_3$ may induce charge trapping effects in the bulk and form more hydrogen tungsten bronze when its loading is too high. A moderate amount of $WO_3$ in the hybrid electrodes serves as a mediator for effective charge carrier separation by minimizing the recombination losses with the assistance of vanadium redox species during illumination.

On the other hand, the ability of the hybrid electrodes to store photogenerated electrons compared to $TiO_2$ is conspicuously manifested in all-vanadium electrolytes by their dark current shown in FIG. 18. The hybrid electrodes were found to release electrons under dark condition for prolonged periods of time and the dark current was almost linearly proportional to the amount of $WO_3$ in the hybrid electrodes. The hybrid electrode with 24 wt. % $WO_3$ exhibits substantial electron storage capacity under dark (estimated to be 0.299 mAh/g or 1.078 C/g) in the form of prolonged electron release up to 30 min with only 5-min illumination. The released electrons from the hybrid electrodes under dark conditions are believed to be due to decomposition of hydrogen tungsten bronze formed during illumination, and these electrons can be used to continue reducing the vanadium redox species even under dark. In other words, the photoelectrochemical cell could continue being charged even under dark condition.

As described above, hydrogen tungsten bronze formed under illumination is believed to block the semiconductor/electrolyte interface and thus compromise the photocurrent. To evaluate the charge transfer at the interface between the photoelectrode and electrolyte before, during and after the illumination electrochemical impedance spectroscopy (EIS) was used. Specifically, EIS measurements were taken at the open circuit voltage (OCV) of the cells on different photoelectrodes under dark/illumination conditions. Nyquist plots of the $TiO_2$ and hybrid (24 wt. %) electrodes in pure acid or 0.01 M all-vanadium electrolytes under dark and illumination conditions were prepared. The plots for the $TiO_2$ and hybrid electrodes showed distinct characteristics of impedance in two electrolytes albeit their spectra were all composed of similar arcs/partial arcs. Generally, an arc in the Nyquist plot represents existence of an electrochemical interface, and the appearance of plural arcs indicates different time constants of electrochemical interfaces for electron transport in the electrochemical system.

When only 3 M $H_2SO_4$ electrolyte was used, the high-frequency arc and an even bigger arc (only a portion) at low frequency are believed to correspond to electron transport resistance and interfacial capacitance at Pt/electrolyte and $TiO_2$/electrolyte interface, respectively. The dominantly large diameter of the low-frequency arc indicates huge charge transfer resistance and thus sluggish reaction kinetics regardless of illumination. This finding is consistent with FIG. 17, indicating water splitting by $TiO_2$ is intrinsically sluggish. Note that the diameter of the small arc at high frequency is independent of dark/illumination conditions, proving that no change occurred on Pt electrode itself. However, when vanadium redox species were involved in the electrolyte and new interfaces were created, a large difference was seen on impedance spectra. One more arc with much larger diameter emerged at mid frequency and it represents the charge transfer resistance and interfacial capacitance at $TiO_2$/vanadium (IV) redox interface. The new arc at mid frequency dominates much more in the whole impedance spectra than electron transport at high frequency and Warburg diffusion resistance at low frequency. This result may indicate that vanadium redox plays an important role at $TiO_2$/vanadium (IV) redox and Pt/vanadium (III) redox interfaces in terms of charge transfer resistance and electron transport resistance.

In addition, the new interfaces created by vanadium redox species seem to have little influence on electron transport resistance at the counter electrode as the resistance values. However, the charge transfer resistance with vanadium redox species was considerably reduced up to three times under AM1.5 illumination. This is believed to be due to facilitated electron generation and transport by fast reaction kinetics of vanadium redox. Additionally, the vanadium redox also shifts the dynamic balance between charge carrier recombination and redox reaction toward the latter. The electron transport resistance (diameter of the mid-frequency arc) after illumination for 1 min was greatly reduced and quickly reached stabilization in 30 min. The EIS spectra remained unchanged even up to 4 hrs. Besides, when the light was turned off, the electron transport resistance was promptly increased and reverted back to its original value as before the test.

Nyquist plots of the hybrid (24 wt. % WO3) electrode in the photoelectrochemical cell using two different electrolytes (3 M $H_2SO_4$ and 0.01 M all-vanadium electrolyte). It was observed that hydrogen tungsten bronze formed under illumination by $WO_3$ reacting with photogenerated electrons and $H^+$ ions in the electrolyte, providing a hurdle to electron transport at the semiconductor/electrolyte interface. The electron transport resistance corresponding to the Pt/electrolyte interface (i.e., diameter of the high-frequency arc) in both electrolytes was nearly doubled under illumination and this increase was strictly dependent on time. Though the nature of the Pt/electrolyte interface at the counter electrode remained unchanged; however, the charge transfer kinetics might be impeded under illumination because the incoming electrons from the photoelectrode are blocked by the formation of $H_xWO_3$. An increase in electron transport resistance, as a result of $H_xWO_3$ formation, appeared delayed in all-vanadium electrolytes. Besides, the electron transport resistance after long-term illumination (4 hrs) was about 5 Ω lower than that in 3 M $H_2SO_4$ electrolytes. Such results are consistent with the observed saturated photocurrent of the hybrid (24 wt. %) electrode in FIG. 17, and the electrode appearance change. It is believed that fast reactions of vanadium (IV) redox species at the photoelectrode surface, which quickly consume the photogenerated electrons, leave only a small fraction of those to participate in the formation of $H_xWO_3$. This significantly delays growth of $H_xWO_3$ on the photoelectrode and results in slow changes of both high-frequency and mid-frequency arcs. The above analysis was confirmed by the unchanged electrode appearance for different $WO_3$ loadings in 0.01 M all-vanadium electrolyte before and after the test.

Figure 19:
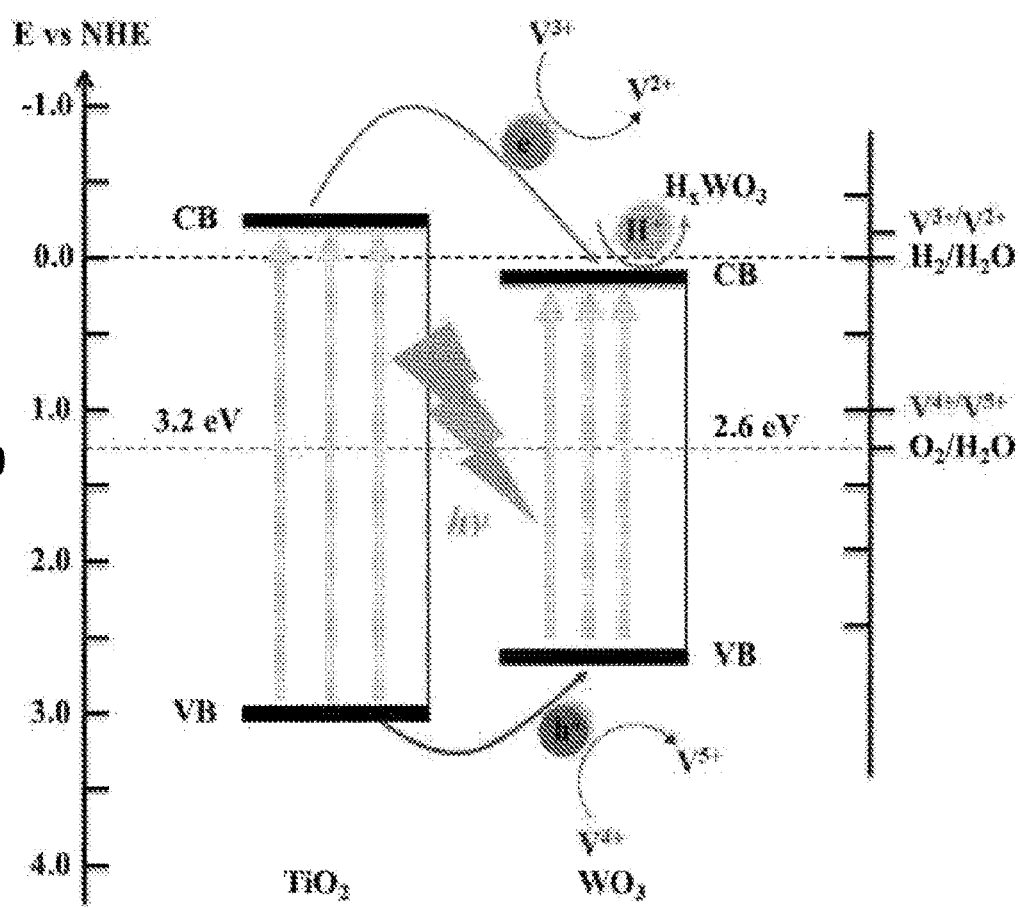
FIG. 19 illustrates schematically a model of electron storage according to one embodiment described herein.

In view of the above, to better understand the observed EIS spectra of the hybrid electrode in two electrolyte systems under different dark/illumination conditions, a model based upon the relevant electronic states of different components and standard electrochemical potential of different vanadium redox species was proposed (see FIG. 19). This model also helps further elucidate the electron storage mechanism and charge transfer pathway for the hybrid electrode. In this model, to avoid unnecessary ambiguity, the bandgap energy of $WO_3$ is designated as 2.6 eV and the conduction band (CB) edge is about 0.4 V more positive than that of $TiO_2$ in the electrochemical scale as is typically reported in the literature. As illustrated in FIG. 19, the photogenerated electrons and holes in $TiO_2$ need to travel "downhill" and "uphill" to the CB and VB of $WO_3$ respectively because of their relative band positions. The more positive CB and more negative VB of $WO_3$ are deemed as the driving force for such charge carrier migration. During this process, different reaction scenarios emerge depending on the electrolyte used. When pure acid was employed as the electrolyte, photogenerated holes from $TiO_2$ and $WO_3$ oxidize $H_2O$ to result in $O_2$ evolution while the photoelectrons react with $WO_3$ and $H^+$ ions to form hydrogen tungsten bronze. This is why the blue-black coloration appeared on the electrodes after illumination in pure acid electrolyte. Note that such photochromism highly depends on the amount of $WO_3$ that participates in the reaction and electron transfer kinetics. When $WO_3$ loading in hybrid electrode is insignificant (e.g. 1 wt. %), the photochromism is insignificant, as little difference was found after long-term illumination up to 4 hrs by examining the electrode appearance. However, noticeable dark current observed after switching off the light clearly indicates the formation of hydrogen tungsten bronze and its slow decomposition to release electrons. As for the hybrid electrodes with higher $WO_3$ loading, blue-black coloration was observed after the same test and the photocurrent during the test quickly reached to saturation/stabilization regardless of dark/illumination condition. These observations confirm that (i) hydrogen tungsten bronze is preferably formed out of hybrid electrodes under AM1.5 illumination, (ii) it serves as a barricade to prevent electron transfer, (iii) the decomposition is very slow.

When vanadium redox species were involved in the electrolyte, photogenerated charge carriers, have a distinct pathway at the semiconductor/liquid interface. Similar to the previous scenario, photogenerated holes from $TiO_2$ will still travel "uphill" to the $WO_3$ VB and join their counterparts there. However, instead of evolving $O_2$, these holes are inclined to oxidize vanadium (IV) ions to vanadium (V) ions due to more negative electrochemical potential and faster reaction kinetics of $V^{4+}/V^{5+}$ redox compared to oxygen evolution reaction. On the other hand, the photogenerated electrons from $TiO_2$ are speculated to mainly/completely react with vanadium (III) ions in the catholyte and reduce them to vanadium (II) ions when they travel "downhill" to the conduction band of $WO_3$ as a result of fast electrochemical kinetics of $V^{3+}/V^{2+}$ redox. The remaining photogenerated electrons from $TiO_2$, if any, along with their counterparts in $WO_3$ will react with $WO_3$ to form hydrogen tungsten bronze. This process is reverted under dark upon demand releasing the stored electrons. This finding is confirmed by the prolonged dark current and EIS measurement as the resistance was increased after long-term illumination, which indicates the existence of hydrogen tungsten bronze.

Meanwhile, the fast reaction kinetics of $V^{3+}/V^{2+}$ redox is believed to prevent $TiO_2$ photoelectrons from recombination, thus providing much higher photocurrent than exhibited in pure acid electrolyte. In other words, hybrid electrode is capable of revitalizing photocurrent in all-vanadium electrolytes under illumination and releasing electron energy stored in hydrogen tungsten bronze under dark simultaneously. Note that the magnitude of photocurrent revitalized and the electron energy released strongly depend on the amount of $WO_3$ in hybrid electrode and redox reaction kinetics. Importantly, the electron storage capability of the hybrid electrode when coupled with the all-vanadium electrolytes, in comparison with pure acid electrolytes, potentially offer great reversibility, long-term electron storage (up to 4 hrs), and significant improvement in photocurrent.

Example 8

Supporting Electrolyte

In this Example, methanesulfonic acid (MSA) was used to replace the commonly employed $H_2SO_4$ supporting electrolyte in an all-vanadium photoelectrochemical storage cell (all-V PESC), and its physical, chemical, electrochemical and photoelectrochemical properties were studied. The results, compared to those achieved under the same conditions using $H_2SO_4$, demonstrate the effectiveness of MSA as an alternative supporting electrolyte to boost photoelectrochemical performance of the all-V PESC.

Experimental

Electrode Fabrication $TiO_2$ photoelectrodes with active area of 1.61 cm$^2$ were fabricated and used throughout the experiment. To fabricate a $TiO_2$ electrode, 1.00 g Degussa P25 $TiO_2$ (Evonik), 2.50 g α-terpineol (Fisher Scientific USA) were mixed under constant stirring at 80° C. for 1 h to obtain a uniform $TiO_2$ slurry. Then the slurry was deposited on a pre-cut square-shaped fluorine doped tin oxide (FTO) (Pilkington USA) using a doctor blade. The FTO substrate was pre-washed with acetone (99.7%, Fisher Scientific USA), methanol (Fisher Scientific USA), and deionized (DI) water several times, before being blow-dried and then further dried in an oven at 120° C. for 1 h. The obtained coating was subsequently calcined with air flow at 500° C. for 90 min.

Electrolyte Preparation

Six types of electrolytes, including 3 M $H_2SO_4$ or MSA, 0.01 M vanadium (IV, $VO^{2+}$) in 3 M $H_2SO_4$ or MSA, and 0.01 M vanadium (III, $V^{3+}$) in 3 M $H_2SO_4$ or MSA, were used in the experiments. The electrolytes were prepared by dissolving specific acids, i.e., $H_2SO_4$ (J.T. Baker USA) and MSA (Alfa Aesar USA), in DI water with or without vanadium (IV) sulfate oxide hydrate ($VOSO_4 \cdot xH_2O$) (Alfa Aesar USA). The number of water in $VOSO_4 \cdot xH_2O$ was determined by thermogravimetric analysis. The prepared vanadium (IV)—$H_2SO_4$ and vanadium (IV)-MSA solution both appear light blue. Note that hereafter V-$H_2SO_4$ and V-MSA refer to vanadium redox in 3 M $H_2SO_4$ and MSA, respectively. The 0.01 M vanadium (III)-based electrolytes were obtained by electrochemically reducing the prepared vanadium (IV)-based solutions in a three-electrode electrochemical cell at a constant current density of 3 mA/cm$^2$ using a potentiostat (PARSTAT 2273, Princeton Applied Research) until the potential reached 1.6 V. The electrolyte was protected by $N_2$ to prevent oxidation of the vanadium (III) species. The obtained vanadium (III)-based electrolytes appear light green.

Material and Cell Characterization

The crystallographic information of the photoelectrode was determined by XRD (Siemens, 810-M340-32-C3000) at a scan rate 0.01° s$^{-1}$ between 20°-80° with a dwell time of is. Scanning electron microscopy (Hitachi S-3000N) was used to examine the microstructure of the photoelectrode. The electrochemical and photoelectrochemical properties of the photoelectrode were studied in various electrolytes under dark and/or AM1.5 illumination by linear sweep voltammetry (LSV), cyclic voltammetry (CV), and zero resistance ammetry (ZRA). A two-chamber, three-electrode electrochemical cell was used, where the photoelectrode serves as the working electrode (WE), and a platinum mesh and Ag/AgCl electrode serve as the counter electrode (CE) and reference electrodes (RE), respectively. In a typical experiment, 3 M $H_2SO_4$/MSA solution with or without 0.01 M V(IV) acid was used as the anolyte, and 3 M $H_2SO_4$/MSA solution with or without 0.01 M V(III) was used as the catholyte in two chambers of the cell separated by a Nafion 117 membrane. The voltage scan range was from −0.5 to 2.1 V and the scan rate varied from 5 to 20 mVs$^{-1}$. The overall duration for the ZRA measurement (without any externally applied bias) was 260 s with 20 s intervals of alternate dark/illumination. Solar irradiation was created using an ozone-free solar simulator system (Newport USA) coupled with an AM1.5 global filter (Newport USA) and calibrated using a standard photodiode (Newport USA).

The electrochemical impedance spectroscopy (EIS) was used to probe bulk electrolyte conductivity at room temperature (25° C.) and photoelectrochemical reaction kinetics of the cell. All data were recorded at open-circuit voltage (OCV) over a frequency range from 1 mHz to 2 MHz with an amplitude of 10 mV. Nyquist plots using various electrolytes were also used to determine ohmic resistance of the cell and the ionic conductivity of bulk electrolyte was calculated according to the following Equation (2):

$$\sigma = L/(Z_{re} \cdot A) \quad \text{Equation (2)},$$

where σ is the ionic conductivity of bulk electrolyte, L is the overall length of four sensing probes (1.33 cm), $Z_{re}$ is ohmic resistance of the cell and A is the electrode area (1.72 cm×0.12 cm) available for ionic conduction. Note that such ohmic resistance obtained from the Nyquist plot only contains the contribution of the electrolyte and sensing electrodes. As the contribution of the latter can be considered insignificant, the resistance of the cell is therefore approximated as the resistance of the electrolyte.

Nyquist plot and Bode plot of EIS were both employed to reveal electron lifetime of the photoelectrode during the reaction. By using the following semi-empirical equation, Equation (3), the numerical value of photoelectron lifetime in various electrolytes can be calculated:

$$\tau_e = 1/(2\pi f_{max}) \qquad \text{Equation (3),}$$

where $\tau_e$ is the lifetime of photogenerated electrons and $f_{max}$ is the maximum frequency of the peak in the low frequency region.

To measure incident photon-to-current conversion efficiency (IPCE) of the cell, the wavelength of the incident light was controlled by a monochromator (Edmund Optometrics) from 200 to 600 nm in combination with the following Equation (1) above.

Faradaic efficiency (ηF) is calculated as described in Example 4 above. The concentration of vanadium redox species was determined by assaying a small amount (~10 mL) of the electrolyte using a quartz cuvette with a fixed path length (1 cm) in a UV-vis spectrophotometer (PerkinElmer Lambda 35). According to Beer-Lambert law, a linear relationship can be assumed between the absorbance at the characteristic peak of vanadium redox and its concentration.

Results and Discussion
Photoelectrochemical Study

The photoelectrochemical performance of the cell was studied by LSV and ZRA using a $TiO_2$ photoelectrode in various electrolytes under dark and AM1.5 illumination. MSA leads to a four-fold improvement in photocurrent in comparison to $H_2SO_4$.

In order to further investigate photoelectrochemical performance of MSA, the cell was studied using ZRA method (no external bias applied) in contrast to LSV. Pure MSA is chemically stable upon illumination and it shows significantly enhanced photocurrent (5 times higher) than that in pure $H_2SO_4$ within the entire test window under AM1.5 illumination. Although current spikes, attributed to surface trap states of $TiO_2$, were observed at the beginning upon illumination, the photocurrent reaches equilibration eventually after a short period of time.

This result is in alignment with the above LSV findings. Further, the fact that MSA gives even higher photocurrent than the V-$H_2SO_4$ electrolyte on a $TiO_2$ photoelectrode may indicate the greater ability of MSA to enhance photoelectrochemical reaction and prevent charge recombination. Indeed, it was confirmed that V-MSA shows even more improved photoelectrochemical performance. Namely, the photocurrent of $TiO_2$ is boosted almost 7 times that in V-$H_2SO_4$ electrolyte under the same concentrations of vanadium redox species. This photocurrent enhancement is ascribed to the synergistic effect of MSA and fast reaction kinetics of vanadium redox species.

Electrochemical Impedance Spectroscopy Study

EIS was also employed to investigate reaction kinetics of the cell using MSA-based electrolytes. One semi-circle at high frequency and one arc/partial arc at mid frequency were observed in all tested electrolytes. The semi-circle at high frequency corresponds to electron transport resistance and interfacial capacitance at the Pt/electrolyte interface while the arc/partial arc at mid frequency represents charge transfer resistance and interfacial capacitance at the $TiO_2$/vanadium (IV) redox interface. It is clear that all electrolytes have little influence on electron transport resistance and interfacial capacitance at Pt/electrolyte interface as they all show very similar value ~50Ω. However, great difference is seen at the $TiO_2$/electrolyte interface, depending on the selection of electrolyte. The cell using 3 M $H_2SO_4$ electrolyte shows the mid frequency arc with the biggest diameter compared to others and this is indicative of slow kinetics of water splitting reactions. When vanadium redox is involved in the electrolyte, charge transfer resistance and interfacial capacitance at the $TiO_2$/electrolyte interface are reduced greatly due to fast reaction kinetics of vanadium redox. The same argument can be applied to MSA electrolyte as well. Additionally, MSA-based electrolytes exhibit much smaller charge transfer resistance and interfacial capacitance than $H_2SO_4$-based electrolytes regardless of vanadium redox participation at the $TiO_2$/electrolyte interface. Especially, the 0.01 M V-MSA electrolyte displays approximately 5 times smaller resistance compared to the 0.01 M V-$H_2SO_4$. These results are in great agreement with the LSV and ZRA results.

Bode plots were further utilized to shed light on the lifetime of photogenerated electrons in the reaction. Peaks given by the two MSA-based electrolytes despite of vanadium redox, both shift to lower frequency region by two orders of magnitude compared to their counterparts in $H_2SO_4$ electrolyte. Thus, the photoelectron lifetime in MSA-based electrolyte is significantly prolonged compared to it in $H_2SO_4$-based electrolytes. The MSA-based electrolytes display astonishingly longer electron lifetime compared to the $H_2SO_4$-based electrolytes. Specifically, pure MSA and V-MSA electrolytes are capable of prolonging electron lifetime by a factor of 43 and 40 compared to their $H_2SO_4$ counterparts, respectively.

However, vanadium redox seems to also play an important role by reducing electron lifetime on $TiO_2$ photoelectrodes, and this is true for both $H_2SO_4$ and MSA. As a result, although electron lifetime of the $TiO_2$ electrode is shortened vastly in vanadium-based electrolytes compare to that in pure acid electrolytes, fast reaction kinetics of vanadium species still surpasses this effect to produce higher photocurrents. As a comparison, the ratio of electron lifetime in vanadium-based electrolytes to that in pure acid electrolytes for both $H_2SO_4$ and MSA were calculated. The values of 0.45 and 0.43, respectively, are very close to each other, implying the same electrochemical and/or photoelectrochemical behaviour of vanadium redox in two different acids. These result and analysis are in good agreement with the previous LSV and ZRA results, indicating a greatly diminished charge carrier recombination and better photocatalytic property of MSA electrolyte, especially in the presence of vanadium redox species. The origin of the observed enhancement may root from possible interaction between MSA and charge carriers or/and vanadium ions.

Furthermore, the significantly prolonged electron lifetime by MSA may also explain the noticeable dark currents for the MSA-based electrolytes, while $H_2SO_4$ reveals no sign of charge carrier adsorption by flattening out the dark current. It is suspected that such dark current of MSA is due to large amount of uncompensated charge carrier adsorption at the semiconductor/liquid interface immediately after light off. These uncompensated charge carriers, however, can be eliminated by discharging the cell under dark for extended period of time. This is also in good agreement with the above-mentioned discussion regarding the role of vanadium species. Namely, the vanadium redox helps reduce electron lifetime considerably through scavenging uncompensated charge carriers at the TiO$_2$/electrolyte interface.

Efficiency Study

The cell efficiencies of an all-V PESC such as IPCE and Faradaic efficiency by using MSA-based electrolytes were investigated to quantitatively reveal its photoelectrochemical performance. Pure H$_2$SO$_4$ electrolyte, only gives a low IPCE value of 2.45% due to slow reaction kinetics of water splitting reaction, whereas pure MSA electrolyte improves cell IPCE more than 7 times. On the other hand, vanadium redox, as expected, plays a significant role by boosting IPCE of the cell, especially in the MSA electrolyte. With vanadium redox in the electrolyte, IPCE of the cell is doubled for the H$_2$SO$_4$-based electrolyte. When H$_2$SO$_4$ is replaced with MSA as the supporting electrolyte, the highest value (45.6%) is achieved with the assistance of vanadium redox, improving IPCE of the cell by a factor of 18.6, 9.7, and 2.5 compared to pure H$_2$SO$_4$ acid, 0.01 M V-H$_2$SO$_4$, and pure MSA electrolyte, respectively. Such remarkable IPCE enhancement of the cell is believed to result from a strong synergy between fast vanadium redox kinetics and prolonged electron life time induced by MSA. These results are in agreement with the previous LSV, ZRA and EIS results.

The electrochemical and photoelectrochemical properties of MSA were investigated in an all-V PESC by conductivity measurements, LSV, CV, ZRA, and EIS. LSV studies reveal 4 times higher photocurrent using pure MSA than H$_2$SO$_4$; while studies using ZRA, in alignment with those of LSV, demonstrate that MSA is capable of boosting the photocurrent approximately by a factor of 7 when vanadium redox species are involved. Although the bulk ionic conductivity of MSA-based electrolytes is found to be closely comparable to that of H$_2$SO$_4$-based electrolytes, EIS Nyquist plots, however, reveal that MSA greatly diminishes charge transfer resistance and interfacial capacitance at the photoelectrode/electrolyte interface under illumination, especially when vanadium redox species participates in the reactions. Besides, EIS Bode plots manifest that remarkably longer electron lifetime is realized in photoelectrochemical reactions using MSA-based electrolytes compared to H$_2$SO$_4$-based ones though vanadium redox species shorten electron lifetime in both acids due to its quick charge-scavenging ability. The peak IPCE achieved on V-MSA electrolyte (at 45.6%), which is 18.9, 9.7 and 2.5 times higher than those achieved using pure H$_2$SO$_4$, V-H$_2$SO$_4$, and pure MSA electrolytes respectively, is attributed to the synergistic effect of fast reaction kinetics of vanadium redox and prolonged electron life time of MSA. Additionally, after a 60-h cell operation, Faradaic efficiency of the all-V PESC was calculated to 84.8%. Furthermore, multiple CV scans show that MSA is chemically and electrochemically stable in a large potential window under both dark and illumination conditions, and XRD and SEM characterization show no crystal structure and morphology change of the TiO$_2$ photoelectrode even after a 60-h cell operation.

Example 9

Nanostructured Photoelectrode

In this Example, nanostructured TiO$_2$ photoelectrode materials were prepared. Specifically, stirring-assisted hydrothermally synthesized geometry-enhanced ultra-long TiO$_2$ nanobelts (TNBs) were prepared and shown to be capable of effectively doubling the photocurrent and IPCE for solar energy storage in an all-V PESC. For the first time, geometry and facet control of TNBs are realized by tuning the stirring speed, and their elongation as well photocatalytic activity are found to be proportional to the applied speed. This approach is advantageous compared to conventional methods using shape-control agents (such as HF, surfactant, or diethanolamine), which require additional steps to remove these agents after formation of the TiO$_2$ nanostructure.

Experimental

Synthesis of TNBs

A stirring-assisted hydrothermal synthesis method was employed to synthesize the TNBs. Typically, 1.2 g anatase TiO$_2$ powder (Alfa Aesar) was added to 80 mL of 10 M NaOH solution with stirring for 30 min. Then 25 mL of the solution was transferred to a 50 mL Teflon-lined stainless steel autoclave with a reaction temperature at 200° C. under constant stirring at 0, 100, 250, 500, and 700 rpm for 48 h. After the system was cooled to room temperature, the product was first washed by 0.1 M HCl and then deionized water several times. After drying in the oven at 80° C. for 4 h, the product was annealed in a tube furnace at 700° C. for 1 h to convert the hydrogen titanate into TiO$_2$ TNBs.

Fabrication of Photoelectrodes

The above-synthesized oxide (0.5 g) was mixed with 2.15 g α-terpineol (Fisher Scientific, USA), and then sonicated for 20 min. Fluorine-doped tin oxide (FTO) glass substrates (2 in ×2 in) were prepared and cleaned by sonication in acetone (99.7%, Fisher Scientific, USA) for 20 min followed by methanol (99.8%, Fisher Scientific, USA) for 20 min, and then DI water. Degussa P25 (Evonik) and different TNB slurries were coated on the FTO glass substrates using a doctor blade to form uniform films and then dried in an oven at 80° C. for 2 h. The as-prepared photoanodes were sintered with air flow in a tube furnace at 500° C. for 1 h. The TiCl$_4$-treated photoanodes were prepared using 0.5M TiCl$_4$ solution in ethanol. One mL of the TiCl$_4$ solution was used to soak the active surface of the photoanodes, and followed by heat treatment.

Materials Characterization

Powder XRD patterns were obtained using a diffractometer (Siemens, 810-M340-32-C3000). Scanning electron microscopy (Hitachi S-3000N variable pressure SEM and Hitachi S-4800 Field emission SEM) was used to examine the morphology of the photoanodes. Nanostructure of TNBs was studied using a high resolution transmission electron microscope (HR-TEM, Hitachi H-9500). UV-vis spectra of the photoanodes were obtained using a JASCO Corp V-570 spectrophotometer. Brunauer-Emmett-Teller (BET) surface areas were determined from N$_2$ adsorption using a Gemini VII 2390 surface area analyzer.

Photoelectrochemical Studies

The photodegradation test of methylene blue was conducted according to Hsu et al., *J. Alloys Compd.* 613 (2014) 117-121. A portable UV lamp (4 W) at 360 nm wavelength was used as an irradiation source. 3 mg TiO$_2$ samples were dispersed in 10 mL MB solution under constant stirring in a quartz container, and then were irradiated by the UV lamp in a dark room. The MB solution was extracted and analyzed by a UV-vis spectrometer every 10 min. The overall MB photodegradation rate constants and specific degradation rate constants for different TNB samples were calculated based on Equations (4) and (5):

$$\ln\left(\frac{C_0}{C}\right) = kt, \text{ and} \qquad \text{Equation (4)}$$

-continued $$k' = \frac{k}{S_A},\quad \text{Equation (5)}$$

where $C_0$ is the initial MB concentration, C is the concentration at time t (min), k (min$^{-1}$) is the first-order rate constant, and k' (g m$^{-2}$ min$^{-1}$) is the specific degradation rate constant.

The PEC experiments on different photoanodes in the all-V PESC described above were performed using a PARSTAT 2273 potentiostat. In the all-V PESC, a Nafion 117 membrane was used to separate two different vanadium redox electrolytes, i.e., 0.01 M VO$^{2+}$ and 0.01 M V$^{3+}$ (balanced with 3 M H$_2$SO$_4$). The photoanode served as the working electrode (WE) in one chamber containing VO$^{2+}$. A platinum mesh and an Ag/AgCl reference electrode served as the counter electrode and reference electrode (RE), respectively, in the other chamber containing V$^{3+}$. Zero-resistance ammetry (ZRA) was conducted, without any external bias, to measure the photocurrent. Solar irradiance was provided by an ozone-free solar simulator system (Newport USA, calibrated using a standard photodiode) paired with an AM 1.5 global filter (Newport, USA). Electrochemical impedance spectroscopy (EIS) study was performed by applying an AC voltage of 10 mV to the cell in a frequency range from 10 mHz to 2 MHz. IPCE was recorded using a monochromator from Optometrics. The IPCE value was calculated using Equation (1) above.

Results and Discussion

High-aspect-ratio TNBs were synthesized using a stirring-assisted hydrothermal method. These TNBs were found to be 80-110 nm wide, approximately 10 nm thick, and up to 20 μm long. The aspect ratio of the TNBs is tailored by the stirring speed.

Figure 20:
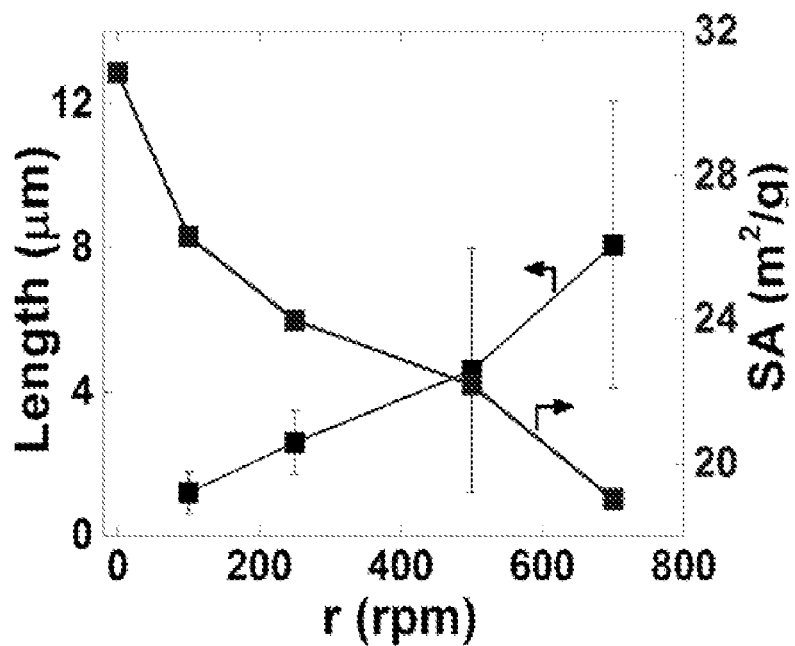
FIG. 20 illustrates a plot of morphological information for materials of a photoelectrode according to some embodiments described herein.

To investigate the effect of stirring on nanostructure and morphology, TNBs were synthesized using a range of stirring speeds from 0 to 700 rpm. The obtained samples are labeled as TNB-0, TNB-100, TNB-250, TNB-500, and TNB-700, where the numbers denote the applied stirring speed (in rpm) during the synthesis. Under no stirring, bundled spherical-shaped structures were formed in the TNB-0 sample. It is believed that the original Ti—O—Ti bonds in the starting material, i.e., anatase TiO$_2$ powder, have not yet been completely disrupted, and therefore anisotropic growth is delayed due to slow dissolution-recrystallization process at the static condition. In contrast, higher stirring speed disentangled the TiO$_2$ bundles and created structurally well-defined TNBs. In TNB-100, short (ca. 1 μm) nanobelts were obtained but with small random branches, while 700 rpm resulted in much longer (~16 μm) nanobelts. In addition, BET surface area analyses of the synthesized TNBs suggest that the specific surface area (SA, m$^2$·g$^{-1}$, continuously declines with increasing stirring speed. This, in conjunction with the averaged TNB lengths, reveals that increase of stirring speed helps create more elongated TNBs, which, however, results in shrinkage of the specific surface area. These results are plotted in FIG. 20. In addition, powder XRD measurements were conducted to assess crystallographic information of all TNB samples. The characteristic anatase peaks, especially those corresponding to (101), (004) and (200) planes, gradually intensified with increasing stirring speed, implying improved crystallinity.

Not intending to be bound by theory, it is believed that formation of TNBs is controlled by both diffusion-limited and surface reaction-limited growth, known as the DLSLOR model. This model involves dissolution of solid TiO$_2$ precursor after breaking of original Ti—O—Ti bonds by highly concentrated NaOH, and subsequent transfer to the growth zone. It is further believed that the TNBs grow at a relatively higher rate from the front surface for TNBs with higher aspect ratios, implying that forced convective flow helps not only orientate but also grow elongated TNBs along the direction of fluid flow.

HRTEM images of the TNB-700 sample indicated a lattice spacing of 0.357 nm corresponding to the thermodynamically stable anatase (101) facets. Selected area electron diffraction (SAED) confirmed that the main exposed plane is the (101) plane, and the growth direction is the [010] direction. This structure is denoted hereafter as Type I TNB.

Additionally, considerable numbers of TNBs with a V-shaped terminus are also observed. The opening angle of the V-shaped terminus is determined to be 136.6° using a model anatase structure created by Diamond 4.0.3. Further inspection with clear lattice fringes confirms that the V-shaped terminus is formed between (011) and (0 $\bar{1}$ 1) planes (each with lattice spacing of 0.35 nm). This crystal structure is denoted as Type II TNB. Type II TNB has exposed (100) and (001) facets along the long axis and on the side surface of the TNBs, respectively, which are known to possess higher surface energy than (101) facets. It is believed that these exposed high-energy facets in the TNBs, i.e., (001) and (100), are more catalytically active than those in the thermodynamically stable geometry of nanosized TiO$_2$, which consists of ~94% of low-energy (101) facets.

The exposed facets of the TNBs and their implication to photoactivity are further studied using Raman spectroscopy. All samples display similar characteristic peaks of anatase TiO$_2$ at 144 ($E_g$), 394 ($B_{1g}$), 514 ($A_{1g}$), and 636 cm$^{-1}$ ($E_g$). A semi-empirical approach of using the intensity ratio between $A_{1g}$ and $E_g$ (144 cm$^{-1}$) to quantify the percentage of exposed (001) facets was adopted. There is a distinct trend in that the percentage of exposed (001) facets in the TNBs increases monotonically with increased stirring speed in the hydrothermal synthesis, e.g., from 8.4% at 0 rpm to 35.4% at 700 rpm. The surface structural difference between (001) and (101) facets may be the reason why the relative intensity changes in the Raman spectra when the stirring speed increases. When the exposed (001) facets exist, the extent of symmetrical stretching vibration decreases, while the number of asymmetrical bending vibration increases, therefore leading to an increased relative intensity ratio between $A_{1g}$ and $E_g$ modes. Since there is no experimental condition change except for the stirring speed, the results undoubtedly demonstrate that increasing stirring speed during the hydrothermal synthesis created higher fractions of exposed (001) facets (estimated to be 4.2 times more, moving from 0 to 700 rpm), which resides primarily in Type II TNBs. This simple yet effective additive-free process thus surpasses traditional facet-controlling strategies that rely on capping agents, as mentioned earlier.

Figure 21:
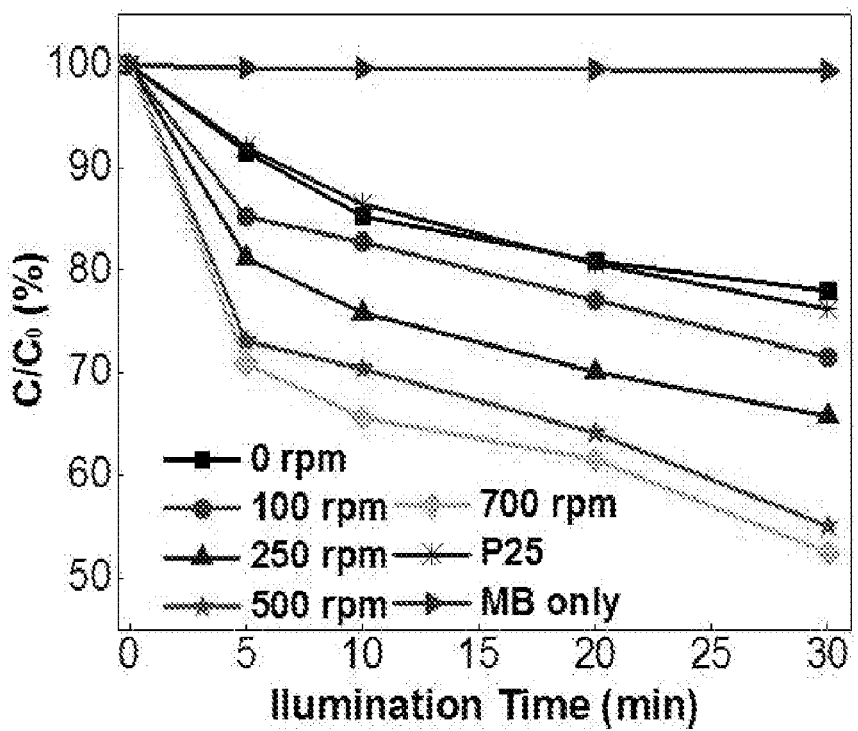
FIG. 21 illustrates photocatalytic data for photoelectrodes according to some embodiments described herein.

Mindful of the discovered relationship between stirring speed and exposed crystal facets, MB photodegradation tests were performed using the TNBs under 360 nm irradiation to evaluate their photoactivity. The TNBs synthesized at higher stirring speeds, especially at 700 rpm, display enhanced photocatalytic activity, as evidenced by faster reduction of MB concentration under illumination (e.g., 52% drop of MB concentration for TNB-700 in 30 min). FIG. 21 illustrates this trend. The effect of the band structural change on the photocatalytic activity was insignificant as there is no apparent change in light absorption, based on UV-vis spectra. On the other hand, the enhanced specific photoactivity can be ascribed to more exposed highly-active (001)/(100) facets and enhanced electron mobility.

To further access the performance of TNBs in the all-V PESC, TNB-700 and P25 were used as photocatalysts in a cell having the configuration of FIG. 1. The initial photocurrent of the TNB-700 electrode under AM1.5 illumination is almost identical to that of P25, in sharp contrast to the MB photodegradation results, but with less deterioration. After 4 h the TNB-700 result remains 50 µA higher than that of P25. Furthermore, stable operation for TNB-700 could be quickly established after light was temporally switched off for 1 min at 60 min compared to that using P25 $TiO_2$. It is important to note here that no external bias was applied to the cell; therefore, the observed photocurrents are generated solely from the AM1.5 illumination.

As for the faster decay of photocurrent observed in the P25-based cell, photocatalyst degradation due to either chemical or photoelectrochemical corrosion can be ruled out as no evident change in the surface chemistry of both electrodes before and after the test was found. According to SEM, the electrode with P25 appears very dense, though some discrete voids are sparsely spotted. The TNB-700 electrode, however, appears uniformly porous through the entire thickness of the electrode, and therefore may facilitate transport of vanadium redox species. Based on $TiO_2$ loading and the electrode thickness, calculated porosity values for two electrodes are 0.86 (TNB) and 0.66 (P25), respectively, which could account for a 1.7-fold improvement in effective diffusion coefficient of $VO^{2+}$, estimated via the Bruggman correlation, for the TNB-700 photoelectrode.

In addition, $TiCl_4$ pre-treatment of the TNB-based photoelectrode was used to possibly enhance the bonding and therefore charge transport between TNBs. This modified photoelectrode is denoted as TNB-TL hereafter. Both SEM and UV-vis spectroscopy were used to gain further insight into the structural/morphological and optical properties of the TNB-TL electrode. SEM experiments indicate that TNB-TL still maintains its porous structure but with a well-connected 3D network. Both high-magnification top-view SEM image and microscopic images show that a thin layer of $TiO_2$ (from $TiCl_4$) film possibly forms uniformly on the surface of TNBs. It is further believed, based on the UV-vis-observed red-shift of the absorption edge after $TiCl_4$ treatment, that this $TiO_2$ thin layer might be composed of rutile phase.

To assess performance of TNBs in the all-V PESC, two sets of photocharging experiments were conducted using $TiCl_4$-treated (designated as P25-TL) and untreated P25, as well as treated (TNB-TL) and untreated TNBs. During the initial 1 min when the cells were kept under dark conditions, no photocurrent was observed. Upon illumination, the photocurrents spike initially and then gradually level off. The $TiCl_4$ treatment to P25 only slightly improves the photocurrent (stabilized between 6 and 17 min) from 0.16 mA to 0.23 mA. In comparison, the TNB, after $TiCl_4$ treatment (i.e., TNB-TL), achieves a stabilized photocurrent double that of P25-TL, representing a 2.3-fold increase in photocurrent. This significant photocurrent enhancement for the TNB samples is attributed to improved charge transfer through the 3D network of semiconductor, fast kinetics of the vanadium redox, and intrinsic properties of high-aspect ratio TNBs, including high crystallinity, high surface specific activity, 1D elongation of the belts, long electron diffusion length, and almost two-fold higher effective donor concentration comparing to nanoparticles.

Further, EIS measurements at OCV (and corresponding Nyquist plots) for both TNB and TNB-TL electrodes suggest enhanced charges injection into the Pt/electrolyte interface enabled by the $TiCl_4$-treated TNB photoanode. This treatment also appears to reduce the charge transfer resistance and interfacial capacitance at $TiO_2$/vanadium (IV) interface.

Figure 22:
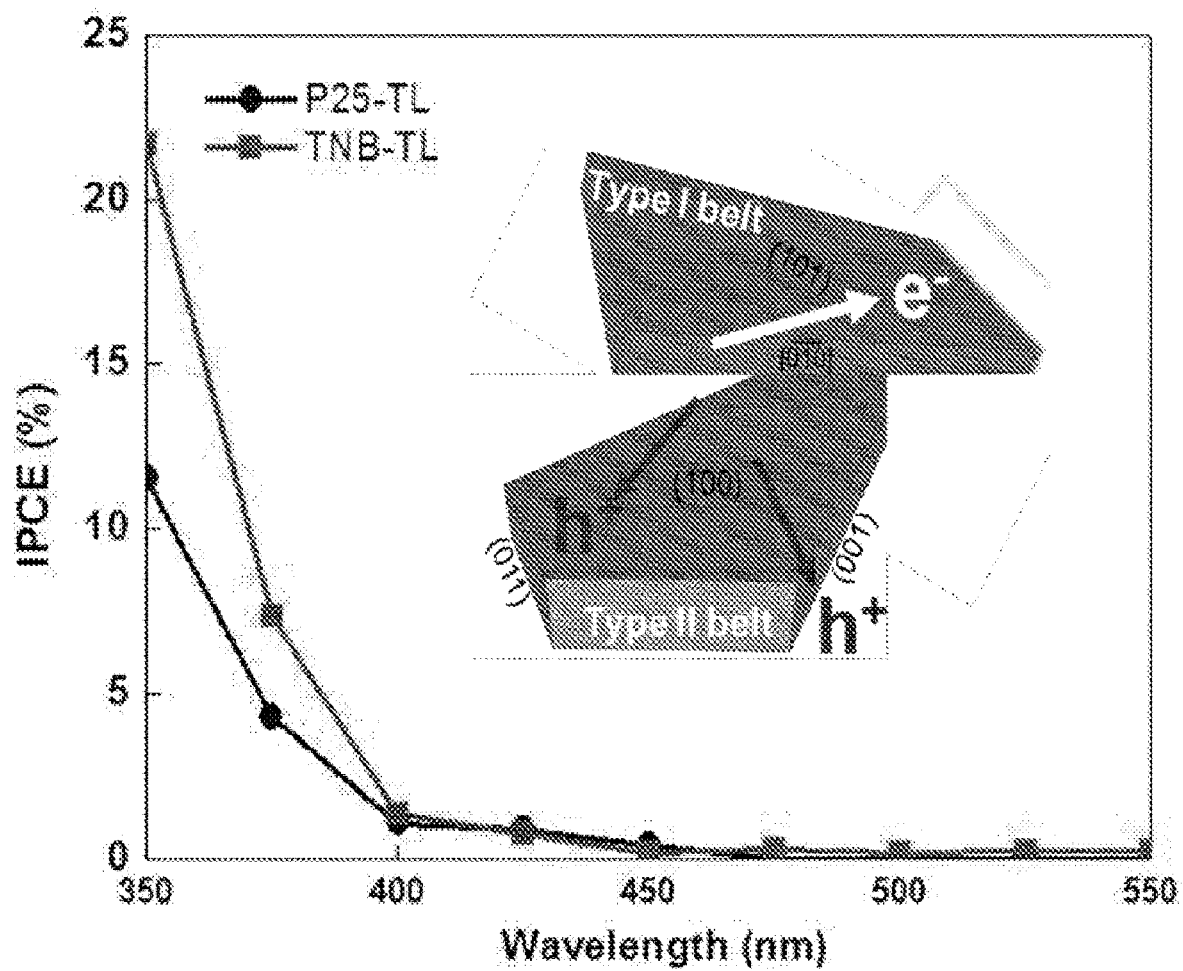
FIG. 22 illustrates IPCE data for solar energy systems according to some embodiments described herein.

IPCE measurements were also conducted to assess the overall photocharging efficiency of the all-V PESC using TNB-TL as the photoanode. The results were benchmarked against P25 against P25-TL. FIG. 22 illustrates the results. The IPCE remains almost zero at wavelength above 450 nm owing to the wide bandgap of $TiO_2$. In the range from 350 to 400 nm, the IPCE increases with decreasing wavelength of the irradiating light. At 350 nm the IPCE of the cell with TNB-TL reaches a maximum (~22%), double that of commercial P25-TL (~11%). This is strongly indicative of three efficient processes in the TNB-TL based cell: light harvesting (LH), charge separation (CS), and charge collection (CC), which correspond, respectively, to three process efficiencies, i.e., $\eta_{LH}$, $\eta_{CS}$, and $\eta_{CC}$, since the IPCE can be expressed as equal to $(\eta_{LH}*\eta_{CS}*\eta_{CC})$.

Not intending to be bound by theory, it is believed that the enhancement of IPCE for TNB-TL may originate from the following three factors, with reference to the inset of FIG. 22. First, the more exposed high-energy (001)/(100) (in Type II TNB) $TiO_2$ facets, as the reaction sites for photoelectrochemical oxidation of $VO^{2+}+$, could yield high $\eta_{LH}$. Second, the longitudinal dimension of the highly crystalline TNB-TL improves electron diffusion with depressed scattering at particle-particle interfaces. It also provides a large scale in the elongated direction to minimize electron-hole recombination. As a result, both $\eta_{CS}$ and $\eta_{CC}$ improve. Third, the largely populated low-energy (101) facets (in Type I TNB) and high-energy (001) facets (in Type II TNB) could preferentially collect electrons and holes, respectively, therefore further enhancing electron-hole separation. Notably, the above phenomena benefit from $TiCl_4$ pre-treatment that is believe to essentially bond the geometry-enhanced ultra-long $TiO_2$ nanobelts.

Example 10

Solar Energy System

Figure 23:
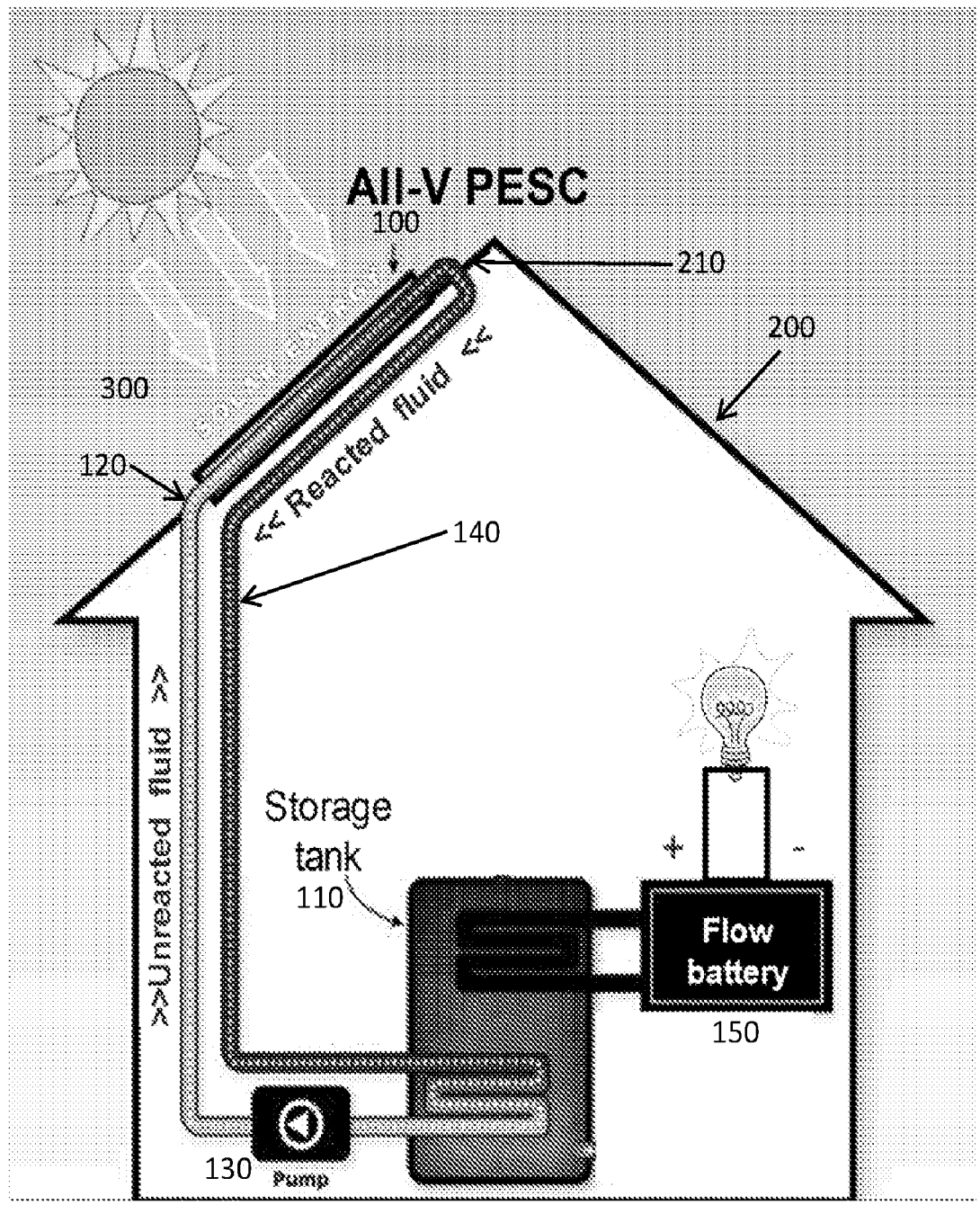
FIG. 23 illustrates schematically a solar energy system according to one embodiment described herein.

One embodiment of a solar energy system described herein is illustrated schematically in FIG. 23. With reference to FIG. 23, a full-cell "flow reactor" (100) is disposed on a roof (210) of a building (200). The flow reactor (100) can have the configuration of FIG. 3 or another flow reactor configuration described herein. Additionally, the flow reactor (100) uses "all vanadium" redox pairs. Moreover, in the embodiment of FIG. 23, solar photocharging (300) is used to drive one or more redox reactions in one or more electrolyte solutions in an "uphill" direction within the flow reactor (100), such that the chemical potential of the redox reactants is increased. In particular, one or more fluid electrolyte solutions containing redox reactants having a lower chemical potential (not shown) are provided to the flow reactor (100) from one or more storage tanks (110) using an inlet conduit (120) and a pump (130). Following a photodriven redox reaction (such as described further hereinabove), one or more fluid electrolyte solutions containing redox products having a higher chemical potential (not shown) are provided to the one or more storage tanks (110) from an outlet conduit (140). Thus, during the day or under light conditions, solar energy is stored in the form of chemical energy in the one or more storage tanks (110). (Additionally, as noted above, some "delayed photocharging" can continue to occur even under dark conditions, in some cases, due to the reaction of "stored" electrons, such as may be stored in a hybrid photoelectrode described herein.) During the night or under dark conditions, the stored chemical energy is converted to electricity using a flow battery (150). The flow battery (150) can be a conventional flow battery.

Various implementations of the disclosure have been described in fulfillment of the various objectives of the disclosure. It should be recognized that these implementations are merely illustrative of the principles of the present disclosure. Numerous modifications and adaptations thereof will be readily apparent to those skilled in the art without departing from the spirit and scope of the disclosure.

The invention claimed is:

1. A solar energy system comprising an electrochemical cell comprising:
a photoelectrode comprising a photoelectrode layer;
a counter electrode comprising a counter electrode layer;
an ion transport membrane disposed between the photoelectrode and the counter electrode, the ion transport membrane comprising a membrane layer;
a first electrolyte solution disposed in contact or fluid communication with the photoelectrode and the ion transport membrane, the first electrolyte solution being disposed in one or more first flow channels, the first flow channels being disposed in a first flow channel layer disposed between the photoelectrode layer and the membrane layer;
a second electrolyte solution disposed in contact or fluid communication with the ion transport membrane and the counter electrode, the second electrolyte solution being disposed in one or more second flow channels, the second flow channels being disposed in a second flow channel layer disposed beneath the counter electrode layer;
a storage electrode comprising a storage electrode layer;
a first external electrical connection between the photoelectrode and the counter electrode;
a second external electrical connection between the counter electrode and the storage electrode; and
an optically transparent or substantially optically transparent cover layer disposed over the photoelectrode layer and/or a porous filter layer disposed between the photoelectrode layer and the first flow channel layer;
wherein at least one of the first electrolyte solution and the second electrolyte solution comprises a solvated redox pair,
wherein the photoelectrode, the counter electrode, the first electrolyte solution, the ion transport membrane, the second electrolyte solution, and the first external electrical connection together define a liquid junction photovoltaic cell under light conditions, and
wherein the counter electrode, the storage electrode or photoelectrode, the first electrolyte solution, the ion transport membrane, the second electrolyte solution, and the second external electrical connection together define a galvanic cell under dark conditions.

2. The system of claim 1 further comprising:
a first electrical switch disposed in the first external electrical connection between the photoelectrode and the counter electrode,
wherein the first electrical switch, in a closed position, completes an external circuit between the photoelectrode and the counter electrode.

3. The system of claim 2 further comprising:
a second electrical switch disposed in the second external electrical connection between the counter electrode and the storage electrode,
wherein the second electrical switch, in a closed position, completes an external circuit between the counter electrode and the storage electrode.

4. The system of claim 1 further comprising:
an electrical switch disposed in the first external electrical connection between the photoelectrode and the counter electrode or in the second external electrical connection between the counter electrode and the storage electrode,
wherein the electrical switch, in a first position, completes an external circuit between the photoelectrode and the counter electrode, and
wherein the electrical switch, in a second position, completes an external circuit between the counter electrode and the storage electrode.

5. The system of claim 1, wherein the ion transport membrane defines a first compartment and a second compartment of the system, the first compartment comprising the photoelectrode and the first electrolyte solution and the second compartment comprising the counter electrode and the second electrolyte solution.

6. The system of claim 5, wherein the storage electrode is disposed in the first compartment.

7. The system of claim 6, wherein the storage electrode is a coating on the photoelectrode.

8. The system of claim 6, wherein the storage electrode and the photoelectrode together form a composite electrode.

9. The system of claim 6, wherein the storage electrode is an individual electrode disposed within the first electrolyte solution.

10. The system of claim 5, wherein the storage electrode is disposed in the second compartment.

11. The system of claim 10, wherein the storage electrode is a coating on the counter electrode, or the storage electrode and the counter electrode together form a composite electrode.

12. The system of claim 10, wherein the storage electrode is an individual electrode disposed within the second electrolyte solution.

13. The system of claim 1, wherein the storage electrode comprises a metal hexacyanoferrate.

14. The system of claim 1, wherein the photoelectrode is formed from a semiconductor material having a bandgap of 2.0 eV to 3.2 eV.

15. The system of claim 1, wherein:
the photoelectrode comprises a hybrid electrode formed from a first semiconductor material and a second semiconductor material, the second semiconductor material having a more positive valence band than the first material, and/or a more positive conduction band than the first material, and
the hybrid electrode is formed from $TiO_2$ and $WO_3$.

16. The system of claim 1, wherein the photoelectrode is formed from $TiO_2$.

17. The system of claim 1, wherein the ion transport membrane comprises a proton exchange membrane.

18. The system of claim 1, wherein:
the first electrolyte solution comprises a first solvated redox pair, and the second electrolyte solution comprises a second solvated redox pair, and
the first solvated redox pair and/or the second solvated redox pair comprises $VO^{2+}$ and $VO_2^{\pm}$.

19. A method of converting electromagnetic energy into electrical energy comprising:
receiving electromagnetic radiation at a surface of the photoelectrode of the solar energy system of claim 1, thereby generating one or more photoelectrons and one or more corresponding holes within the photoelectrode;

transferring the photoelectrons to the counter electrode via the first external electrical connection between the photoelectrode and the counter electrode; and transferring the holes to an oxidizable species of a solvated redox pair of the first electrolyte solution at the photoelectrode, thereby oxidizing the oxidizable species to provide an oxidized species.

* * * * *